(12) United States Patent
Li et al.

(10) Patent No.: US 12,526,647 B1
(45) Date of Patent: Jan. 13, 2026

(54) SYSTEM AND METHOD OF TILT AND TRANSMIT POWER TUNING FOR UNDERSHOOTING AND OVERSHOOTING

(71) Applicant: Meta Platforms, Inc., Menlo Park, CA (US)

(72) Inventors: Ying Li, Santa Clara, CA (US); Po-Han Huang, The Woodlands, TX (US)

(73) Assignee: Meta Platforms, Inc., Menlo Park, CA (US)

( * ) Notice: Subject to any disclaimer, the term of this patent is extended or adjusted under 35 U.S.C. 154(b) by 420 days.

(21) Appl. No.: 18/332,514

(22) Filed: Jun. 9, 2023

(51) Int. Cl.
*H04W 24/10* (2009.01)
*H04W 16/18* (2009.01)
*H04W 24/02* (2009.01)

(52) U.S. Cl.
CPC ........... *H04W 16/18* (2013.01); *H04W 24/02* (2013.01); *H04W 24/10* (2013.01)

(58) Field of Classification Search
CPC ...... H04W 16/18; H04W 24/02; H04W 24/10
See application file for complete search history.

(56) References Cited

U.S. PATENT DOCUMENTS

| | | |
|---|---|---|
| 9,473,957 B2 | 10/2016 | Wellington |
| 10,327,159 B2 | 6/2019 | Tan et al. |
| 2014/0209680 A1* | 7/2014 | Yoon .................... H04B 1/0483 455/127.3 |
| 2015/0011227 A1* | 1/2015 | Wellington ........... H04W 24/02 455/446 |
| 2022/0256358 A1 | 8/2022 | Tosyali et al. |

FOREIGN PATENT DOCUMENTS

WO 2022100952 A1 5/2022

OTHER PUBLICATIONS

Buenestado V., et al., "Self-Tuning of Remote Electrical Tilts Based on Call Traces for Coverage and Capacity Optimization in LTE," IEEE Transactions on Vehicular Technology, May 12, 2017, vol. 66, No. 5, pp. 4315-4326.
Hernandez-Aquino R., et al., "Tilt Angle Optimization in Two-Tier Cellular Networks—A Stochastic Geometry Approach," IEEE Transactions on Communications, Dec. 15, 2015, vol. 63, No. 12, pp. 5162-5177.
Vannella F., "Learning Methods for Antenna Tilt Optimization," KTH Royal Institute of Technology, Oct. 14, 2021, 101 pages.

* cited by examiner

*Primary Examiner* — Chuong A Ngo
(74) *Attorney, Agent, or Firm* — EVERSHEDS SUTHERLAND (US) LLP

(57) ABSTRACT

An antenna configuration optimization system including: a memory and a processor configured to execute instructions stored in the memory to cause the antenna configuration optimization system to: obtain a first plurality of data samples and a second plurality of data samples; store the obtained first plurality of data samples and the second plurality of data samples into the memory; detect at least one of a cell overshoot and a cell undershoot of a cellular antenna with a first set of parameters and the cellular antenna with a second set of parameters based on the first plurality of data samples and the second plurality of data samples; and output a recommendation for a reconfiguration of at least one of an antenna tilt and transmit power for the at least one of the cell overshoot and the cell undershoot of the cellular antenna.

20 Claims, 30 Drawing Sheets

FIG. 6

SYSTEM AND METHOD OF TILT AND TRANSMIT POWER TUNING FOR UNDERSHOOTING AND OVERSHOOTING

BACKGROUND

It is important that a wireless network optimizes the radio configurations such as antenna tilts and transmit power, such that the network performance could be better and end users experiences could be better.

What is needed is a system and method for identifying whether a cell tower is undershooting or overshooting if the cell location and the layout of the cellular towers are known. What is needed is a system and method for pinpointing the most urgent cases of undershooting or overshooting. What is needed is a system and method for further determining the optimal tilt angle and transmission power to improve the network performance and user experience.

SUMMARY

In accordance with an aspect of the present disclosure, an antenna configuration optimization system (ACOS) is provided for use with a first plurality of data samples of a first plurality of cellular devices connected to a cellular antenna configured with a first set of parameters and with a second plurality of data samples of a second plurality of cellular devices connected to the cellular antenna with a second set of parameters. The ACOS includes: a memory having instructions stored therein; and a processor configured to execute the instructions stored in the memory to cause the ACOS to: obtain the first plurality of data samples and the second plurality of data samples; store the obtained first plurality of data samples and the second plurality of data samples into the memory; detect at least one of a cell overshoot and a cell undershoot of the cellular antenna with the first set of parameters and the cellular antenna with the second set of parameters based on the first plurality of data samples and the second plurality of data samples; and output a recommendation for a reconfiguration of at least one of an antenna tilt and transmit power for the at least one of the cell overshoot and the cell undershoot of the cellular antenna.

In accordance with another aspect of the present disclosure, a method is provided of optimizing a cellular antenna configuration of a cellular antenna for use with a first plurality of data samples of a first plurality of cellular devices connected to the cellular antenna configured with a first set of parameters and with a second plurality of data samples of a second plurality of cellular devices connected to the cellular antenna with a second set of parameters. The method includes: obtaining, via a processor configured to execute the instructions stored in a memory, the first plurality of data samples and the second plurality of data samples; storing, via the processor, the obtained first plurality of data samples and the second plurality of data samples into the memory; detecting, via the processor, at least one of a cell overshoot and a cell undershoot of the cellular antenna with the first set of parameters and the cellular antenna with the second set of parameters based on the first plurality of data samples and the second plurality of data samples; and outputting, via the processor, a recommendation for a reconfiguration of at least one of an antenna tilt and transmit power for the at least one of the cell overshoot and the cell undershoot of the cellular antenna In accordance with another aspect of the present disclosure, a non-transitory, computer-readable media having computer-readable instructions stored thereon is provided, the computer-readable instructions being capable of being read by an ACOS for use with a first plurality of data samples of a first plurality of cellular devices connected to a cellular antenna configured with a first set of parameters and with a second plurality of data samples of a second plurality of cellular devices connected to the cellular antenna with a second set of parameters. The computer-readable instructions are capable of instructing the ACOS to perform the method including: obtaining, via a processor configured to execute the instructions stored in a memory, the first plurality of data samples and the second plurality of data samples; storing, via the processor, the obtained first plurality of data samples and the second plurality of data samples into the memory; detecting, via the processor, at least one of a cell overshoot and a cell undershoot of the cellular antenna with the first set of parameters and the cellular antenna with the second set of parameters based on the first plurality of data samples and the second plurality of data samples; and outputting, via the processor, a recommendation for a reconfiguration of at least one of an antenna tilt and transmit power for the at least one of the cell overshoot and the cell undershoot of the cellular antenna.

BRIEF SUMMARY OF THE DRAWINGS

The accompanying drawings, which are incorporated in and form a part of the specification, illustrate and explain examples. In the drawings:

FIG. 2A illustrates a cellular network system in accordance with aspects of the present disclosure, at a time to;

FIG. 4A illustrates a more detailed view of an antenna configuration optimization system (ACOS) of the cellular network system of FIG. 2A, at the time to;

FIG. 6 illustrates a chart 600 of data collected from a plurality of cellular towers.

DETAILED DESCRIPTION

Mobile network operators typically rely on a radio frequency (RF) drive test and simulation for them to plan and deploy their cellular towers, including the location, height, antenna vertical and horizontal direction (tilt and azimuth, respectively), and antenna transmit power (tx power). However, it might be challenging for those tools to capture and reflect the active user distribution where the users are associated or connected with a particular cell at any particular time. In addition, such RF drive tests only capture usage during the drive tests. The deployment of a cellular tower might not be matching the actual usage of the users, or the geographic distribution or the density of the users using the cellular towers, thereby resulting in issues such as poor radio signal strength or quality, overloaded, and the like, further resulting in bad user experiences.

There are two typical cases: (1) the actual location of users associated with a cell is close to the cellular tower while the tilt angle of the cellular tower is pointing toward the area far away from the tower, which is called "overshooting", and (2) the actual location of users associated with a cell is far away from the cellular tower while the tilt angle of the cellular tower is pointing toward the area close to the tower, which is called "undershooting". Overshooting will now be described in greater detail with reference to FIG. 1A.

Figure 1A:
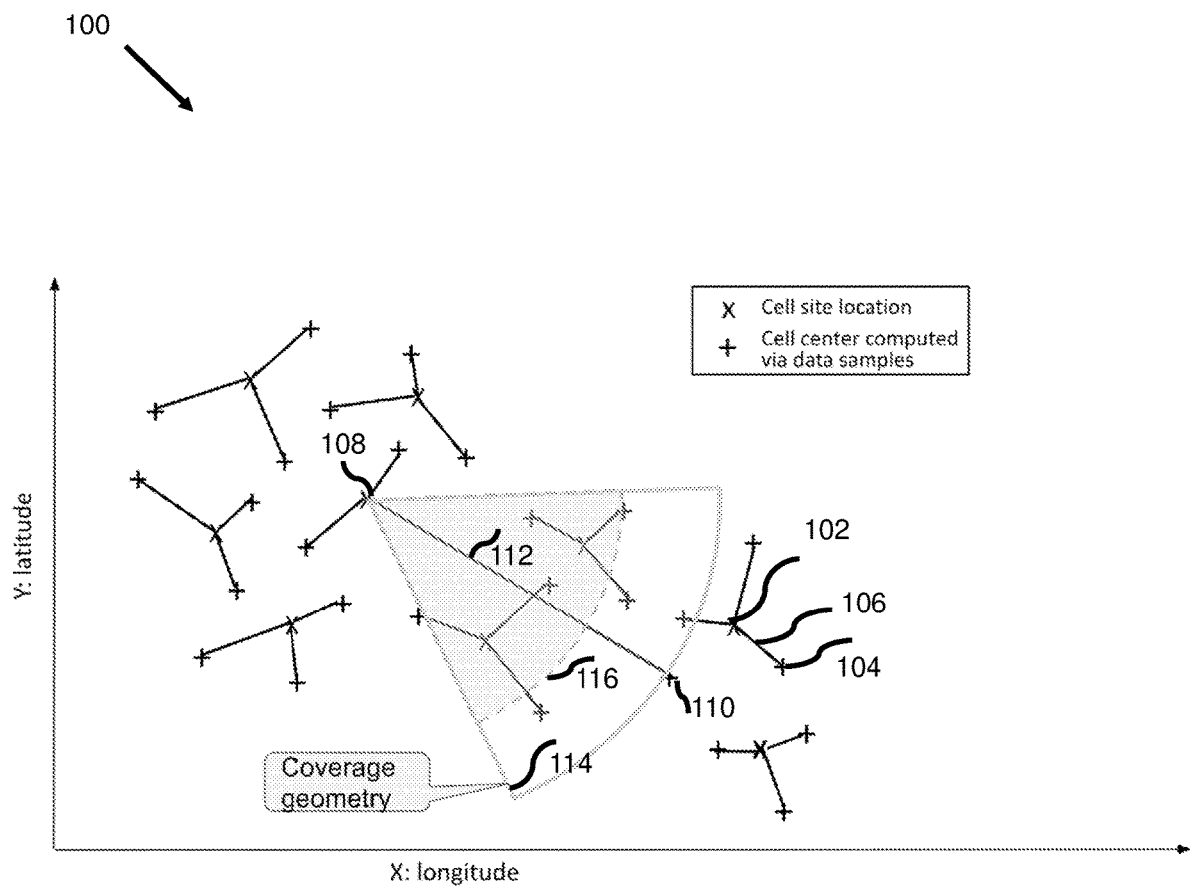
FIG. 1A illustrates a portion of a cellular network system, highlighting an overshooting of a cellular transmitter of a cellular tower.

FIG. 1A illustrates a portion 100 of a cellular network system, highlighting an overshooting of a cellular transmitter of a cellular tower. As shown in the figure, portion 100 of the cellular network system includes: a plurality of cellular towers, each being indicated with a respective "X", a sample of which is indicated as cellular tower 102; a plurality cell centers which are the centroids of geolocations samples of users associated with respective cells, each being indicated with a respective "+", a sample of which is indicated as cell center 104; and a plurality of lines indicating which cellular tower is servicing which cells associated with a cell center, a sample of which is indicated as service line 106. Of the cellular towers, a cell tower 108 that is overshooting is indicated with a "x," whereas of the cell centers, a cell center 110 is indicated with a "+." Cellular tower 108 is configured to service cell center 110 as indicated by line 112. The cell center 110 can be a centroid of all the latitude and longitude samples of the users associated or connected with the cell. The cell can be referred as its center location 110, e.g., cell 110. The cell tower can be referred as the cell tower location, e.g., cell tower 108. A cell tower can have one or multiple cells or cell centers, where these cells can be with one or multiple frequency bands.

In operation, each cellular tower enables a plurality of cellular devices to connect to the overall cellular network. The plurality of cellular devices that are services by a particular cellular tower are spread about an area. The center of such an area corresponds to the cell centers within FIG. 1A.

For purposes of discussion, a coverage geometry such as a cone 114 could be used to help illustrate an area associated with cell 110 at cellular tower 108. Note that this coverage geometry is not meant to stand for the actual coverage area, rather, it is used to measure and derive measures to detect whether a cell is overshooting or undershooting. Various shapes of the coverage geometry might be used, such as a cone shape, a square shape, a sector shape, and the like. As shown in the figure, cone 114 coverage geometry geo area covers a number of cellular towers locations. The overlap of coverage may cause interference with other cells with the cellular towers, may create repeated, unwanted hand-offs, and overall inefficiency of transmission power of cellular tower 108. It may be desired to shrink the coverage of cell 110 at cellular tower 108 until desired coverage is achieved. For example, a shrunk area indicated by coverage geometry 116 could be achieved, from the area of the coverage geometry 114, by tilting down the antenna tilts of cell 110, or reduce the transmit power of cell 110.

Undershooting will now be described in greater detail with reference to FIG. 1B.

Figure 1B:
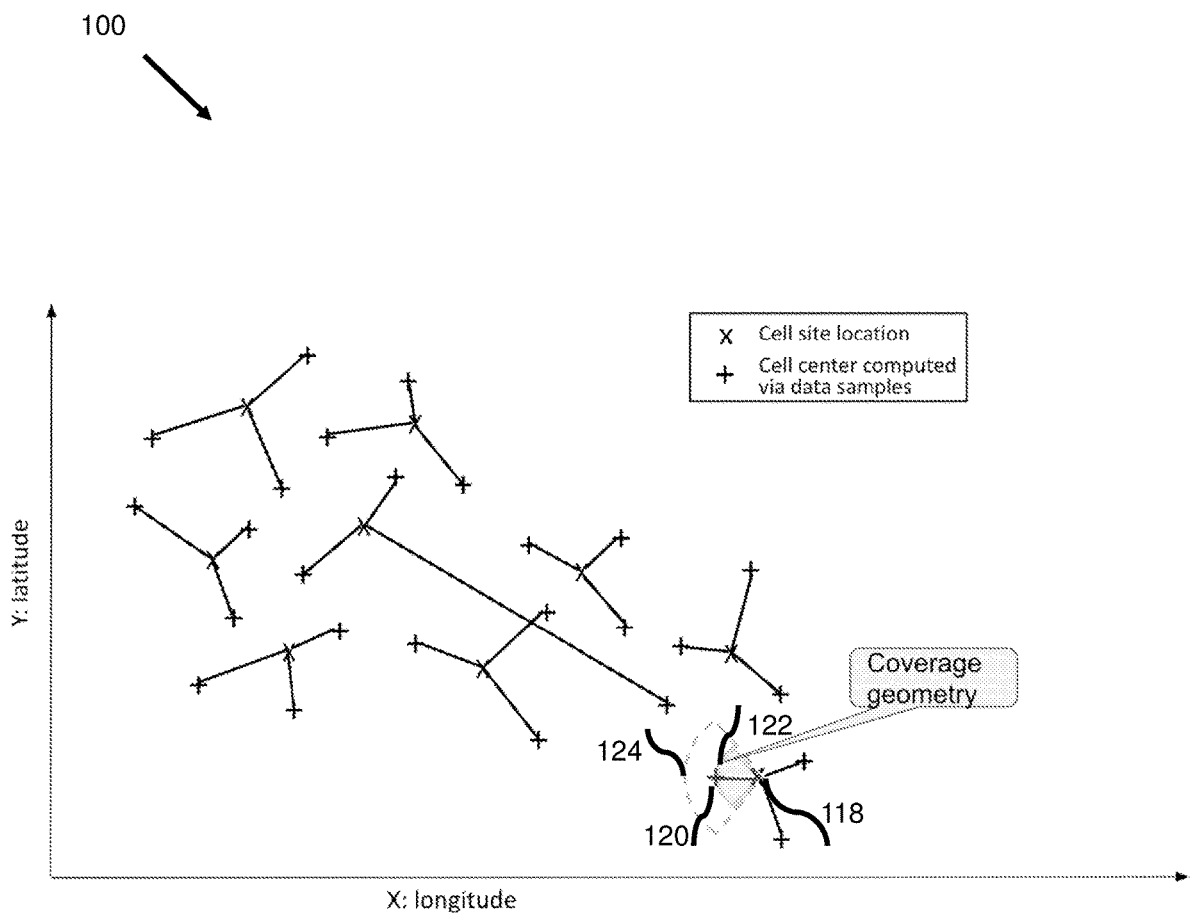
FIG. 1B illustrates the portion of the cellular network system of FIG. 1A, highlighting an undershooting of a cellular transmitter of a cellular tower.

FIG. 1B illustrates portion 100 of FIG. 1A, highlighting an undershoot of a cellular transmitter of a cellular tower. As shown in FIG. 1B, a cellular tower 118 provides service to a plurality of cellular devices about a cell center 120. A coverage geometry cone 122 is illustrated for cell center 120 at cellular tower 118. This coverage geometry 122 seems not covering other cell towers location, and it might be an undershoot case for cell 120. It may be desired to increase the coverage of cell 120 at cellular tower 118 until a desired coverage is achieved. An extended coverage geometry is illustrated as cone 124. Cell 120 could increase its transmit power, or tilt up the antenna tilts, to achieve from 122 to 124.

Note that throughout the description, cell, cell center, cell centroid might be used interchangeably, if not mentioned explicitly for their differences. A cellular site could consist of one or multiple sectors or cells, where a sector could consist of one or multiple cells. Cells and sectors could be used interchangeably, if not mentioned explicitly for their differences. A cellular site could consist of cells from one or multiple generations of cellular technologies, such as 2G, 3G, 4G, 5G. The cells or sectors at the same cellular site could be at one or multiple radio frequency bands. When a cell tower is described as undershooting or overshooting, it could be understood as a cell, or a sector at this cell tower, is undershooting or overshooting. When it says a cell location, it could be understood as the location of this cell's centroid or center, where the centroid or center are the centroid of the latitudes and longitudes of the samples associated with this cell. The samples could be the GPS measures from the mobile devices or user equipment (UE) such as mobile phone, tablet, and the like. The samples might be logged via the application running on the devices. The samples associated with a cell could be understood as the logged data samples including GPS, signal strength, signal quality, and the like, via the application running on the mobile device, where this mobile device is connected or associated with this cell. The samples logged could be stored in database in data infrastructure. The logged samples' associated cell's identifiers, the mobile operator's identification, and the like, could be also logged and stored. The data processing on the stored data samples can be carried out, to detect which cell might be undershooting, or overshooting, and recommend cell's antenna tilt tuning, and/or tx power tuning, and the like.

A system and method in accordance with aspects of the present disclosure identifies whether a cell at a cell tower is undershooting or overshooting if the cell location such as cell centroid location and the layout of the cellular towers are known. A system and method in accordance with aspects of the present disclosure pinpoints the most urgent cases of undershooting or overshooting. A system and method in accordance with aspects of the present disclosure further determines the optimal tilt angle and transmission power to improve the network performance and user experience.

An example cellular tower transmitter tilt control and transmit power control system and a corresponding process to be executed by a processor in accordance with aspects of the present disclosure will now be described in greater detail with reference to FIGS. 2A-19.

Figure 2A:
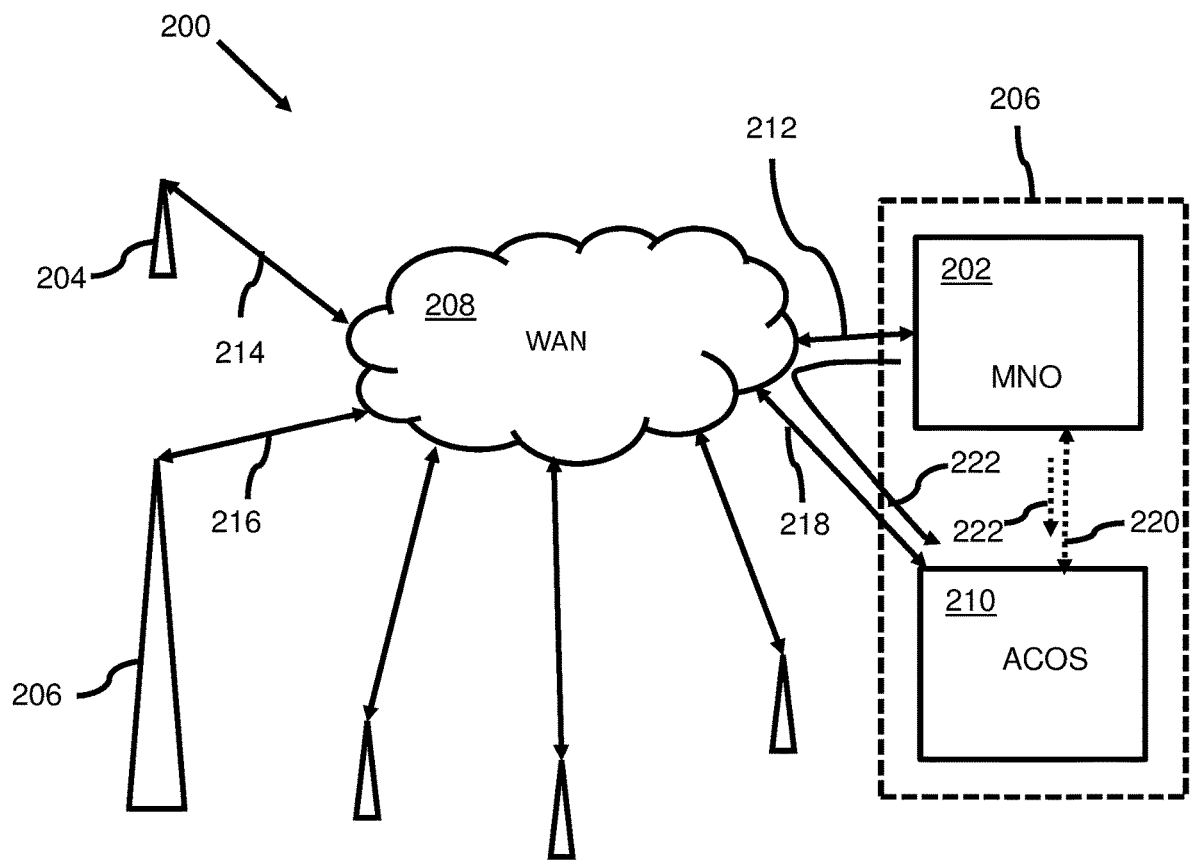

FIG. 2A illustrates a cellular network system 200 in accordance with aspects of the present disclosure, at a time to. As shown in the figure, cellular network system 200 includes: a mobile network operator (MNO) 202; a plurality of cellular towers, a sample of which are indicated as cellular tower 204 and cellular tower 206; a wide area network (WAN) 208; and an antenna configuration optimization system (ACOS) 210. It should be noted that cellular tower 206 is illustrated to be larger than the remaining cellular towers. This is merely to draw particular attention to cellular tower 206, as it will be used as an example cellular tower throughout the present disclosure.

MNO 202 is configured to communicate with WAN 208 via a communication channel 212. Each of the cellular towers are configured to communicate with WAN 208 via a respective communication channel, a sample of which includes communication channel 214 and communication channel 216. Communication channel 214 is configured to enable cellular tower 204 to communicate with WAN 208, whereas communication channel 216 is configured to enable cellular tower 206 to communicate with WAN 208.

MNO 202 is a server of a MNO company that provides mobile communication services to customers. MNOs (the companies) own and operate the wireless network infrastructure, including cell towers, base stations, and other equipment, that enables mobile devices to communicate with each other and access the internet.

MNOs typically offer a variety of mobile communication services, such as voice calling, messaging, and mobile internet access, to both individual and business customers. They also manage the allocation and management of phone numbers and other resources, as well as the billing and customer support functions associated with these services.

WAN 208 may be any network that includes at least one of the internet, the cellular network, and the public switched telephone network (PSTN) and that allows for the exchange of data and communication across a wide geographic area. The internet is a global network of interconnected computer networks that allows for the exchange of information through a variety of protocols and services. It is accessible through a range of devices, including desktop and laptop computers, mobile devices, and internet of things (IoT) devices. The cellular network is a wireless network infrastructure that enables mobile devices, such as smartphones and tablets, to connect to the internet and communicate with other devices through radio signals. It is owned and operated by the MNOs, and is accessible through a variety of cellular data plans and devices. The PSTN, also known as the plain old telephone service (POTS), is a traditional telecommunications network that uses copper wires and circuit-switched technology to transmit voice calls over long distances. It has been largely replaced by digital communication technologies, but is still used in many parts of the world for basic telephone communication.

In a WAN that includes at least one of the internet, the cellular network, and the PSTN, these three networks are interconnected through a variety of technologies, such as fiber optic cables, satellite links, and radio waves. This allows for seamless communication and data exchange between devices on each of the networks, enabling users to access a wide range of services and information from anywhere in the world. For example, a user with a smartphone could make a voice call to someone on a landline phone through the PSTN, send a text message to a friend using the cellular network, and access the internet to browse websites or stream videos, all from the same device.

In some instances, ACOS 210 is configured to communicate with WAN 208 via a communication channel 218. In some instances, ACOS 210 is configured to communicate directly with MNO 202 via a communication channel 220.

In operation, each cellular tower provides an upstream and downstream service to a plurality of cellular devices within the beam profile of its cellular transmitter. More particularly, each cellular tower: is located in a particular respective location; has its respective cellular transmitter located at a particular height off the ground; has its respective cellular transmitter tilted in a particular respective angle; has its respective cellular transmitter arranged at a particular respective azimuth; and has its respective cellular transmitter transmitting at a particular respective transmit power.

Further, while providing upstream and downstream service to the cellular devices within the beam profile of its cellular transmitter, each cellular tower collects information and data from the cellular devices within the beam profile of its cellular transmitter. This collected data is shared with MNO 202 via WAN 208. The information and data includes: the amount of upstream/downstream traffic, i.e., congestion, and the time of such amounts for each cellular tower; the number of cellular devices associated with each cellular tower, and the respective times of associated. MNO 202 additionally maintains data associated with each respective cellular tower, including: a current respective location; a cellular transmitter height off the ground; a current cellular transmitter tilt; a current cellular transmitter azimuth; and a current cellular transmitter transmit power.

At any time, any of the cellular transmitters may be configured such that they overshoot or undershoot, as discussed above with reference to FIGS. 1A-B. In accordance with aspects of the present disclosure, ACOS 210 addresses this issue.

In particular, in accordance with aspects of the present disclosure, ACOS 210 is configured to determine whether a cellular transmitter of a cellular tower is overshooting or undershooting. Further, in accordance with aspects of the present disclosure, ACOS 210 is configured to adjust the tilt and/or the transmission power for any of the cellular transmitters to correct for such overshooting or undershooting, thereby optimizing efficiency of any of the cellular towers. This will be described in greater detail with reference to FIG. 3.

Figure 3:
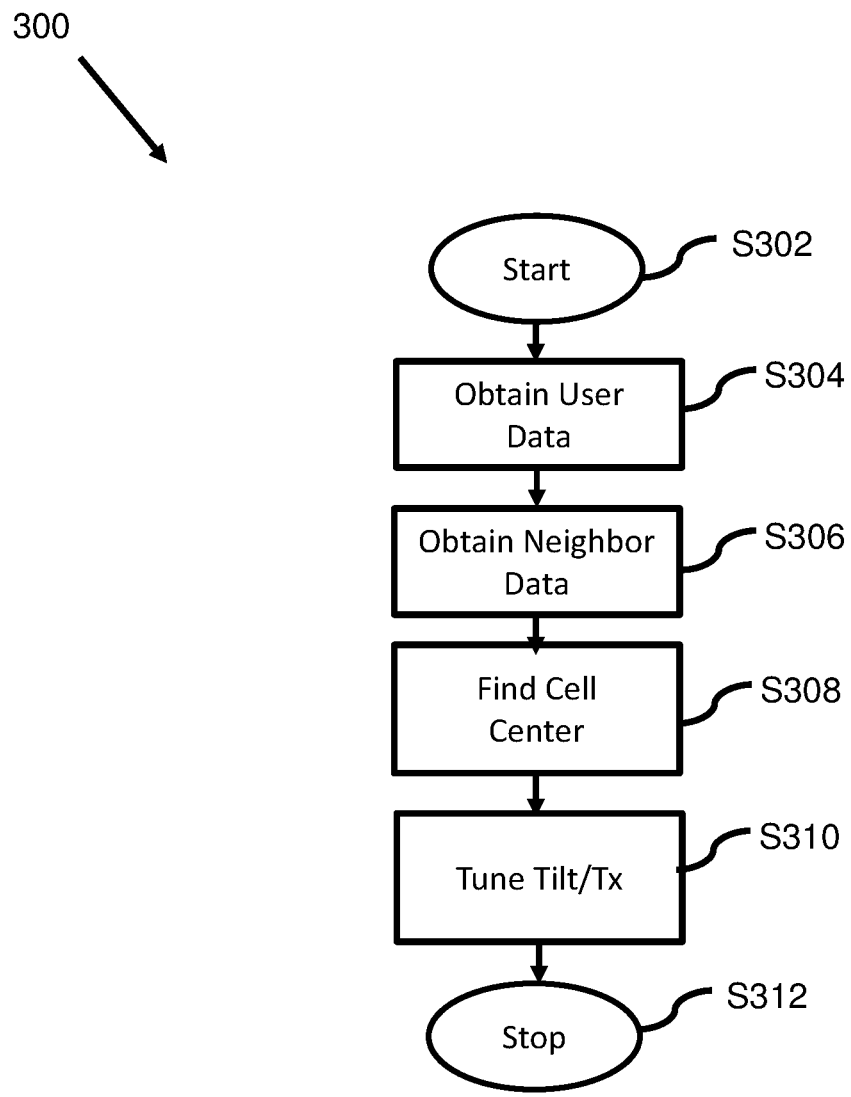
FIG. 3 illustrates a process to be executed by a processor to tune the tilt and/or the transmission power of a cellular transmitter of a cellular tower in accordance with aspects of the present disclosure.

FIG. 3 illustrates a process 300 to be executed by a processor to tune the tilt and/or the transmission power of a cellular transmitter of a cellular tower in accordance with aspects of the present disclosure.

As shown in the figure, process 300 starts (S302) and user data is obtained (S304). For example, as shown in FIG. 2A, MNO 202 provides user data 222 to ACOS 210. In some instances, MNO 202 provides user data 222 to ACOS 210 via communication channel 212, via WAN 208 and via communication channel 218. In some instances, MNO 202 provides user data 222 to directly to ACOS 210 via communication channel 220.

In some instances, the user data may additionally include a priori user data related to historical user data. For example, in some instances MNO 202 may collect and store user data over a period of time, non-limiting examples of which includes hours, days, weeks or years.

In some instances, MNO 202 may additionally use the a priori data with a neural network to determine trends in user bandwidth. For example, a priori data collected over a time period may indicate from output from a neural network that user traffic for a particular cellular tower increases during the workweek, but decreases during the weekend. In another non-limiting example, a priori data collected over a time period may indicate from output from a neural network that user traffic for a particular cellular tower increases daily during a time period from 8 am to 8 pm, but decreases between the time period 8 pm to 8 am. In another non-limiting example, a priori data collected over a time period may indicate from output from a neural network that downstream traffic from a particular cellular tower is greater than upstream traffic between the time period of 5 pm to 9 pm.

In some instances, the MNO may include reference signal received power (RSRP) and/or the reference signal received quality (RSRQ) for a particular cellular tower. RSRP is a received signal strength indicator (RSSI) type of measurement. It is the power of the cellular network reference signals spread over the full bandwidth and narrowband. RSRQ indicates the quality of the received reference signal. The RSRQ measurement provides additional information when RSRP is not sufficient to make a reliable handover or cell reselection decision.

In some instances, the MNO 202 could upload the site layout to the ACOS 210. The uploaded the layout can include information such as cell sites locations, cell sites to cell mapping which indicates which sites have which cells, MNO could also upload the parameters of the configurations of the cells, sectors, and sites to the ACOS 210. The uploaded parameters and configurations can include information such as the geo locations of the sites, cell's antenna electric tilt, mechanical tilt, antenna height, tx power, and the like. The ACOS might be owned or maintained by other entities than MNO. The ACOS could be owned by the entity who owns the applications software, and who logs the data samples via the application, where the data samples can include cell identifiers, mobile device GPS locations, associated measures of signal strength, signal quality and the like at the GPS locations, and who stores the data, processes the data, and generate the overshoot, undershoot detections such as which cells are overshooting and which cells are undershooting, recommendations of tilt tuning, tx power tuning for cells.

In some instances, the ACOS 210 logs the data samples. The data samples could be the GPS measures from the mobile devices or user equipment (UE) such as mobile phone, tablet, and the like. The samples might be logged via the application running on the devices. The samples associated with a cell could be understood as the logged data samples including GPS, signal strength, signal quality, and the like, via the application running on the mobile device, where this mobile device is connected or associated with this cell. The samples logged could be stored in database in data infrastructure. The logged samples' associated cell's identifiers, the mobile operator's identification, and the like, could be also logged and stored. The data processing on the stored data samples can be carried out, to detect which cell might be undershooting, or overshooting, and recommend cell's antenna tilt tuning, and/or tx power tuning, and the like. The outcomes such as overshoot/undershoot detection, the recommended tilt tuning, tx power tuning, can be visualized or output on software such as browser based portal via user interface (UI). The MNO could be the users of the software. The software could have map view and data table view. On the map view, the MNO can visually check the detected overshoot, undershoot cells, and the recommended tuning of the tilts, tx power. On the table view, the MNO can select cells, sort cells, compare cells, and the like. The MNO can download the output table or tables from the ACOS 210, and the results can be further analyzed or processed by MNO for actions or tunings in the cellular system or the cellular towers/cells.

In some instances, the ACOS 210 could include a data analytics and processing platform, which include data logging, data storage, data processing, data visualization of map view, table view, data uploading from MNO, data downloading by MNO, and the like.

Returning to FIG. 3, after the user data is obtained (S304), neighbor data is obtained (S306). This will be described in greater detail with reference to FIG. 2B.

Figure 2B:
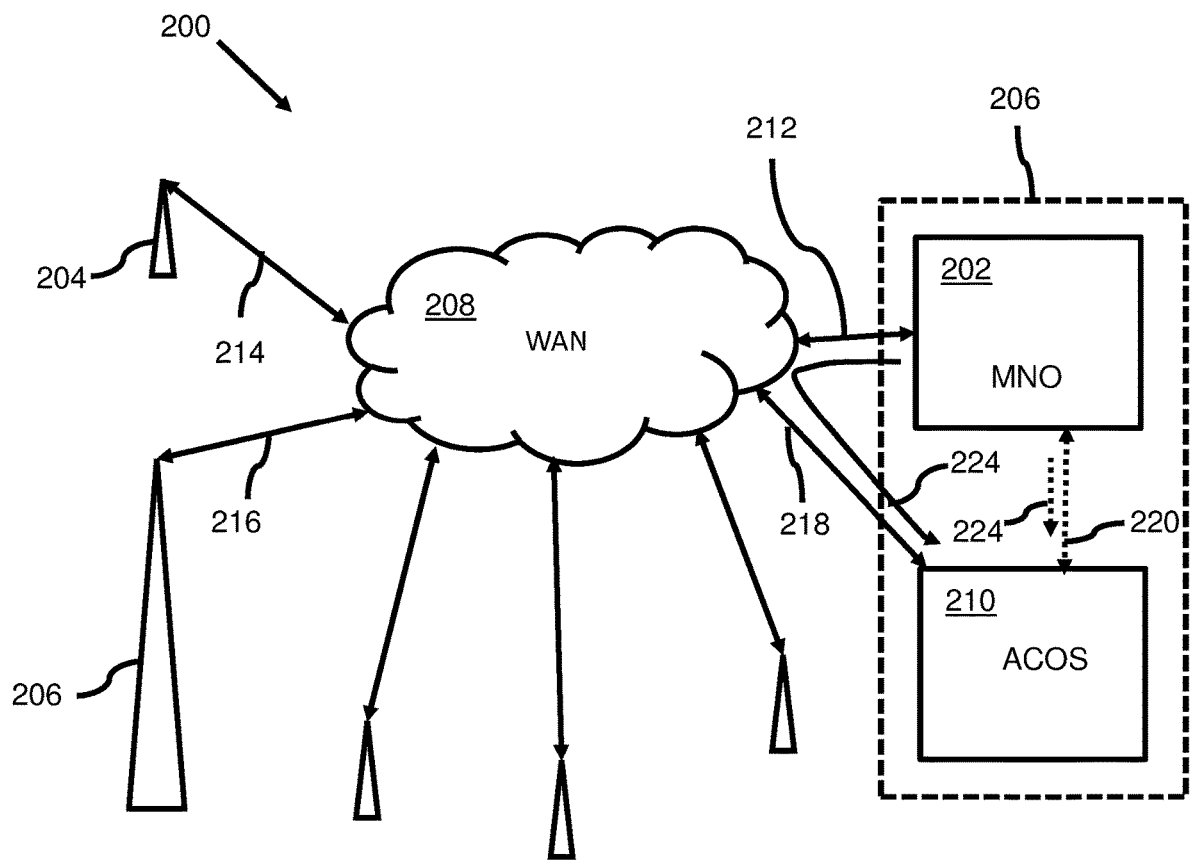
FIG. 2B illustrates the cellular network system of FIG. 2A, at a time $t_1$.

FIG. 2B illustrates the cellular network system of FIG. 2A, at a time $t_1$. As shown in FIG. 2B, MNO 202 provides neighbor data 224 to ACOS 210. In some instances, MNO 202 provides neighbor data 224 to ACOS 210 via communication channel 212, via WAN 208 and via communication channel 218. In some instances, MNO 202 provides neighbor data 202 to directly to ACOS 210 via communication channel 220.

Neighbor data for a particular cellular tower includes data associated with other cellular towers that might provide overlapping coverage. For example, returning to FIG. 1A, the neighboring data for cell tower 108 may include data associated with neighboring cell towers that provide coverage within cone 114. The neighboring data may include, for each neighboring cellular tower, a current respective location; a cellular transmitter height off the ground; a current cellular transmitter tilt; a current cellular transmitter azimuth; and a current cellular transmitter transmit power.

Returning to FIG. 3, after the neighbor data is obtained (S306), the cell center is found (S308). For example, as shown in FIG. 2A, ACOS 210 may determine the cell center. This will be described in greater detail with reference to FIG. 4A.

Figure 4A:
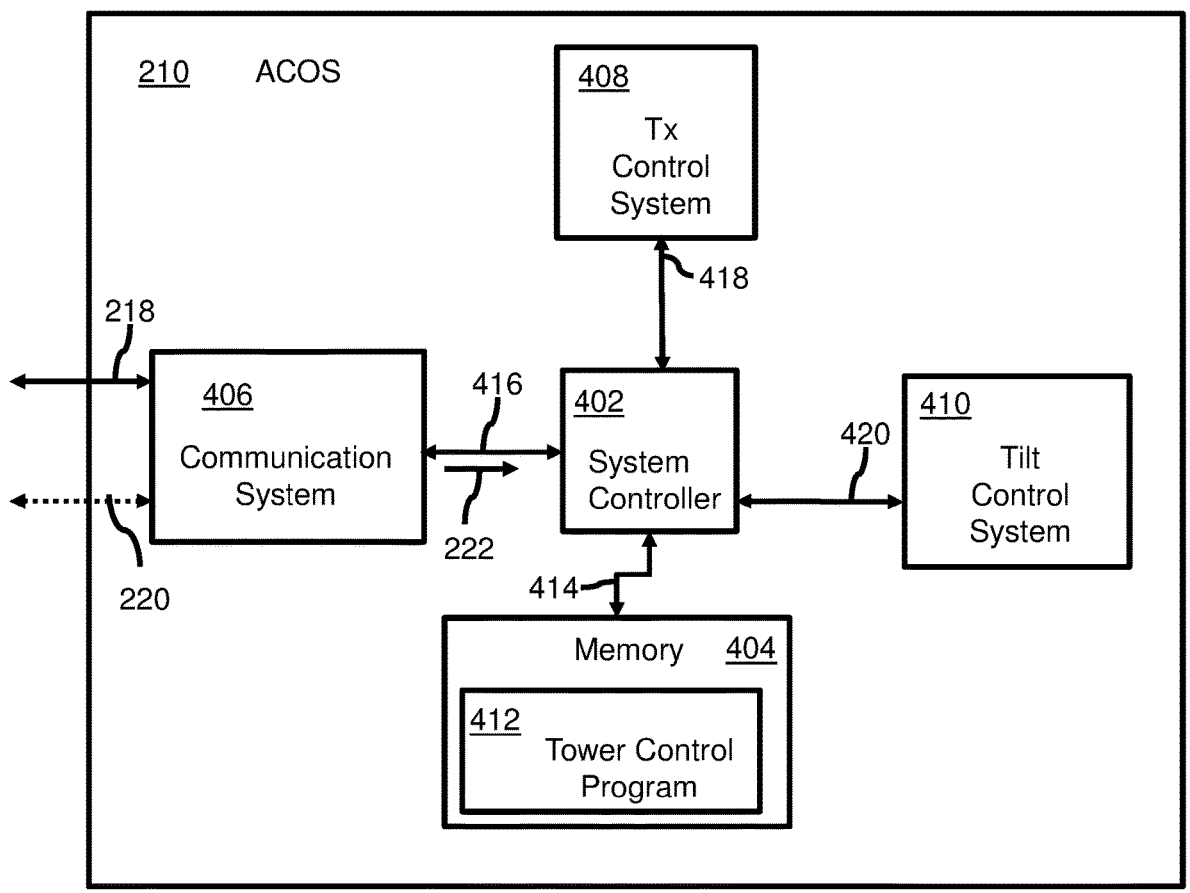

FIG. 4A illustrates a more detailed view of ACOS 210, at the time $t_0$.

As shown in the figure, ACOS 210 includes a system controller 402, a memory 404, a communication system 406, a transmit power control system 408, and a tilt control system 410. Memory 404 has stored therein data and instructions including a tower control program 412 to be executed by system controller 402.

System controller 402 may be any device or system that is configured to control general operations of ACOS 210 and includes, but is not limited to, a central processing unit (CPU), a hardware microprocessor, a single core processor, a multi-core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of ACOS 210.

Memory 404 may be any device or system capable of storing data and instructions used by ACOS 210 and includes, but is not limited to, random-access memory (RAM), dynamic random-access memory (DRAM), a hard drive, a solid-state drive, read-only memory (ROM), erasable programmable read-only memory (EPROM), electrically erasable programmable read-only memory (EEPROM), flash memory, embedded memory blocks in an FPGA, or any other various layers of memory hierarchy.

In this example, system controller 402, memory 404, communication system 406, transmit power control system 408, and tilt control system 410 are illustrated as individual devices of ACOS 210. However, in some examples, at least two of system controller 402, memory 404, communication system 406, transmit power control system 408, and tilt control system 410 may be combined as a unitary device. Further, in some examples, at least one of system controller 402, memory 404, communication system 406, transmit power control system 408, and tilt control system 410 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to system controller 402 such that the processor may read information from, and write information to the tangible computer-readable media. In the alternative, the tangible computer-readable media may be integral to system controller 402. System controller 402 and the tangible computer-readable media may reside in an integrated circuit (IC), an ASIC, or large scale integrated circuit (LSI), system LSI, super LSI, or ultra LSI components that perform a part or all of the functions described herein. In the alternative, system controller 402 and the tangible computer-readable media may reside as discrete components.

Example tangible computer-readable media may be also coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Tower control program 412 controls the operations of ACOS 210. Tower control program 412, having a set (at least one) of program modules, may be stored in memory 404 by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various examples as described herein.

In some examples, as will be described in greater detail below, tower control program 412 includes instructions, that when executed by system controller 402, cause ACOS 210 to: determine, based on a priori user data stored in memory 404, whether to instruct a cellular transmitter to at least one of: move to a new tilt angle; and change to a new transmission power; and instruct, based on the determination, the cellular transmitter to at least one of: move to the new tilt angle; and change to the new transmission power.

In some examples, as will be described in greater detail below, tower control program 412 includes instructions, that when executed by system controller 402, cause ACOS 210 to: collect new user data; determine a current tilt angle of the cellular transmitter and current transmission power of the cellular transmitter; determine, based on the a priori user data and the new user data, whether to instruct the cellular transmitter to at least one of: move to another tilt angle; and change to another transmission power; and instruct, based on the determination, the cellular transmitter to at least one of: move to the another tilt angle; and change to the another transmission power.

In some examples, as will be described in greater detail below, tower control program 412 includes instructions, that when executed by system controller 402, cause ACOS 210 to collect reference signal received power data and reference signal received quality data as the new user data.

In some examples, as will be described in greater detail below, tower control program 412 includes instructions, that when executed by system controller 402, cause ACOS 210 to collect congestion data as the new user data.

In some examples, as will be described in greater detail below, tower control program 412 includes instructions, that when executed by system controller 402, cause ACOS 210 to: collect information related to a neighboring cellular transmitter; determine a current tilt angle of the cellular transmitter and current transmission power of the cellular transmitter; determine, based on the information related to the neighboring cellular transmitter, whether to instruct the cellular transmitter to at least one of: move to another tilt angle; and change to another transmission power; and instruct, based on the determination, the cellular transmitter to at least one of: move to the another tilt angle; and change to the another transmission power.

In some examples, as will be described in greater detail below, tower control program 412 includes instructions, that when executed by system controller 402, cause ACOS 210 to: determine, based on a radius of the neighboring cellular transmitter as the information related to the neighboring cellular transmitter, whether to instruct the cellular transmitter to at least one of: move to another tilt angle; and change to another transmission power; and instruct, based on the determination, the cellular transmitter to at least one of: move to the another tilt angle; and change to the another transmission power.

In some examples, as will be described in greater detail below, tower control program 412 includes instructions, that when executed by system controller 402, cause ACOS 210 to: collect information related to a positive integer number n of neighboring cellular transmitters; determine a current tilt angle of the cellular transmitter and current transmission power of the cellular transmitter; determine, based on the information related to the positive integer number n of neighboring cellular transmitters, whether to instruct the cellular transmitter to at least one of: move to another tilt angle; and change to another transmission power; and instruct, based on the determination, the cellular transmitter to at least one of: move to the another tilt angle; and change to the another transmission power.

System controller 402 is configured: to communicate with memory 404 via a communication channel 414; to communicate with communication system 406 via a communication channel 416; to communicate with transmit power control system 408 via a communication channel 418; and to communicate with tilt control system 410 via a communication channel 420.

Communication system 406 may be any device or system that is configured to communicate with MNO 202, either directly, or via WAN 208. Communication system 406 can include one or more connectors, such as RF connectors, Ethernet connectors, wireless communications circuitry such as 5G transceivers, and one or more antennas. Communication system 406 transmits and receives data from WAN 208 via communication channel 218 by known methods, non-limiting examples of which include terrestrial antenna, satellite dish, wired cable, DSL, optical fiber, or 5G. In some instances, communication system 406 may optionally communicate directly with MNO 202 as indicated by optional communication channel 220. Further, in some cases, communication system 406 may be incorporated into MNO 202 as indicated by dotted box 206.

Transmit power control system 408 may be any device or system that is configured to determine an amount of adjustment to the transmit power of a cellular transmitter of a cellular tower. Transmit power control system 408 may be implemented as a CPU, a hardware microprocessor, a single core processor, a multi-core processor, FPGA, a microcontroller, an ASIC, a DSP, or other similar processing device capable of executing any type of instructions, algorithms, or software for determining an amount of adjustment to the transmit power of a cellular transmitter of a cellular tower.

Tilt control system 410 may be any device or system that is configured to determine an amount of adjustment to the tilt of a cellular transmitter of a cellular tower. Tilt control system 410 may be implemented as a CPU, a hardware microprocessor, a single core processor, a multi-core processor, FPGA, a microcontroller, an ASIC, a DSP, or other similar processing device capable of executing any type of instructions, algorithms, or software for determining an amount of adjustment to the tilt of a cellular transmitter of a cellular tower.

In operation, communication system 406 receives user data 222 from MNO 202, either via communication channel 220 or communication channel 218. Upon receipt, communication system 406 provides user data 222 to system controller 402. As will be described in more detail below, system controller 402 executes instructions in tower control program 412 to determine the cell center based on the user data 222.

Returning to FIG. 3, after the cell center is found (S308), the tilt and/or the transmission power of the cellular transmitter of the cellular tower is tuned (S310) and process 300 stops (S312). This will be described in greater detail with reference to FIGS. 4C-E and 2C.

Figure 4B:
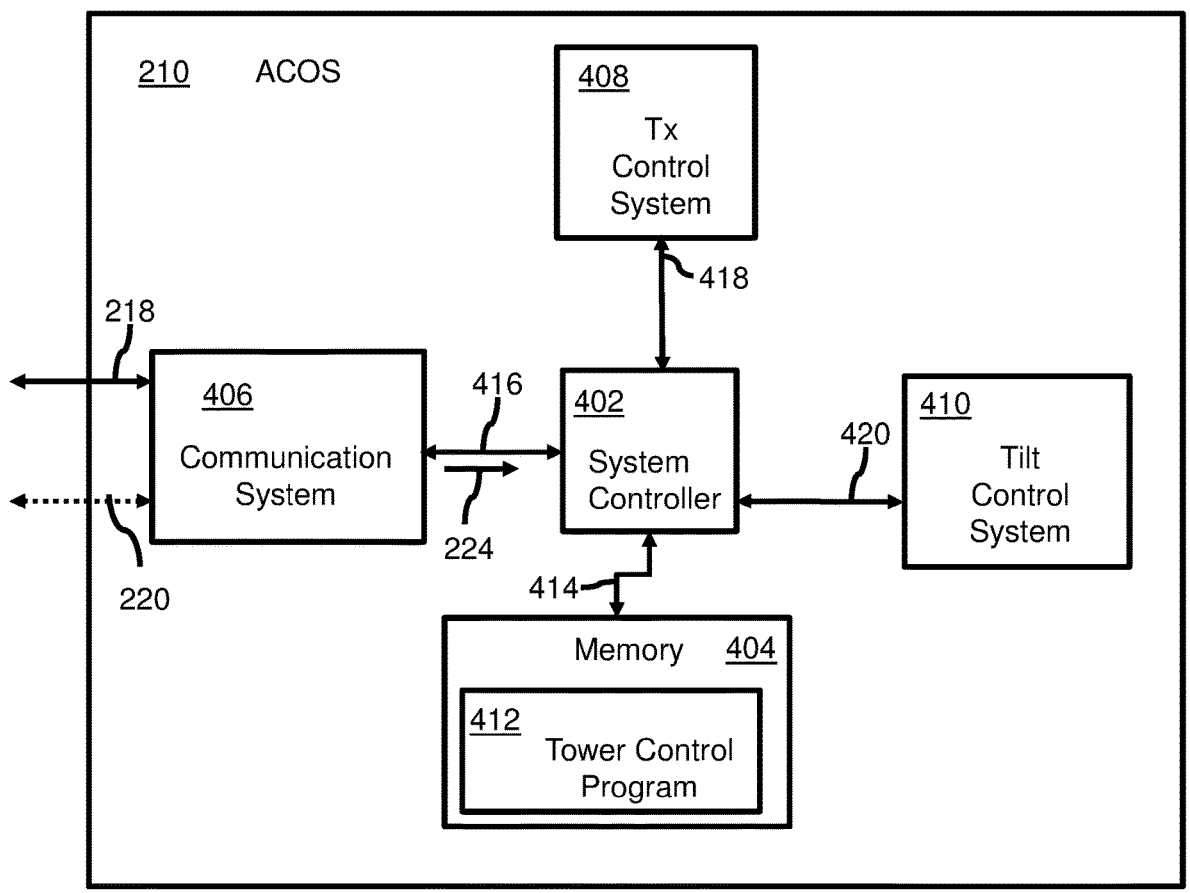
FIG. 4B illustrates the ACOS of FIG. 4A, at the time $t_1$.
Figure 4C:
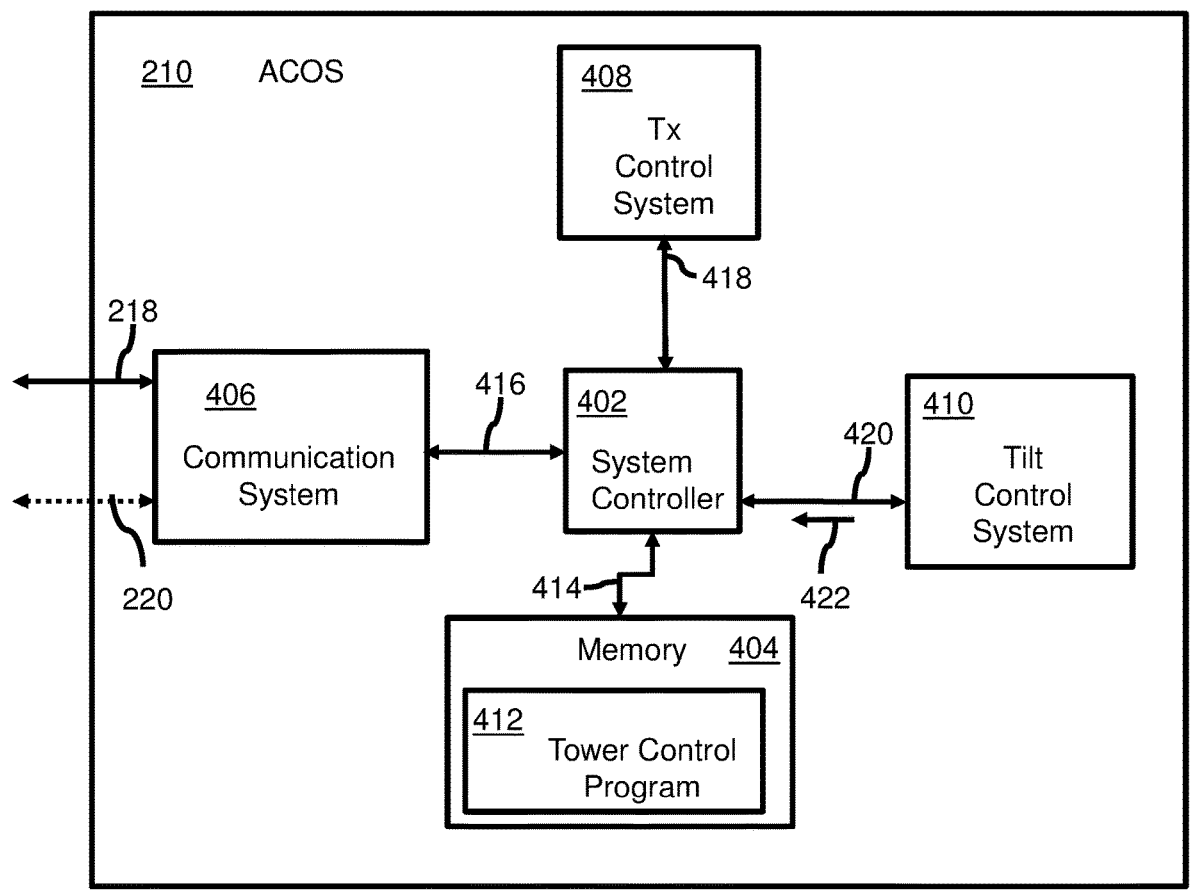
FIG. 4C illustrates the ACOS of FIG. 4A, at a time $t_2$.

FIG. 4C illustrates ACOS 210, at a time $t_2$.

As shown in FIG. 4C, tilt control system 410 is configured to determine how much to tilt, if at all, the cellular transmitter of the cellular tower. Tilt control system 410 generates a tilt control signal 422 and outputs tilt control signal 422 to system controller 402 via communication channel 420.

Figure 4D:
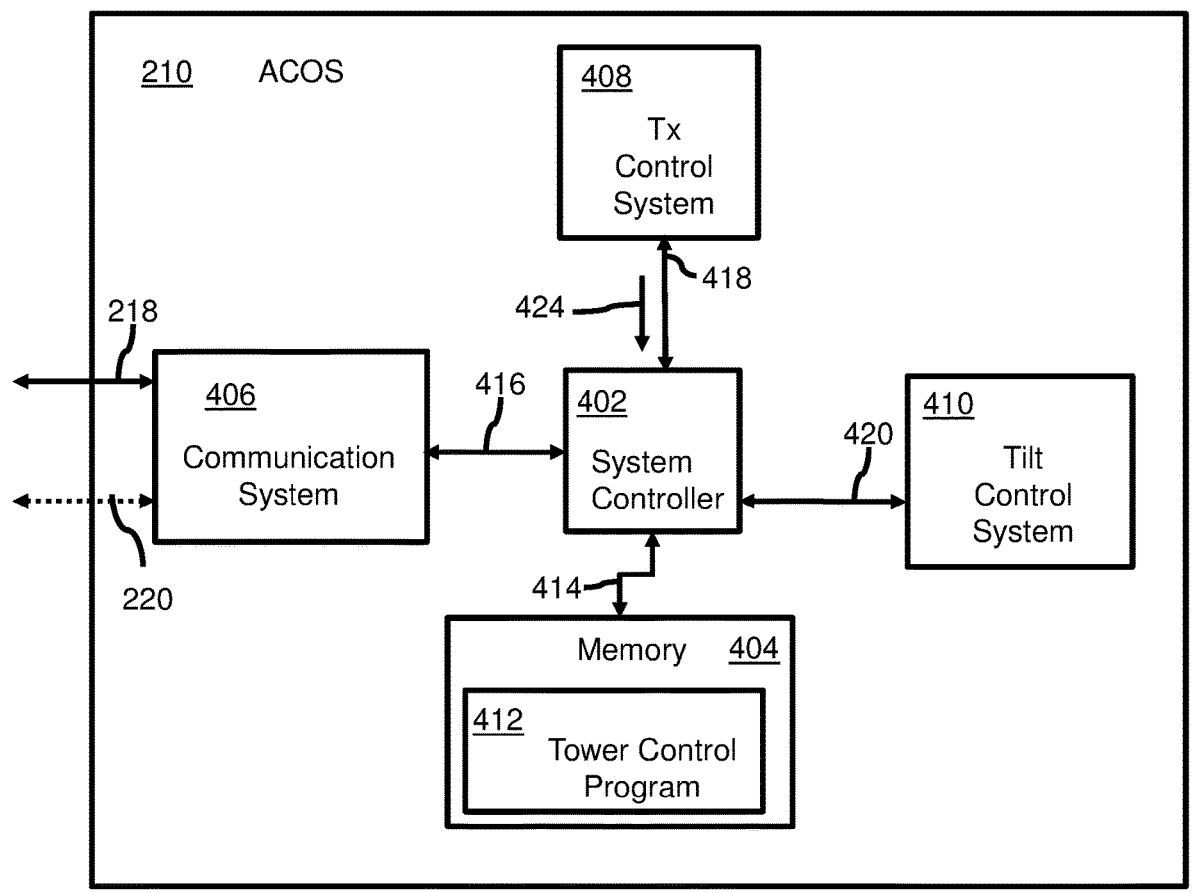
FIG. 4D illustrates the ACOS of FIG. 4A, at a time $t_3$.

FIG. 4D illustrates ACOS 210, at a time $t_3$.

As shown in FIG. 4D, transmit power control system 408 is configured to determine how much to adjust, if at all, the transmit power of the cellular transmitter of the cellular tower. Transmit power control system 408 generates a transmit power control signal 424 and outputs transmit power control signal 424 to system controller 402 via communication channel 418.

Figure 4E:
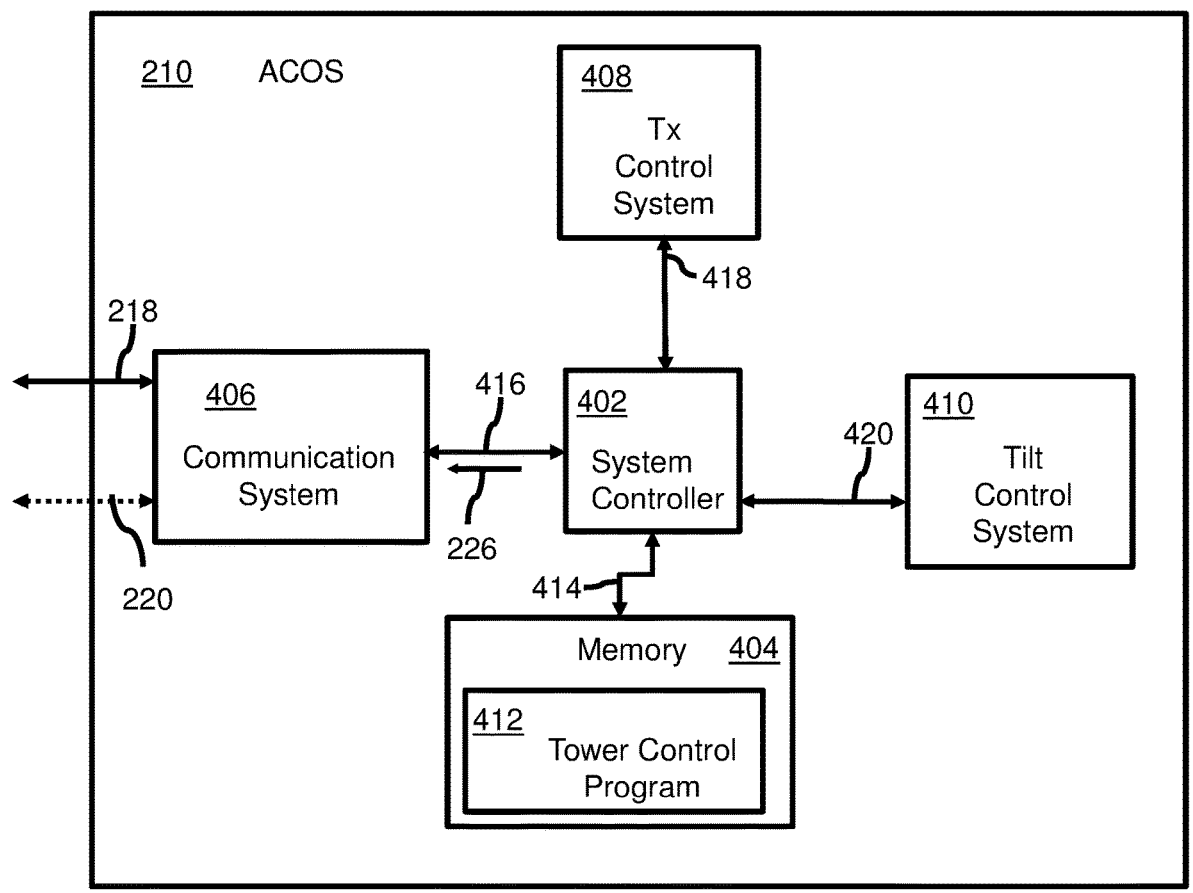
FIG. 4E illustrates the ACOS of FIG. 4A, at the time $t_4$.

FIG. 4E illustrates ACOS 210, at the time $t_4$.

As shown in FIG. 4E, system controller 402 is configured to output a control signal 226, based on tilt control signal 422 from tilt control system 410 and based on power control signal 424, to cellular tower 206.

Figure 2C:
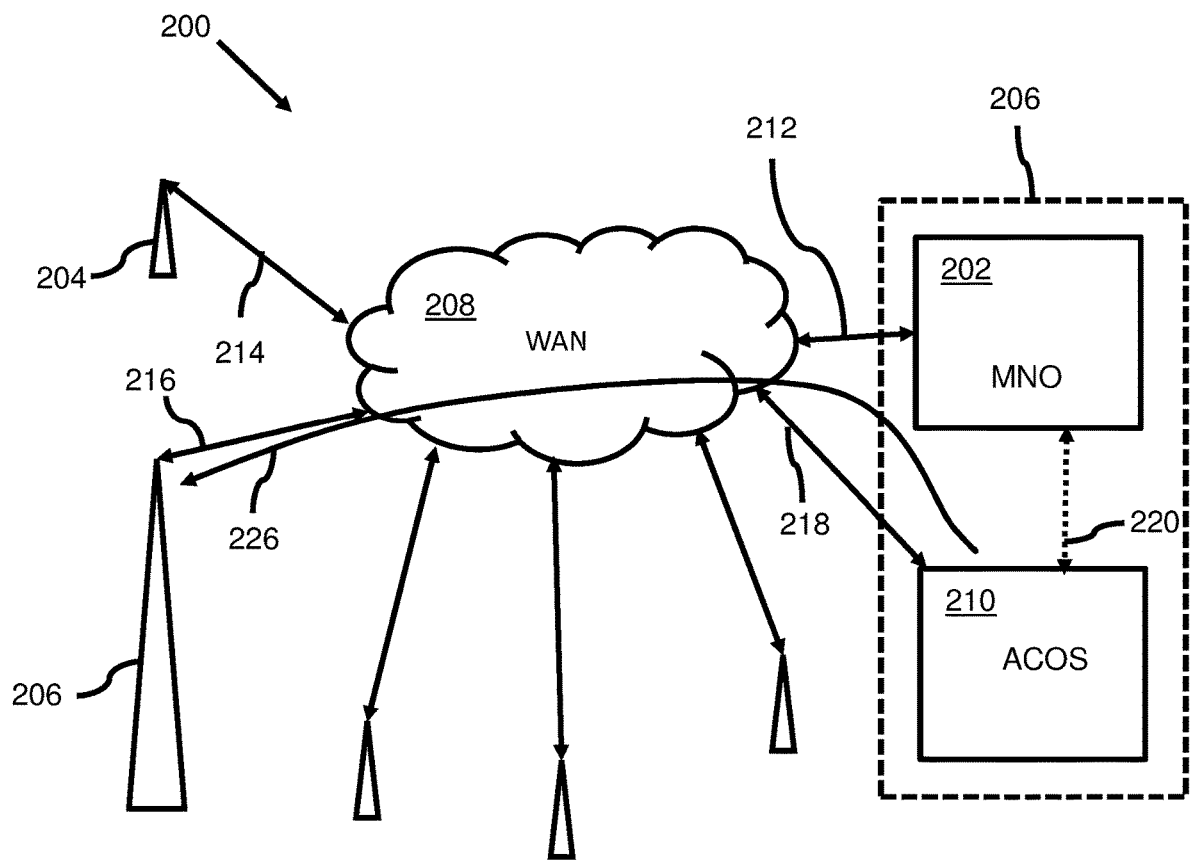
FIG. 2C illustrates the cellular network system of FIG. 2A, at a time $t_4$.

FIG. 2C illustrates cellular network system 200, at a time $t_4$. As shown in the figure, ACOS 210 outputs control signal 226 to cellular tower 206 via communication channel 218, WAN 208 and communication channel 216. In response to receiving control signal 226, cellular tower 206 will adjust the tilt and the transmit power of the cellular transmitter of cellular tower 206, to increase efficiency of cellular tower 206.

Note throughout the description, ACOS 210 is interchangeable to antenna configuration optimization system, antenna optimization system, tower optimization system, tower reconfiguration system, antenna reconfiguration system, and the like.

In some instances, a cell can have one or multiple antennas, and data samples associated with cells can be collected via application, where the data samples are with the information of device location, at this location the received signal strength or quality of the reference signal, such as RSRP, RSRQ and the like, download speed, latency, the cell identifier of the cell serving the device, the cell's frequency band related information, time stamps including date, hour and the like at the time of the data collection, and the like. The data samples then can be aggregated at the cell identification level, to get the cell level data. The cell level data can be aggregated of the data samples collected from multiple devices connected to this cell. Each device can have multiple data samples across a period of time. The aggregation of data samples at cell level could refer as to, for example, getting the statistics of the data samples, such as median of the RSRP, or RSRQ, percentile p10 or p90 values of the measured metrics samples for a certain cell. The aggregation can also include, for example, getting the cell centroid of the data samples of locations (such as latitude, longitude) coverage area of this cell, the cell radius of the location samples coverage area of this cell. The location samples may cover a certain geographic area, and the radius of the area could be derived. In some instances, the data samples could be firstly cleaned, for example, the outliers of the location samples could be firstly removed, then the remainder of the data samples can be used to compute and derive the cell centroid or cell center of this cell's coverage area, and the radius of the cell coverage area.

In some instances, tower control program 412 may have instructions stored therein, that when executed by system controller 402, cause communication system 406 to obtain cell to site mapping information from MNO 202, wherein the cell to site mapping information indicates the relationship of which cells belong to which cell sites. In some instances, tower control program 412 may have instructions stored therein, that when executed by system controller 402, cause ACOS 210 to obtain cell to site mapping information by any other known manner.

Besides the cell to site mapping information, tower control program 412 may have instructions stored therein, that when executed by system controller 402, cause communication system 406 to obtain additional information, such as site location information, cell antenna configuration including electric tilt, mechanical tilt, transmit power, azimuth, and the like. For example, three cells can be on a same cell site, where this cell site can have a site location such as latitude and longitude. In such a case, each of these three cells may have a respective frequency band, and each of these three cells can have a respective configuration of the electric tilt, mechanical tilt, and transmit power. In some instances, one cell may have one or multiple antennas, where the antennas are configured together as a group, meaning they share the same configuration such as the same electric tilt, same mechanical tilt, and same transmit power. In some instances, on a same cell site, multiple cells may be in a group to have the same configuration, wherein each cell being with one or multiple antennas, and wherein in these cells, all the antennas may have the same tilt, transmit power and the like. When the parameters of tilt including electric tilt, mechanical tilt, transmit power, are to be reconfigured to new values, all these antennas in a group which share the same configuration, may be tuned or reconfigured to the same values of the parameters. In some instances, one cell site has multiple cells, one cell has one antenna, and each cell's antenna configuration and reconfiguration can be done at per cell bases, and cell's antenna parameters such as tilts (such as electric tilt, mechanical tilt, sum or total of the electrical tilt and mechanical tilt), transmit power can be reconfigured to new values for this particular cell, wherein there is no need to be in a group.

In some instances, data samples can be aggregated at the cell site level, based on the information related to the cell to site mapping. The data samples associated with those cells associated to one cell site, can be used as all the data samples associated with this cell site. As such, by aggregating these data samples, the cell site level of the aggregation can be derived. The aggregation of data samples at site level could refer as to, for example, getting the statistics of the data samples associated with all the cells on this cell site, such as median of the RSRP, or RSRQ, percentile p10 or p90 values of the measured metrics samples for a certain cell, or it could be weighted average of the cell level aggregation, with the weights being the number or count of samples of each cell, where these cells are on this same cell site.

In some instances, tower control program 412 may have instructions stored therein, that when executed by system controller 402, cause ACOS 210 to detect whether a cell is overshooting or undershooting can be detected, based on location related information, measured metrics information, and the like. The information used in detection can include, for example: cell site location information; cell to cell site mapping indicating a relationship of one or multiple cells belonging to a cell site; cell centroid location information, which can be determined based on location information of the data samples; cell radius information, which can be determined based on location information of the data samples; a distance between a cell site location and a cell centroid location; a count of additional neighboring cell sites within a coverage geometry of a cell; a count of additional neighboring cell centroids within a coverage geometry of a cell; one or multiple distances of this cell's site and one or multiple neighboring cell sites; and one or multiple distances of a cell site and one or multiple neighboring cell centroids.

For example, memory 404 may have a threshold, $th_{nsu}$, stored therein, wherein $th_{nsu}$ corresponds to an upper threshold predetermined number of neighboring sites within a cell coverage geometry. If the count of neighboring sites within a cell coverage geometry is larger than $th_{ns}$, then tower control program 412 may have instructions stored therein, that when executed by system controller 402, cause ACOS 210 to determine that this cell may be in an overshoot situation.

In another example, memory 404 may have a threshold, $th_{du}$, stored therein, wherein $th_{du}$ corresponds to an upper threshold predetermined distance of the cell site location and cell center location. If the distance of the cell site location and cell center location is larger than $th_{du}$, then tower control program 412 may have instructions stored therein, that when executed by system controller 402, cause ACOS 210 to determine that this cell may be in an overshoot situation.

In another example, memory 404 may have a threshold, $th_{nsl}$, stored therein, wherein $th_{nsl}$ corresponds to a lower threshold predetermined number of neighboring sites within a cell coverage geometry. If the count of neighboring sites within a cell coverage geometry is lower than $th_{nsl}$ (such as zero count), then tower control program 412 may have instructions stored therein, that when executed by system controller 402, cause ACOS 210 to determine that this cell may be in an undershoot situation.

In another example, memory 404 may have a threshold, $th_{dl}$, and a threshold, $th_{rl}$, stored therein, wherein $th_{dl}$ corresponds to a lower threshold predetermined distance of the cell site location and cell center location, and $th_{rl}$ corresponds to a lower threshold radius of the cell. If the distance of the cell site location and cell center location is lower than $th_{dl}$ and the radius of the cell is also lower than $th_{rl}$, then tower control program 412 may have instructions stored therein, that when executed by system controller 402, cause ACOS 210 to determine that this cell may be in and undershoot situation.

Combinations of the above-discussed example criteria may be used for ACOS 210 to determine overshooting or undershooting in accordance with aspects of the present disclosure. It should be noted that some cells may be neither overshooting, nor undershooting.

In some instances, as an extension, tower control program 412 may have instructions stored therein, that when executed by system controller 402, cause ACOS 210 to detect overshooting or undershooting for a group of cells. The group of cells may be on a same cell site, and they may have similar or the same configurations.

In some instances, as an extension, a cell site may be referred as to being in an overshoot or an undershoot situation, if one or multiple cells on this site are in overshoot or undershoot situation. A cell site may have some cells in an overshoot situation, some other cells in an undershoot situation, and this cell site then can be referred as to having both overshoot situations and undershoot situations.

In some instances, for cell or cell site overshoot situation and the cell undershoot situation, tower control program 412 may have instructions stored therein, that when executed by system controller 402, cause ACOS 210 to determine antenna tilt and transmit power reconfiguration, based on a desired cell centroid and other information such as antenna heights, devices location heights and the like. Tower control program 412 may have instructions stored therein, that when executed by system controller 402, cause communication system 406 to output the reconfiguration.

In some instances, tower control program 412 may have instructions stored therein, that when executed by system controller 402, cause communication system 406 to output a recommendation that the tilt can be tuned towards the direction of the desired cell centroid.

In some instances, tower control program 412 may have instructions stored therein, that when executed by system controller 402, cause communication system 406 to output a recommendation that the transmit power be tuned to make the RSRP, RSRQ etc to be the desired values (e.g., percentile p10 value RSRP to be increased by 3 dBm, or to be decreased by 3 dBm, and transmit power could be tuned accordingly to meet such).

In some instances, tower control program 412 may have instructions stored therein, that when executed by system controller 402, cause ACOS 210 to to determine the desired cell centroid based on information such as: one or multiple distances of this cell site and one or multiple neighboring cell sites; a count of additional neighboring cell sites within a coverage geometry of the cell; a count of additional neighboring cell centroids within a coverage geometry of the cell; a radius of a cell geographic coverage area based on the data samples with locations such as latitude and longitude; one or multiple radii of the neighboring cells nearby a cell geographic coverage area based on the data samples with locations such as latitude and longitude.

In some instances, tower control program 412 may have instructions stored therein, that when executed by system controller 402, cause communication system 406 to output a recommendation that the reconfiguration of tilt or transmit power. The output can include, for example, a new tilt value for a total of an electric tilt and a mechanical tilt, a new electric tilt value, a new transmit power value, a change of a tilt value, and a change of a transmit power value.

In some instances, tower control program 412 may have instructions stored therein, that when executed by system controller 402, cause ACOS to prioritize which cells and which cell sites are to be reconfigured for tilt tuning, transmit power tuning. In some of these instances, tower control program 412 may have instructions stored therein, that when executed by system controller 402, cause communication system 406 to output a recommendation for the reconfiguration related to cell overshooting and the cell undershooting. The prioritization can be at cell level, or at cell site level.

In some instances, for the cell level prioritization, tower control program 412 may have instructions stored therein, that when executed by system controller 402, cause ACOS 210 to use data, statistics, or reconfiguration recommendations at the cell level to determine the prioritization. In some of these instances, tower control program 412 may have instructions stored therein, that when executed by system controller 402, cause ACOS 210 to perform the prioritization, e.g., using a weighted sum of the normalized metrics under consideration where the weights are with importance, to generate a score, and the score can be used to rank, and the rank can be used to derive which ones are for higher priorities. The metrics under consideration can include, for example: a count of data samples within a cell (the more data samples may indicate this cell may be of more importance or higher priority to consider antenna reconfigurations); one or multiple performance metrics of the cell such as RSRP, RSRQ, download speed, latency, and the like (for example, a cell with really low download speed, or very high latency, or very low RSRP or RSRQ, may be of higher priority to get antenna reconfiguration optimization); a change of a tilt value (higher tilt change value of the recommendation may indicate the cell could be for higher priority to be tuned in tilt); and a change of transmit power value (higher tilt change value of the recommendation may indicate the cell could be for higher priority to be tuned in tilt). For example, the score for ranking may be determined with the following equation (1):

$$\text{score} = w_1 * m_1 + w_2 * m_2 + w_3 * m_3, \qquad (1)$$

where $w_1=0.3$, $w_2=0.3$, $w_3=0.4$ are the weighting values, $m_1$ is normalized count of data samples, $m_2$ is normalized download speed, and $m_3$ is normalized absolute change of tilt value.

The normalization of metric m is $(m-m_{min})/(m_{max}-m_{min})$, where $m_{min}$ is the minimum of metric m value, $m_{max}$ is the maximum of metric m value, and the normalization brings each metric to be in the range from 0 to 1.

As an alternative, besides the weighted sum of the metrics to do prioritization, tower control program 412 may have instructions stored therein, that when executed by system controller 402, cause ACOS 210 to use filtering. For example, the metric of absolute recommended tuning tilt value >3 degrees, the metric count of data samples >5000, and the metric for download speed <10 kbps may be filtered. The cells that satisfy these conditions could be for prioritization in tilt or transmit power tuning. It should be noted that combinations of filters can be applied, for multiple conditions in combination in accordance with aspects of the present disclosure, In some instances, iterations can be applied and carried out, in the recommendation of the tilt tuning, and/or transmit power tuning. For example, at a first timeline (e.g., a first date, a first hour), tower control program 412 may have instructions stored therein, that when executed by system controller 402, cause ACOS to derive and output the recommendations, based on the data samples collected up to the first timeline. In some of these instances, MNO 202 may then take the recommendations to do the actual tuning for some cells. In some other of these instances, the recommendations of the tilt tuning and/or the transmit power tuning might not be implemented by MNO 202, and a different tuning value may be used in the actual tuning for some cells. In some other of these instances, the recommendations of the tilt tuning and/or the transmit power tuning might not be implemented, for some cells. Then, at a second timeline (e.g., a second date, a second hour), tower control program 412 may have instructions stored therein, that when executed by system controller 402, cause ACOS 210 to derive and output a new set of recommendations, based on the data samples collected up to the second timeline. These data samples can include some of the old data samples prior to the first timeline, and the newly collected data in-between the first and the second timelines, and so on and so forth. The iterations can be performed as a continued optimization for the antenna configurations.

Figure 5:
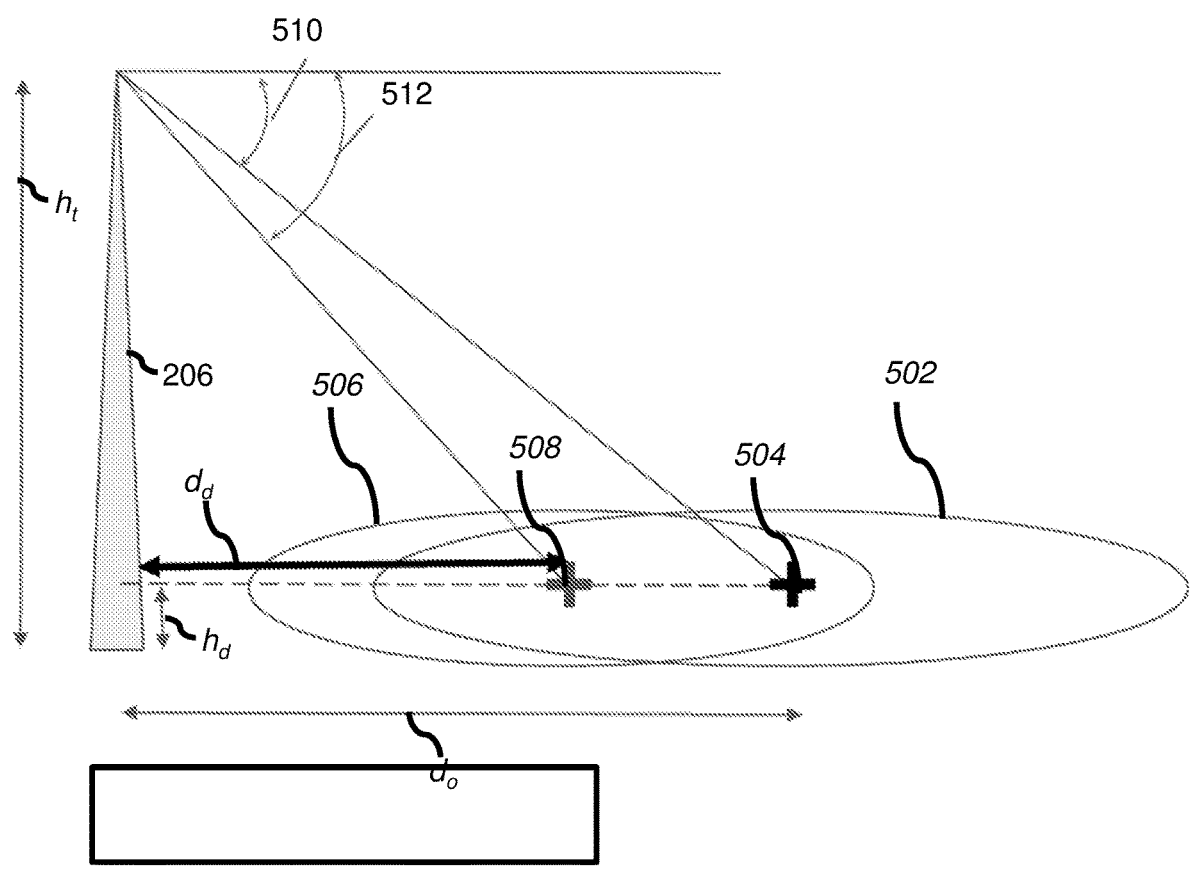
FIG. 5 illustrates a process of finding a new desired center of coverage from a cellular transmitter of a cellular tower in accordance with aspects of the present disclosure.

FIG. 5 illustrates a process of finding a new desired center of coverage from a cellular transmitter of a cellular tower in accordance with aspects of the present disclosure.

As shown in the figure, cellular tower 206 has a cellular transmitter height, ht. Currently, the cellular transmitter of cellular tower 206 is configured to cover an area 502 having a center at 504 located an original distance $d_o$ from cellular tower 206. However, in accordance with aspects of the present disclosure, ACOS 210 may determine that a desired coverage area 506 is located such that a desired center 508 is located a desired distance da from cellular tower 206, wherein desired center 508 is closer to cellular tower 206 than center 504, and such that $d_d < d_o$.

In accordance with aspects of the present disclosure the count of neighboring cells within cell coverage geometry and the cell performance (reference signal received power (RSRP), reference signal received quality (RSRQ), congestion, etc.) are used to identify undershooting and overshooting use cases.

To obtain the recommended tilt tuning angles, aspects of the present disclosure include two methods to obtain the new center, which will then be used to define a new tilt.

In one example, a machine-learning-based-classification algorithm may be implemented to determine the suitable distance for the new center.

The geometry of the coverage may be adapted by changing its size to get a different count of neighboring cells. Intuitively, when the size of the coverage increases, there will be more neighboring cells. Similarly, when the size of the coverage decreases, there will be less neighboring cells. Based on this methodology, when the geometry size is increased, a threshold may be found where there is a jump in terms of the count of neighboring cells. This will be described in greater detail with reference to FIG. 6.

Figure 6:
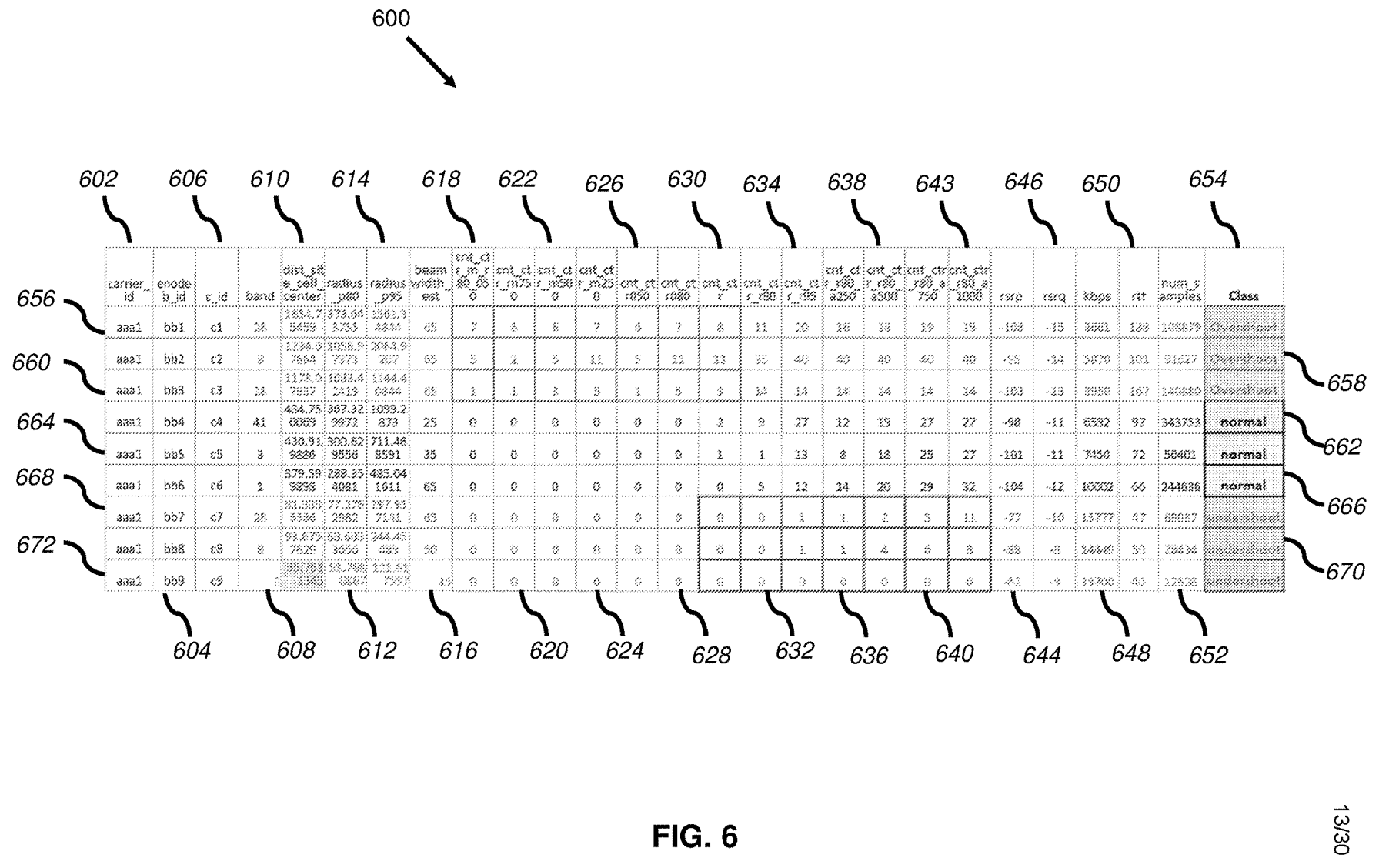

FIG. 6 illustrates a chart 600 of data collected from a plurality of cellular towers.

As shown in the figure, chart 600 includes columns 602, 604, 606, 608, 610, 612, 614, 616, 618, 620, 622, 624, 626, 628, 630, 632, 634, 636, 638, 640, 642, 644, 646, 648, 650, 652, and 654, and rows 656, 658, 660, 662, 664, 666, 668, 670, and 672.

Column 602 identifies the carrier identification number. As shown in column 602, all data within chart 600 is derived from the same carrier.

Column 604 identifies the Evolved Node B (abbreviated as eNodeB or eNB). ENodeB is a key component of the Long Term Evolution (LTE) 4G network. Note this is an example for 4G network. For 5G wireless network, this column could be the identifier of Next Generation Node B (gNodeB or gNB). It is a base station used to communicate with mobile devices such as smartphones, tablets, and other wireless devices, and is responsible for managing wireless radio resources and providing connectivity to the core network. An eNodeB/gNodeB is the radio access network (RAN) component of the LTE and 5G networks and performs functions such as radio transmission and reception, scheduling and coordination of wireless resources, and mobility management. It is responsible for controlling the transmission power of the base station, managing the handover of devices between cells, and managing the allocation of radio resources to different devices in the network.

Column 606 indicates the cell identification.

Column 608 indicates that band for which the cellular towers are communicating.

Column 610 is the distance from the cellular tower to the cell center. Column 612 is the radius based on the user devices location data samples distribution (data samples collected at devices via application) at the $80^{th}$ percentile. Column 614 is the radius based on the user devices location data samples distribution at the $95^{th}$ percentile.

Column 616 is the beam width estimation in degrees.

Column 618 is a count of cells in coverage geometry size up to the cell center minus one half of the radius based on the user devices location data samples distribution at the 80th percentile.

Columns 620, 622, and 624 are each a count of cells in a coverage geometry size up to the cell center minus 750 m, 500 m, and 250 m, respectively.

Column 626 is a count of cells in a coverage geometry size up to the cell center times a scaling factor of 0.5, column 628 is a count of cells in a coverage geometry size up to the cell center times a scaling factor of 0.8, and column 630 is a count of cells in a coverage geometry size up to the cell center.

Columns 632 and 634 are each a count of cells in a coverage geometry size up to the cell center plus the radius of the user distribution at the $80^{th}$ and $95^{th}$ percentile, respectively.

Columns 636, 638, 640, and 642 are each a count of cells in a coverage geometry size up to the cell center plus the p80 radius plus 250 m, 500 m, 750 m, and 1000 m, respectively.

Column 644 is the measured reference signal received power (RSRP) in dBm.

Column 646 is the measured reference signal received quality (RSRQ) in dB.

Column 648 is the download speed in kbps captured in the application layer.

Column 650 is the round trip time (rtt) in ms captured at layers such as transport layer.

Column 652 is the number of cellular devices associated with a respective cellular tower.

Column 654 indicates whether a respective cellular tower is overshooting, undershooting or operating normally.

Rows 656, 658, 660, 662, 664, 666, 668, 670, and 672 correspond to different respective cellular towers.

As clearly seen in table 600, the cellular towers corresponding to rows 656, 658, and 660, each have a coverage geometry that covers multiple cells as evidenced by columns 618, 620, 622, 624, 626, 628, and 630. This shows that each of the cellular towers corresponding to rows 656, 658, and 660 are overshooting. This is indicated for each of rows 656, 658, and 660 in column 654.

On the other hand, the cellular towers corresponding to rows 668, 670, and 672, each have a coverage geometry that covers no cells as evidenced by columns 618, 620, 622, 624, 626, 628, and 630. In fact, each of these cellular towers do not start communicating with cells until a larger coverage geometry is used, for example as illustrated in column 634. This shows that each of the cellular towers corresponding to rows 668, 670, and 672 are undershooting. This is indicated for each of rows 668, 670, and 672 in column 654.

For overshooting, even if the geometry is reduced, there are still neighboring cells as discussed above with reference to rows 656, 658, and 660. For an undershoot, in some examples, cells with really good RSRP, RSRQ may be considered as an additional filter.

The patterns for overshooting, undershooting, and normal transmission may be abundantly clear as shown in chart 600. In some instances, in accordance with aspects of the present disclosure, machine learning may be implemented to derive the conditions for overshooting, undershooting (supervised learning, by labels we input), and the regression can be used to find out a desired coverage.

Once a cellular tower is determined to be overshooting or undershooting, for example as discussed above with reference to FIG. 6, then a new center of a cell may need to be determined. As will be described in greater detail below, the change in distance of the center of a cell may be determined as an absolute value. In accordance with aspects of the present disclosure, system controller 402 is configured to determine whether to move the new center closer to the cellular tower or farther away from the cellular tower. In particular, if a cellular tower is determined to be overshooting, then system controller 402 is configured to determine that the new center should be moved closer to the cellular tower. On the other hand, if a cellular tower is determined to be undershooting, then system controller 402 is configured to determine that the new center should be moved further away from the cellular tower.

In some instances, the locations of the neighboring cells are used as factors to detect overshoot or undershoot. This will be described in greater detail with reference to FIGS. 7-8.

Figure 7:
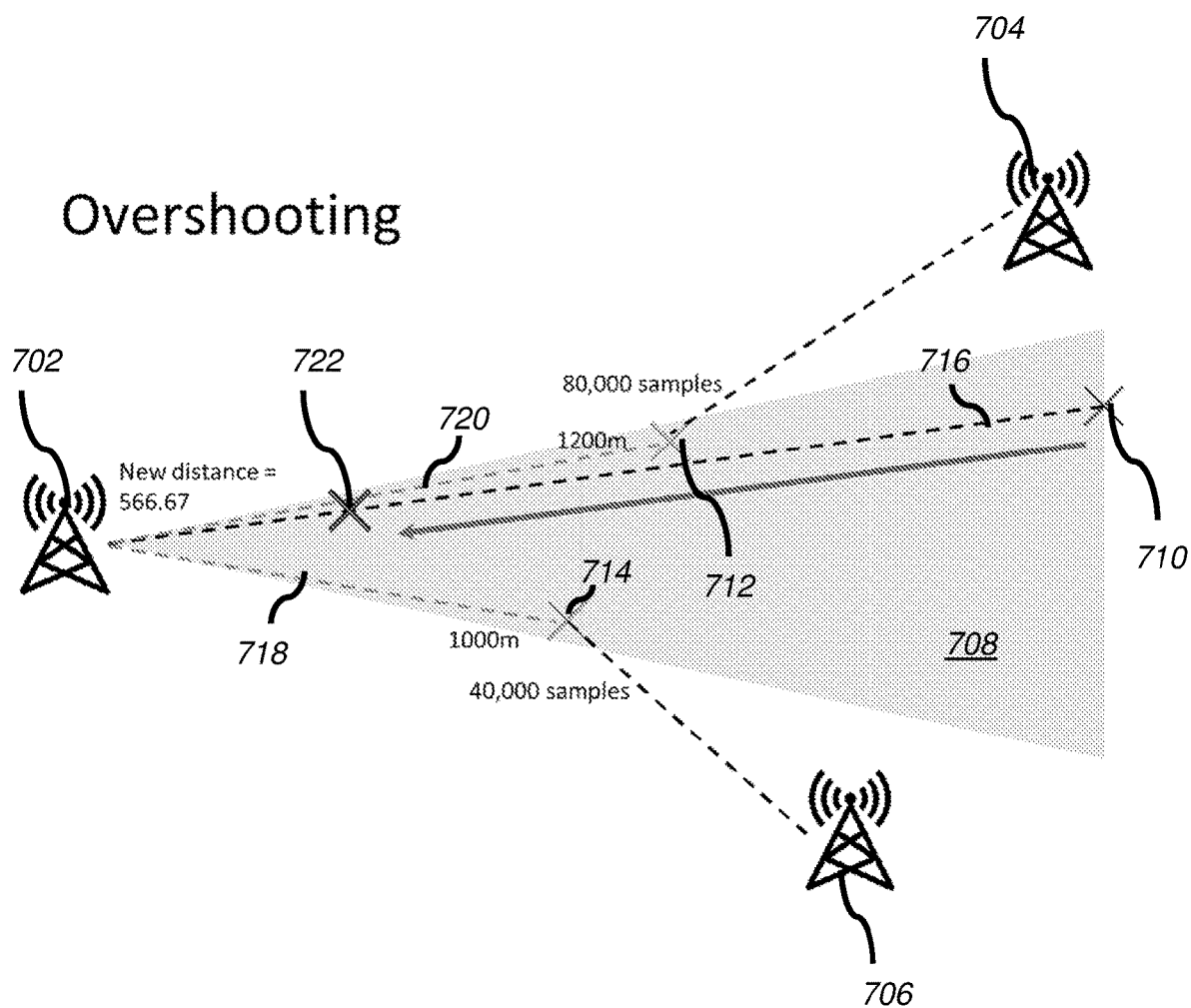
FIG. 7 illustrates a process of finding a new desired center of coverage from a cellular transmitter of a cellular tower to correct an overshoot in accordance with aspects of the present disclosure.

FIG. 7 illustrates a process of finding a new desired center of coverage from a cellular transmitter of a cellular tower to correct an overshoot in accordance with aspects of the present disclosure.

FIG. 7 includes a cellular tower 702, a cellular tower 704, and a cellular tower 706. For purposes of discussion, in this example, cellular tower 702 is being tuned in accordance with aspects of the present disclosure. As such, only the coverage area 708 of cellular tower 702 is shown in the figure. Additionally shown in the figure is the location of an overshooting target cell 710, a location of a neighboring cell 712, and a location of a neighboring cell 714. For purposes of discussion, ACOS 210 will have determined that cellular tower 702 is overshooting by collecting data similar to that discussed above with reference to FIG. 6. As such, when a new center is determined, ACOS 210 is configured to place the new center closer to the cellular tower 702.

In this example, neighboring cell 712 includes 80,000 data samples that are additionally serviced by cellular tower 704, whereas neighboring cell 714 includes 40,000 data samples that are additionally serviced by cellular tower 706. Note the data samples are from the mobile devices associated or connected with the respective cells. One device might have multiple data samples logged. The devices associated with a cell might vary across the time, due to devices mobility etc. The data samples can be logged across a time window, such as 7 days, 28 days, 84 days, and the like.

Returning to FIG. 4B, system controller 402 is configured to execute instructions in tower control program 412 to: choose a predetermined number of neighbors in decreasing order of distance; calculate the weighted neighboring distance, which is the distance between the problematic site to the neighboring cells; and determine a new distance by dividing the weighted neighboring distance by a predetermined number.

In light of the example of FIG. 7, there are two chosen neighbors. Further the new distance is chosen by dividing the weighted neighboring distance by some factor. In a non-limiting example, the factor is 2, as it is sufficiently conservative. It should be known that the factor is adjustable based on the scenario, e.g., 3, 1.5, etc. In this example, let the distance from cellular tower 702 to neighboring cell 712 be 1200 m and let the distance from cellular tower 702 to neighboring cell 714 be 1000 m. Therefore, the weighted neighboring distance would be: 1200*80,000/120,000+ 1000*40,000/120,00, which is 1133.33. Dividing this value by a factor of 2 provides the new distance at location 722 of 566.56 m.

Figure 8:
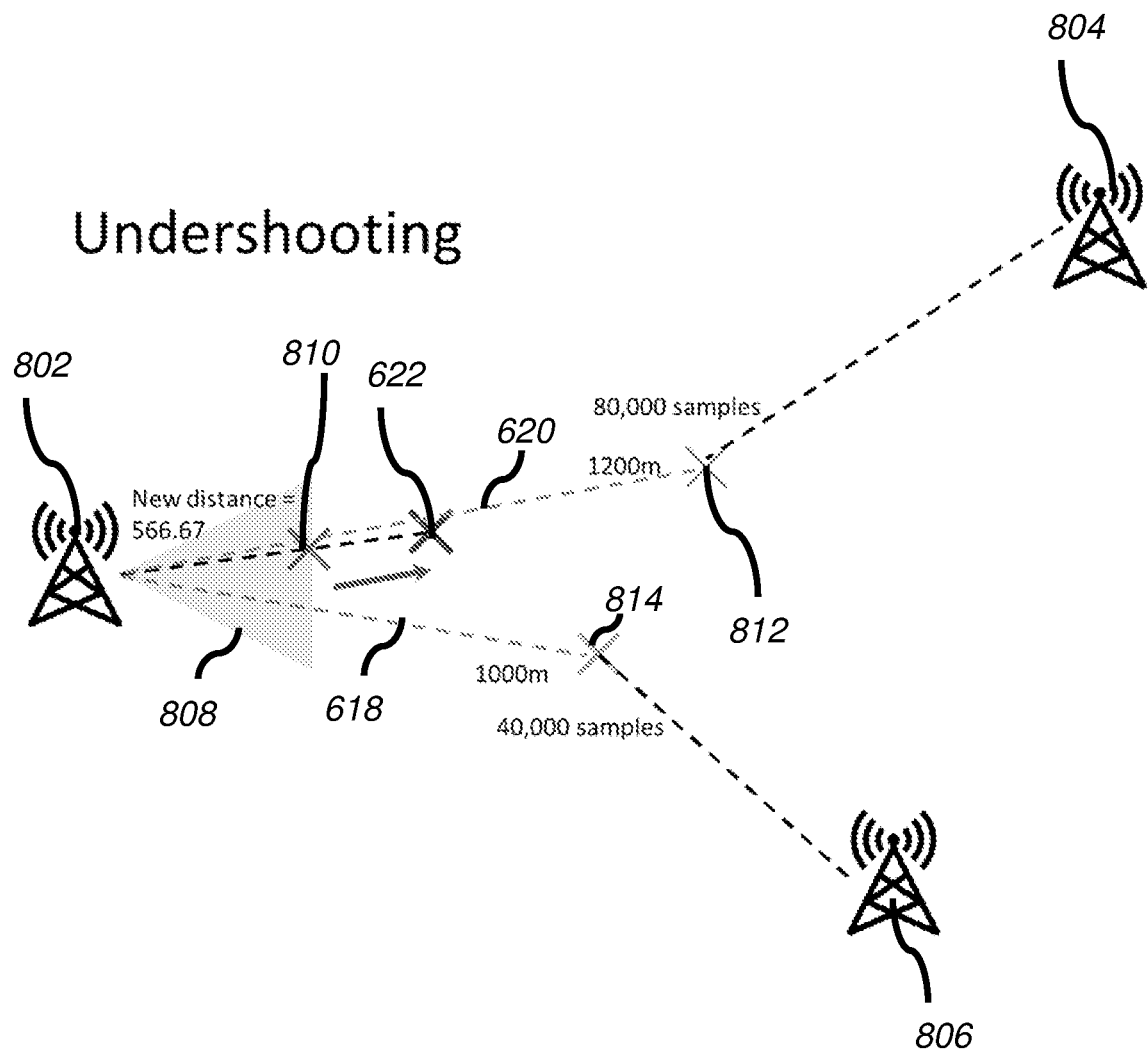
FIG. 8 illustrates a process of finding a new desired center of coverage from a cellular transmitter of a cellular tower to correct an undershoot in accordance with aspects of the present disclosure.

FIG. 8 illustrates a process of finding a new desired center of coverage from a cellular transmitter of a cellular tower to correct an undershoot in accordance with aspects of the present disclosure.

FIG. 8 includes a cellular tower 802, a cellular tower 804, and a cellular tower 806. For purposes of discussion, in this example, cellular tower 802 is being tuned in accordance with aspects of the present disclosure. As such, only the coverage area 808 of cellular tower 802 is shown in the figure. Additionally shown in the figure is the location of an undershoot target cell 810, a location of a neighboring cell 812, and a location of a neighboring cell 814. For purposes of discussion, ACOS 210 will have determined that cellular tower 802 is undershooting by collecting data similar to that discussed above with reference to FIG. 6. As such, when a new center is determined, ACOS 210 is configured to place the new center further away from the cellular tower 802.

In this example, neighboring cell 812 includes 80,000 data samples that are serviced by cellular tower 804, whereas neighboring cell 814 includes 40,000 data samples that are serviced by cellular tower 806.

Returning to FIG. 4B, system controller 402 is configured to execute instructions in tower control program 412 to: choose a predetermined number of neighbors in decreasing order of distance; calculate the weighted neighboring distance, which is the distance between the problematic site to the neighboring cells; and determine a new distance by dividing the weighted neighboring distance by a predetermined number.

In light of the example of FIG. 8, there are two chosen neighbors. Further the new distance is chosen by dividing the weighted neighboring distance by some factor. In a non-limiting example, the factor is 2, as it is sufficiently conservative. It should be known that the factor is adjustable based on the scenario, e.g., 3, 1.5, etc. In this example, let the distance from cellular tower 802 to neighboring cell 812 be 1200 m and let the distance from cellular tower 802 to neighboring cell 814 be 1000 m. Therefore, the weighted neighboring distance would be: 1200*80,000/120,000+ 1000*40,000/120,00, which is 1133.33. Dividing this value by a factor of 2 provides the new distance at location 822 of 566.56 m.

A second, more conservative algorithm, takes the radius of the neighboring cells into account. This will be described in greater detail with reference to FIGS. 9-10.

Figure 9:
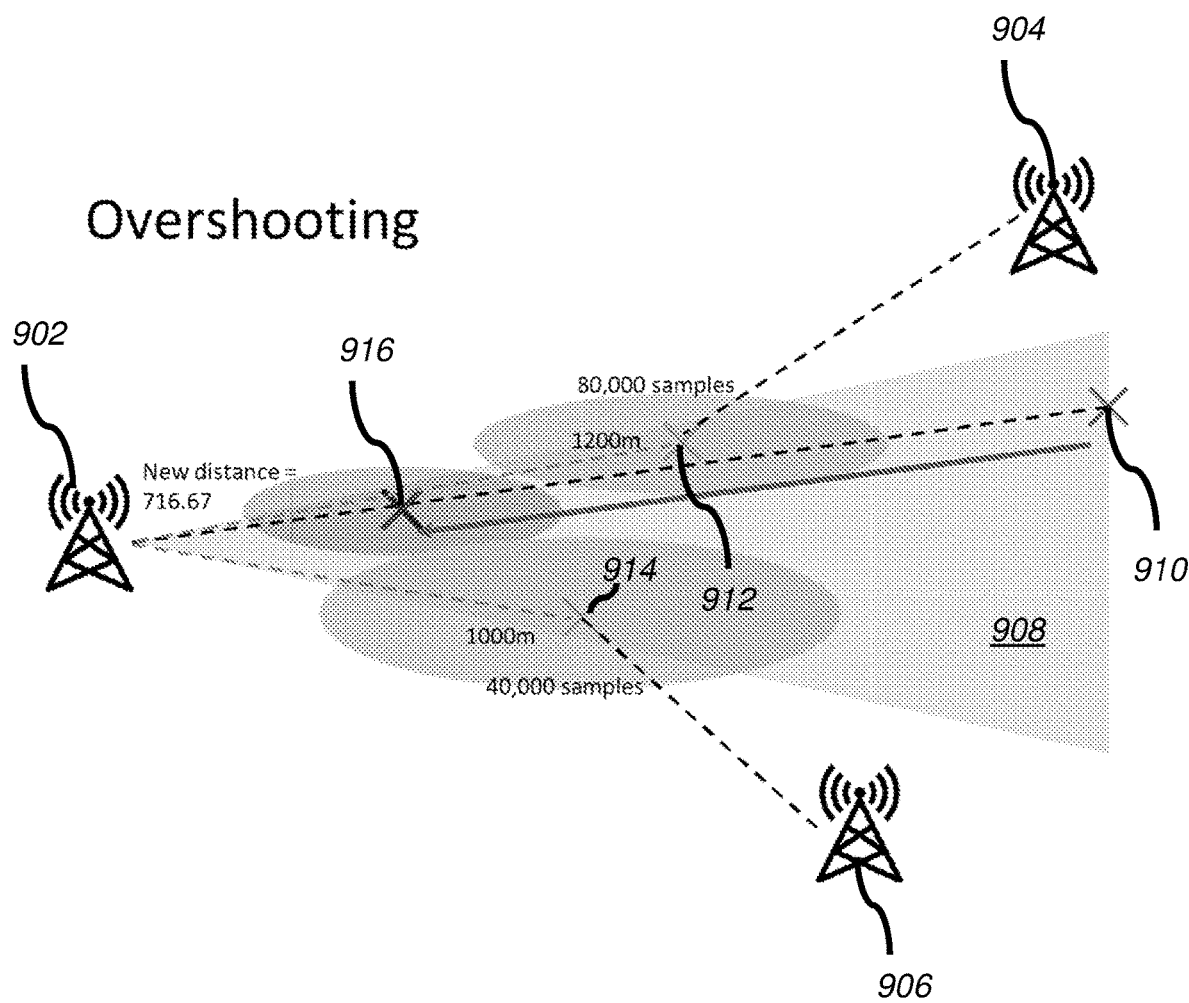
FIG. 9 illustrates another process of finding a new desired center of coverage from a cellular transmitter of a cellular tower to correct an overshoot in accordance with aspects of the present disclosure.

FIG. 9 illustrates another process of finding a new desired center of coverage from a cellular transmitter of a cellular tower to correct an overshoot in accordance with aspects of the present disclosure.

FIG. 9 includes a cellular tower 902, a cellular tower 904, and a cellular tower 906. For purposes of discussion, in this example, cellular tower 902 is being tuned in accordance with aspects of the present disclosure. As such, only the coverage area 908 of cellular tower 902 is shown in the figure. Additionally shown in the figure is the location of an overshoot target cell 910, a location of a neighboring cell 912, and a location of a neighboring cell 914. For purposes of discussion, ACOS 210 will have determined that cellular tower 902 is overshooting by collecting data similar to that discussed above with reference to FIG. 6. As such, when a new center is determined, ACOS 210 is configured to place the new center closer to the cellular tower 902.

In this example, neighboring cell 912 includes 80,000 data samples that are additionally serviced by cellular tower 904, whereas neighboring cell 914 includes 40,000 data samples that are additionally serviced by cellular tower 906.

Returning to FIG. 4B, system controller 402 is configured to execute instructions in tower control program 412 to: choose some predetermined number of neighbors in a decreasing order of distance; calculate the weighted radius-aware neighboring distance, wherein the neighboring distance is the distance between the problematic site to the neighboring cells—the radius of the neighboring cells. In some examples, the radius can be based on an additional distance, for example adding 30, 50 or 80 meters. These radii may be added as buffer zones so as to increase confidence of the decision in the new desired center of coverage.

It should be noted that in this example, the predetermined number of neighbors is 2.

In some instances, the new distance may be determined by subtracting the weighted radius-aware neighboring with the radius of the target cell. In some instances, the new distance may be determined by dividing the weighted radius-aware neighboring distance by a predetermined value. In some instances, the new distance may be determined by using the vertical beamwidth of cellular tower 902.

In light of the example of FIG. 9, there are two chosen neighbors. In this example, let the distance from cellular tower 902 to neighboring cell 912 be 1200 m and let the distance from cellular tower 902 to neighboring cell 914 be 1000 m. Further, let the radius of neighboring cell 912 be 200 m, whereas the radius of neighboring cell 914 be 400 m. Therefore, the weighted neighboring distance would be: (1200−200)*80,000/120,000+(1000−400)*40,000/120,000, which is 866.77 m. As a result, the distance from cellular tower 902 to the new location 916 of a target cell is 866.67 m−150 m=716.67 m.

Figure 10:
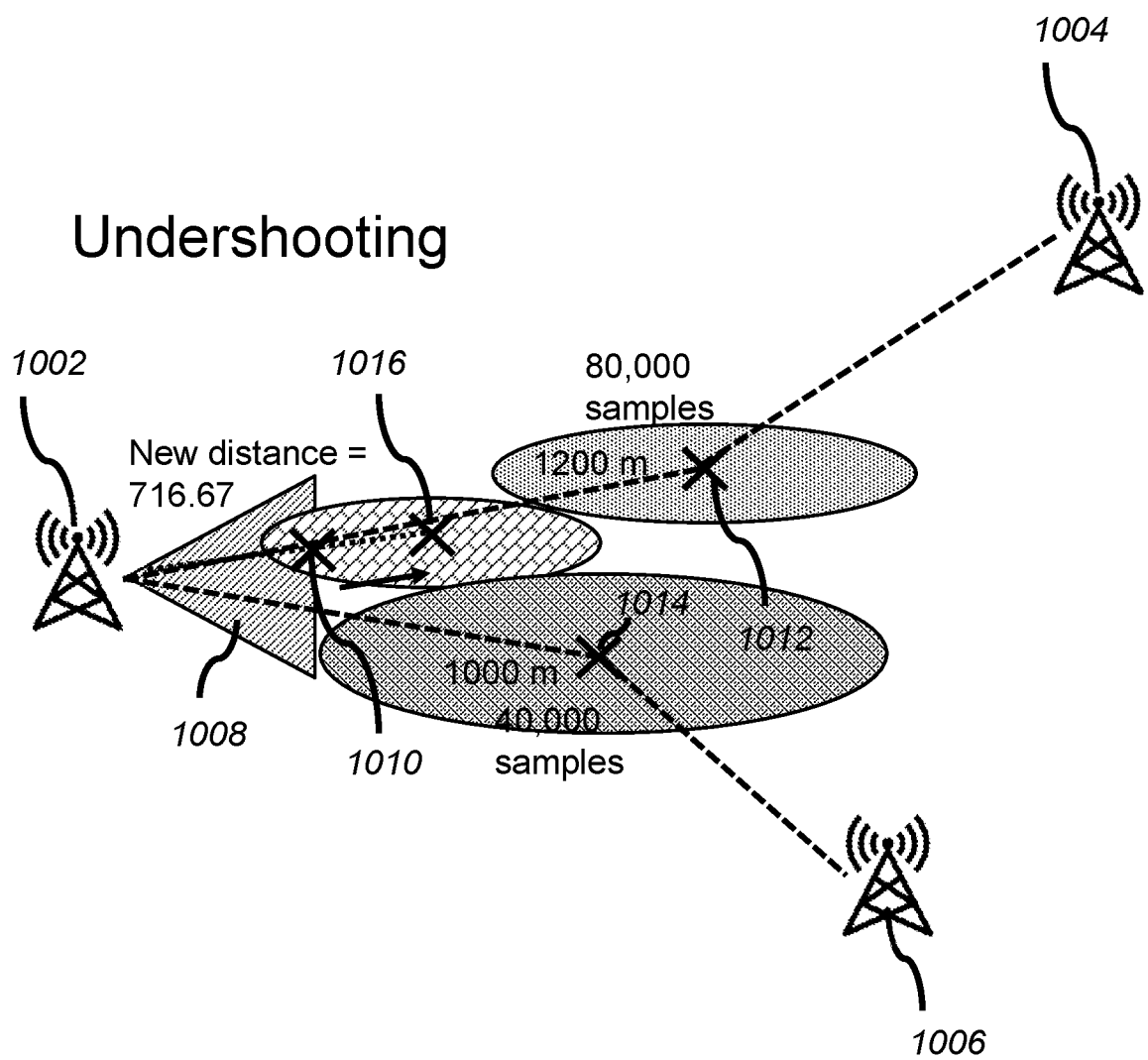
FIG. 10 illustrates another process of finding a new desired center of coverage from a cellular transmitter of a cellular tower to correct an undershoot in accordance with aspects of the present disclosure.

FIG. 10 illustrates another process of finding a new desired center of coverage from a cellular transmitter of a cellular tower to correct an undershoot in accordance with aspects of the present disclosure.

FIG. 10 includes a cellular tower 1002, a cellular tower 1004, and a cellular tower 1006. For purposes of discussion, in this example, cellular tower 1002 is being tuned in accordance with aspects of the present disclosure. As such, only the coverage area 1008 of cellular tower 1002 is shown in the figure. Additionally shown in the figure is the location of an undershoot target cell 1010, a location of a neighboring cell 1012, and a location of a neighboring cell 1014. For purposes of discussion, ACOS 210 will have determined that cellular tower 1002 is undershooting by collecting data similar to that discussed above with reference to FIG. 6. As such, when a new center is determined, ACOS 210 is configured to place the new center further away from the cellular tower 1002.

In this example, neighboring cell 1012 includes 80,000 data samples that are additionally serviced by cellular tower 1004, whereas neighboring cell 1014 includes 40,000 data samples that are additionally serviced by cellular tower 1006.

Returning to FIG. 4B, system controller 402 is configured to execute instructions in tower control program 412 to: choose some predetermined number of neighbors in a decreasing order of distance; calculate the weighted radius-aware neighboring distance, wherein the neighboring distance is the distance between the problematic site to the neighboring cells—the radius of the neighboring cells. In some examples, the radius can be based on an additional distance, for example adding 30, 50 or 80 meters.

It should be noted that in this example, the predetermined number of neighbors is 2.

In some instances, the new distance may be determined by subtracting the weighted radius-aware neighboring with the radius of the target cell. In some instances, the new distance may be determined by dividing the weighted radius-aware neighboring distance by a predetermined value. In some instances, the new distance may be determined by using the vertical beamwidth of cellular tower 1002.

In light of the example of FIG. 10, there are two chosen neighbors. In this example, let the distance from cellular tower 1002 to neighboring cell 1012 be 1200 m and let the distance from cellular tower 1002 to neighboring cell 1014 be 1000 m. Further, let the radius of neighboring cell 1012 be 200 m, whereas the radius of neighboring cell 1014 be 400 m. Therefore, the weighted neighboring distance would be: (1200−200)*80,000/120,000+(1000−400)*40,000/120,000, which is 866.77 m. As a result, the distance from cellular tower 1002 to the new location 1016 of a target cell is 866.67 m−150 m=716.67 m.

Figure 11:
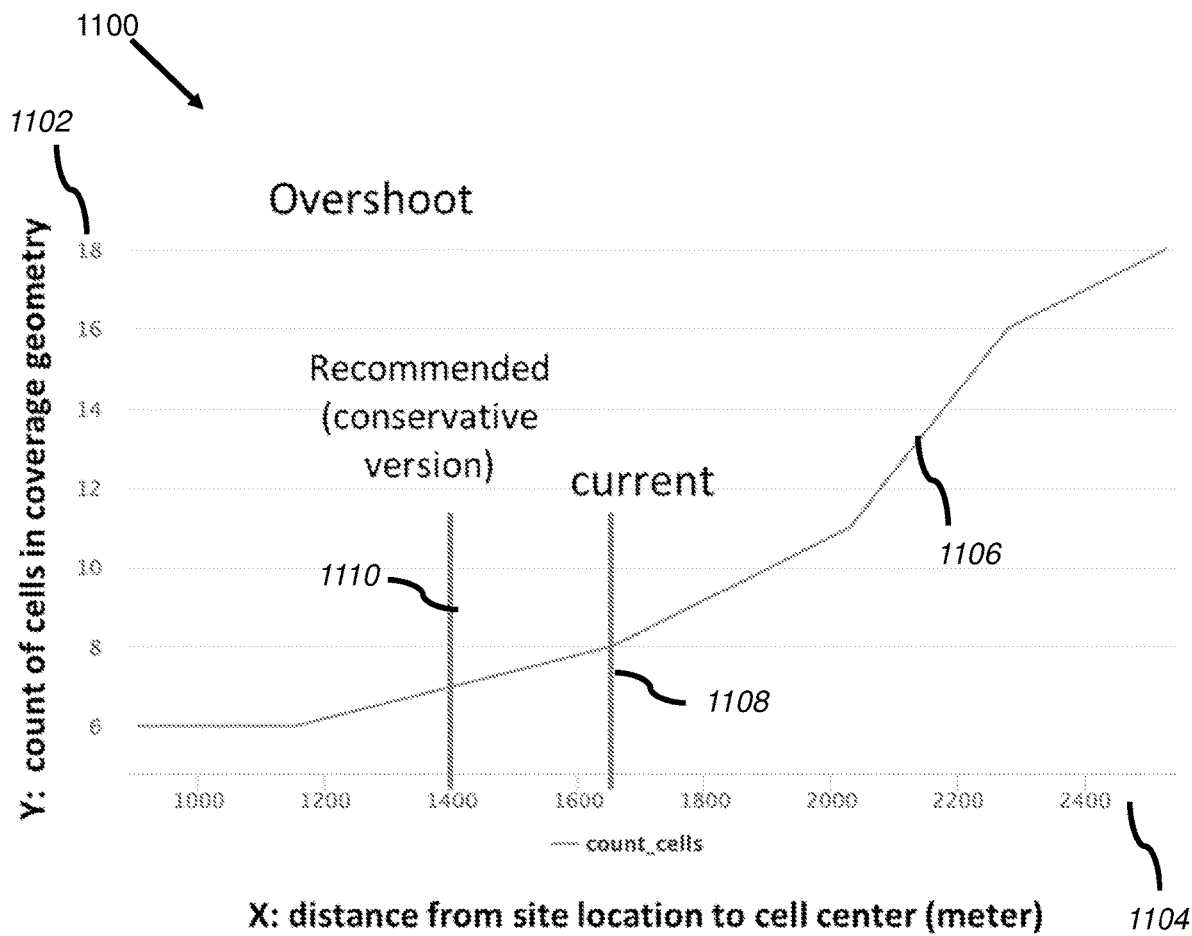
FIG. 11 illustrates results of a regression process to find a new desired center of coverage from a cellular transmitter of a cellular tower to correct an overshoot in accordance with aspects of the present disclosure.

FIG. 11 illustrates a graph 1100 of a regression process to find a new desired center of coverage from a cellular transmitter of a cellular tower to correct an overshoot in accordance with aspects of the present disclosure.

As shown in the figure, graph 1100 includes a Y-axis 1102, an X-axis 1104 and a function 1106. Y-axis 1102 corresponds to a count of cells in the coverage geometry of a cellular tower, whereas X-axis 1104 corresponds to the distance from the location of the cellular tower to the cell center (in meters).

A marker 1108 indicates the current location of the center of the cell from the cellular tower, which is approximately 1650 meters. In accordance with aspects of the present disclosure, system controller 402 would have calculated a new center of the cell to be moved to 1400 meters, or 150 meters closer to the location of the cellular tower, as indicated by a marker 1110 in graph 1100.

Figure 12:
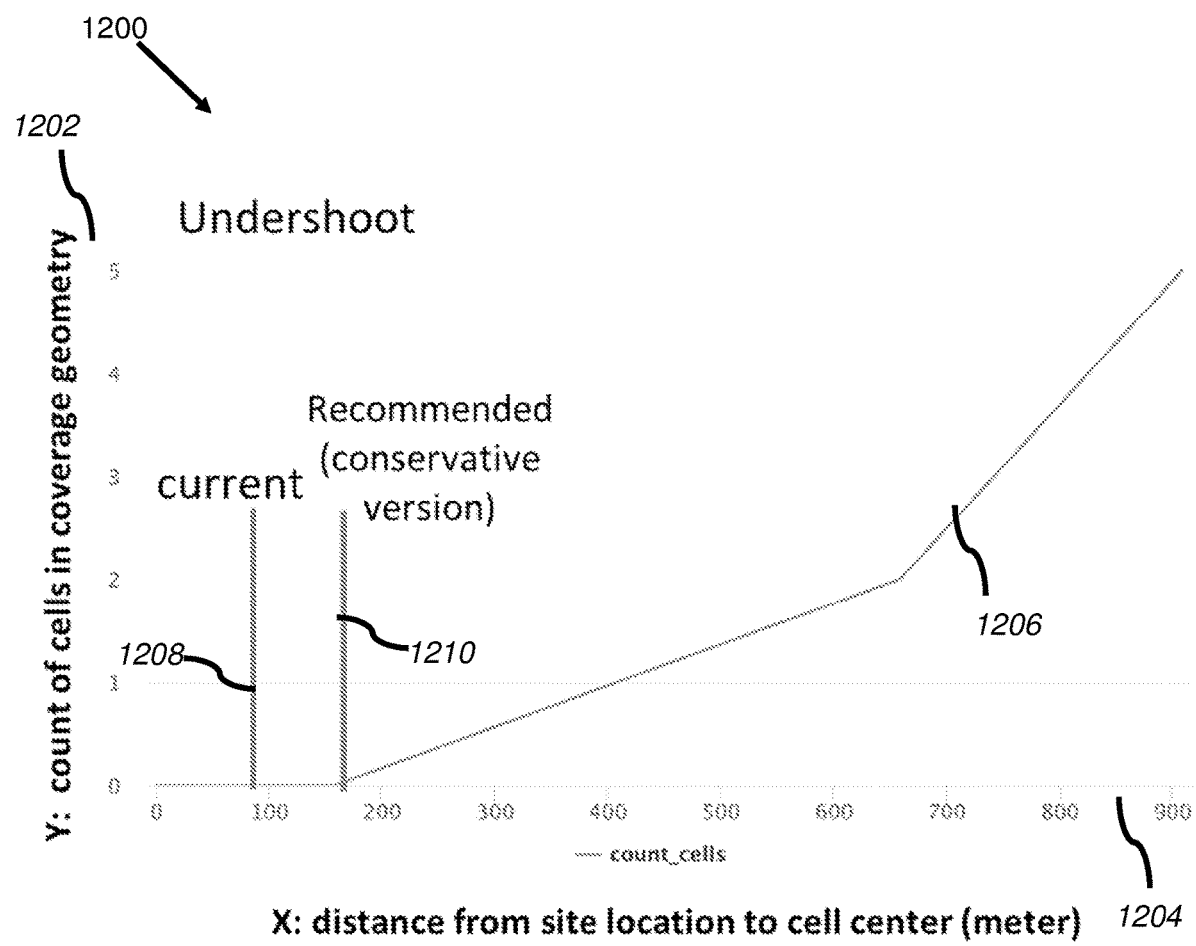
FIG. 12 illustrates results of a regression process to find a new desired center of coverage from a cellular transmitter of a cellular tower to correct an undershoot in accordance with aspects of the present disclosure.

FIG. 12 illustrates results of a regression process to find a new desired center of coverage from a cellular transmitter of a cellular tower to correct an undershoot in accordance with aspects of the present disclosure.

As shown in the figure, graph 1200 includes a Y-axis 1202, an X-axis 1204 and a function 1206. Y-axis 1202 corresponds to a count of cells in the coverage geometry of a cellular tower, whereas X-axis 1204 corresponds to the distance from the location of the cellular tower to the cell center (in meters).

A marker 1208 indicates the current location of the center of the cell from the cellular tower, which is approximately 90 meters. In accordance with aspects of the present disclosure, system controller 402 would have calculated a new center of the cell to be moved to 180 meters, or 90 meters further away from the location of the cellular tower, as indicated by a marker 1210 in graph 1200.

It should be noted that in order to move the center of the cell, the tilt of the cellular transmitter should be moved. Further, there is a mathematical relationship between the tilt of the cellular transmitter and the center of the cell. This will be described in greater detail with reference to FIGS. 13A-B.

Figure 13A:
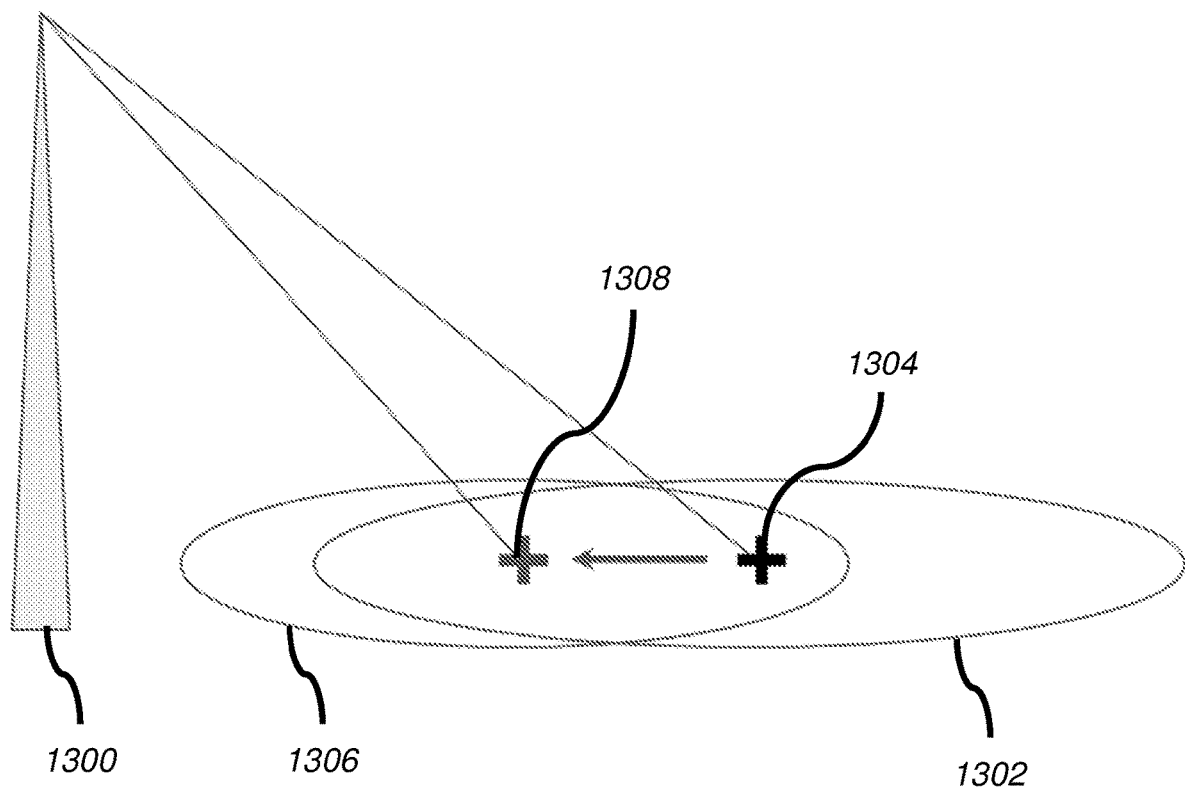
FIG. 13A illustrates how a new center and radius after a tilt change of a cellular transmitter of a cellular tower might affect each other when the new center is closer to the cellular transmitter of a cellular tower.

FIG. 13A illustrates how a new center and radius after a tilt change of a cellular transmitter of a cellular tower might affect each other when the new center is closer to the cellular transmitter of a cellular tower.

As shown in the figure, a cellular tower 1300 is configured such that the cellular transmitter is tilted to provide an original coverage area 1302 with a center 1304. For purposes of discussion, let the cellular transmitter tilt be modified such that the cellular transmitter then provides an updated coverage area 1306 with a center 1308. The radius of updated coverage area 1306 and center 1308 have the following relationship:

$$R = \left(D \, \tan\left(-\tan^{-1}\left(\frac{h}{d+r}\right) + \tan^{-1}\left(\frac{h}{d}\right) - \tan^{-1}\left(\frac{h}{D}\right)\right) + h\right)$$
$$\left(-\cot\left(-\tan^{-1}\left(\frac{h}{d+r}\right) + \tan^{-1}\left(\frac{h}{d}\right) - \tan^{-1}\left(\frac{h}{D}\right)\right)\right)$$

wherein h is the height of cellular tower 1300, d is the distance from the cellular tower 1300 to center 1304, and r is the radius of original coverage area 1302.

Figure 13B:
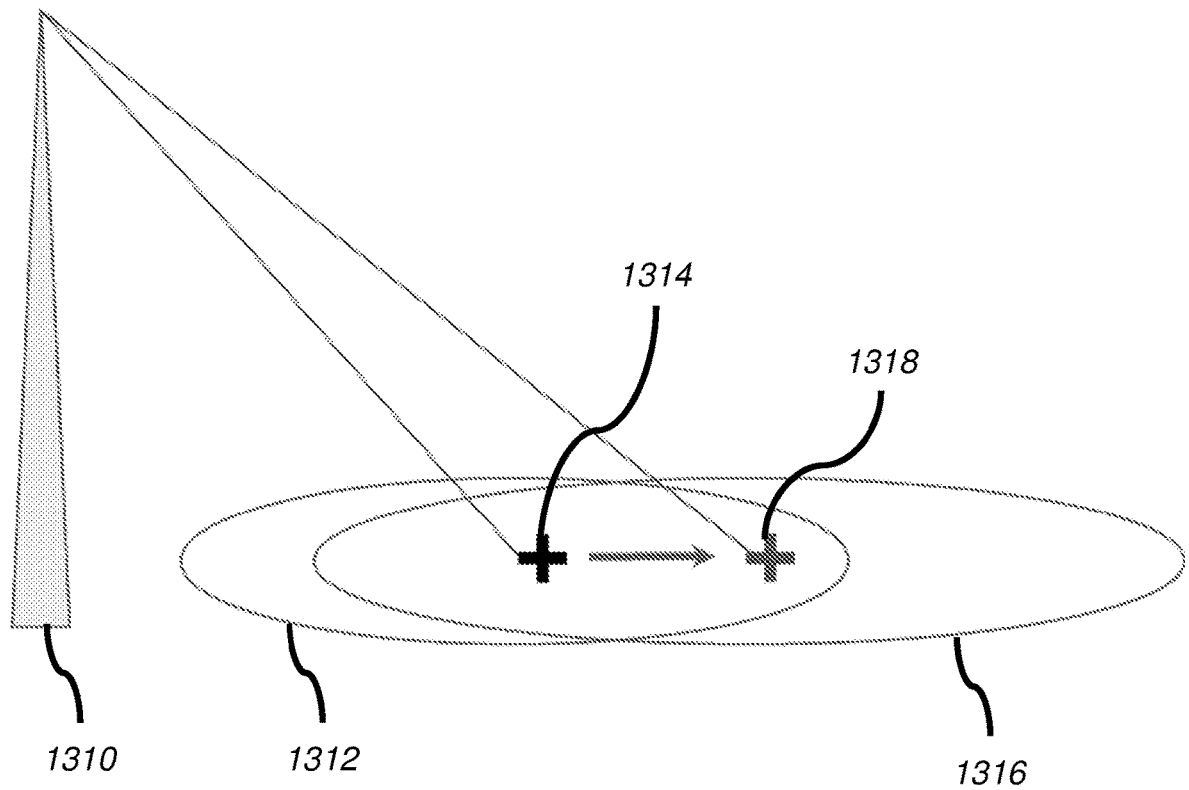
FIG. 13B illustrates how a new center and radius after a tilt change of a cellular transmitter of a cellular tower might affect each other when the new center is further away from the cellular transmitter of a cellular tower.

FIG. 13B illustrates how a new center and radius after a tilt change of a cellular transmitter of a cellular tower might affect each other when the new center is further away from the cellular transmitter of a cellular tower.

As shown in the figure, a cellular tower 1310 is configured such that the cellular transmitter is tilted to provide an original coverage area 1312 with a center 1314. For purposes of discussion, let the cellular transmitter tilt be modified such that the cellular transmitter then provides an updated coverage area 1316 with a center 1318.

FIGS. 13A-B demonstrate the nonlinear relationship between the new distance and coverage radius. As the distance decreases, the coverage radius additionally decreases. With the new coverage radius, in accordance with aspects of the present disclosure, a better estimation of the new desired cell center is achieved.

By modifying the tilt of the cellular transmitter, the coverage area may be changed. This will be described in greater detail with reference to FIGS. 14A-15B.

Figure 14A:
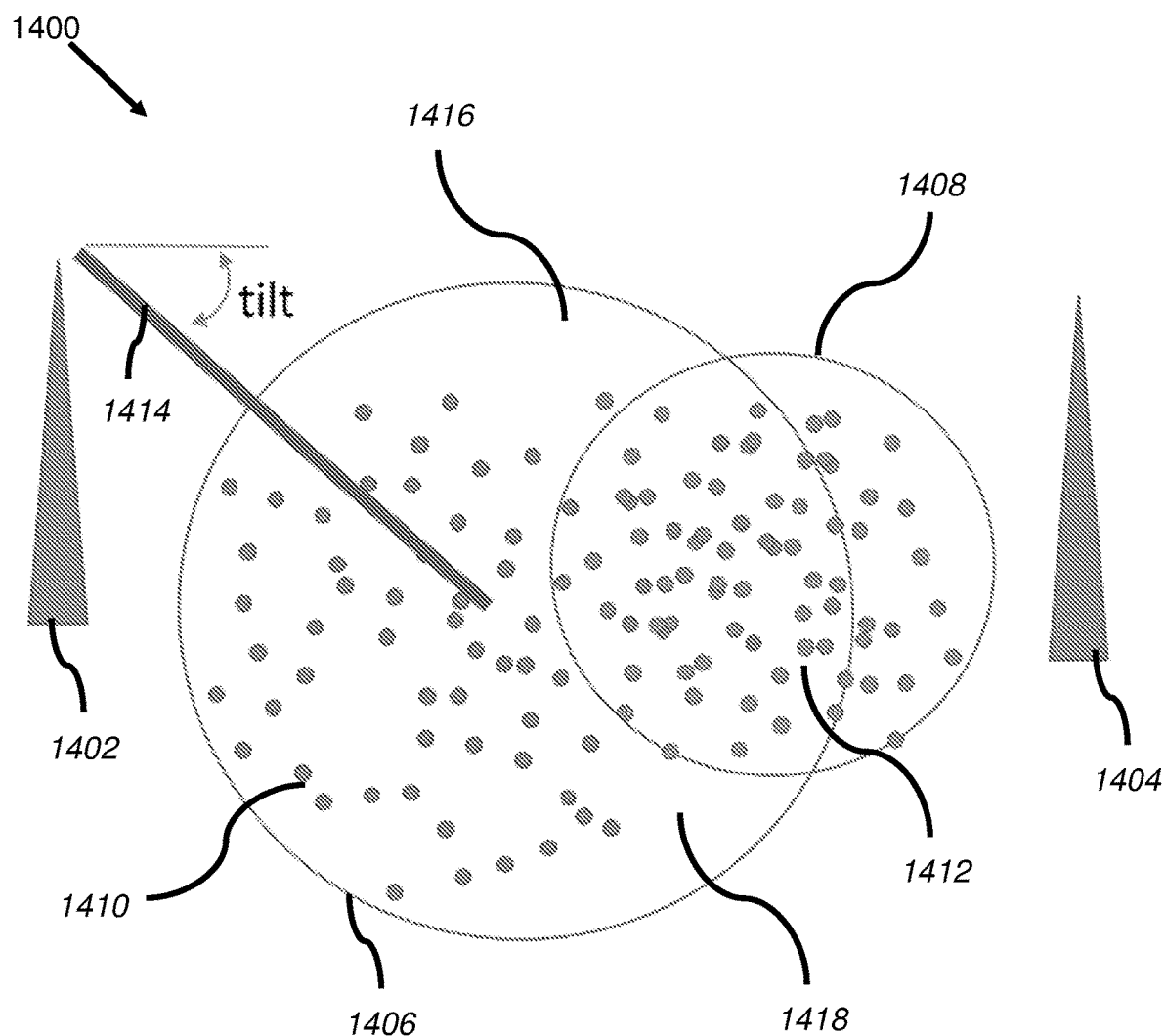
FIG. 14A illustrates a partial cellular network at a time $t_5$.

FIG. 14A illustrates a partial cellular network 1400 at a time $t_5$.

As shown in the figure, partial cellular network 1400 includes a cellular tower 1402, a cellular tower 1404 and a plurality of users. Cellular tower 1402 is configured to provide a coverage area 1406, whereas cellular tower 1404 is configured to provide a coverage area 1408. Cellular tower 1402 provides service to a plurality of users 1410 within coverage area 1406, whereas cellular tower 1404 provides service to a plurality of users 1412 within coverage area 1408.

Cellular tower 1402 provides coverage area 1408 based on a tilt of the cellular transmitter therein, as indicated by line 1414. It should be noted that coverage area 1406 includes much space without users, for example as indicated by space 1416 and 1418. As such, the energy that is used to transmit to these areas is lost, thus decreasing the efficiency of partial cellular network 1400. In accordance with aspects of the present disclosure, the tilt of the cellular transmitter in cellular tower 1402 may be adjusted to reduce this waste of energy. This will be described in greater detail with reference to FIG. 14B.

Figure 14B:
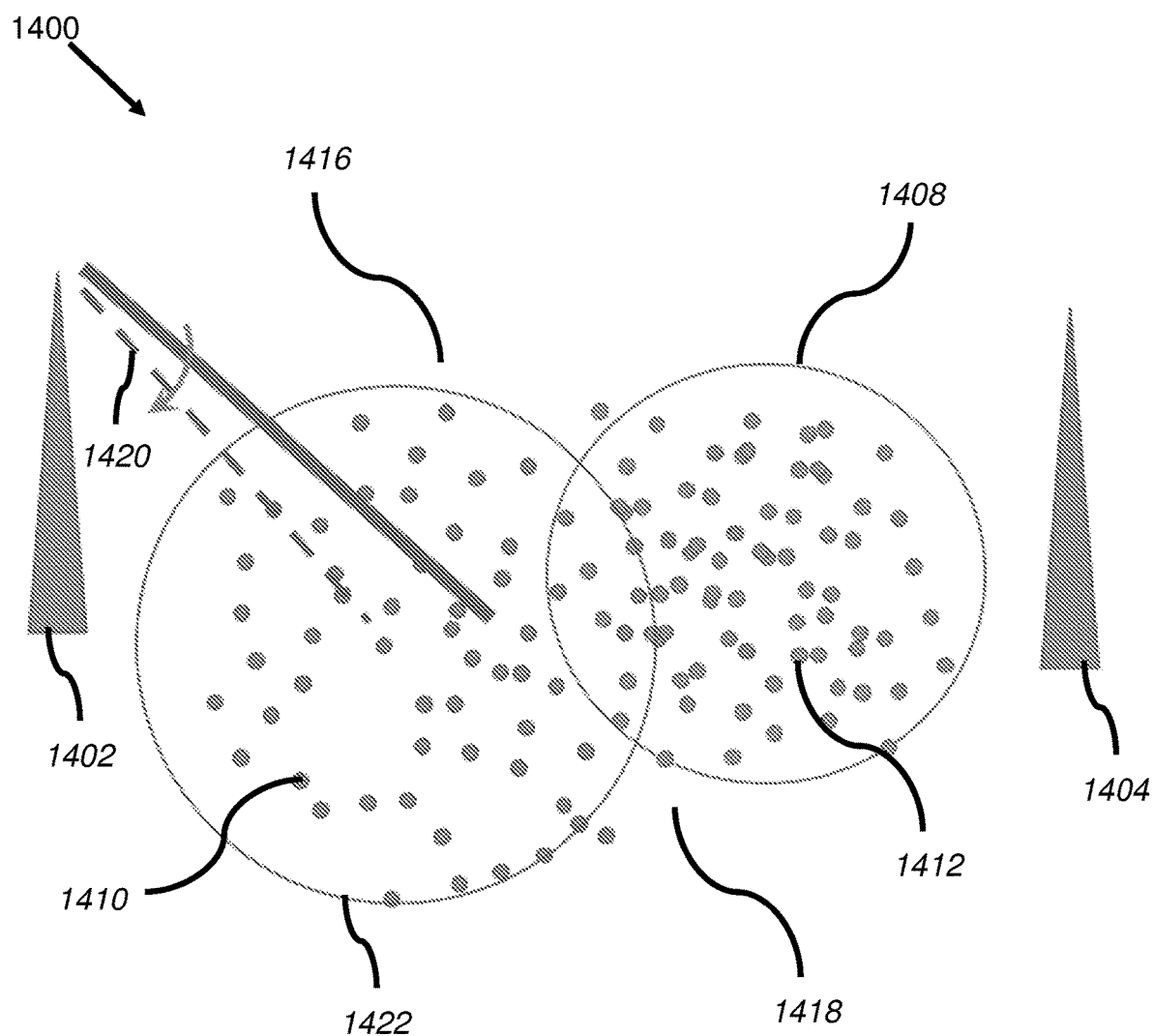
FIG. 14B illustrates the partial cellular network of FIG. 14A at a time to, after tilt tuning.

FIG. 14B illustrates the partial cellular network of FIG. 14A at a time $t_0$, after tilt tuning.

As shown in FIG. 14B, the cellular transmitter of cellular tower 1402 has been tilted to a new position as indicated by line 1420. This new tilt results in a smaller coverage area 1422. As a result, the areas 1416 and 1418, which did not have any users, are no longer receiving transmissions. Accordingly, a cellular transmitter in cellular tower 1402 is operating more efficiently.

In accordance with aspects of the present disclosure, a cellular network may be more efficiently operated by additionally or alternatively modifying the transmit power of a cellular transmitter of a cellular tower. This will be described in greater detail with reference to FIGS. 15A-B.

Figure 15A:
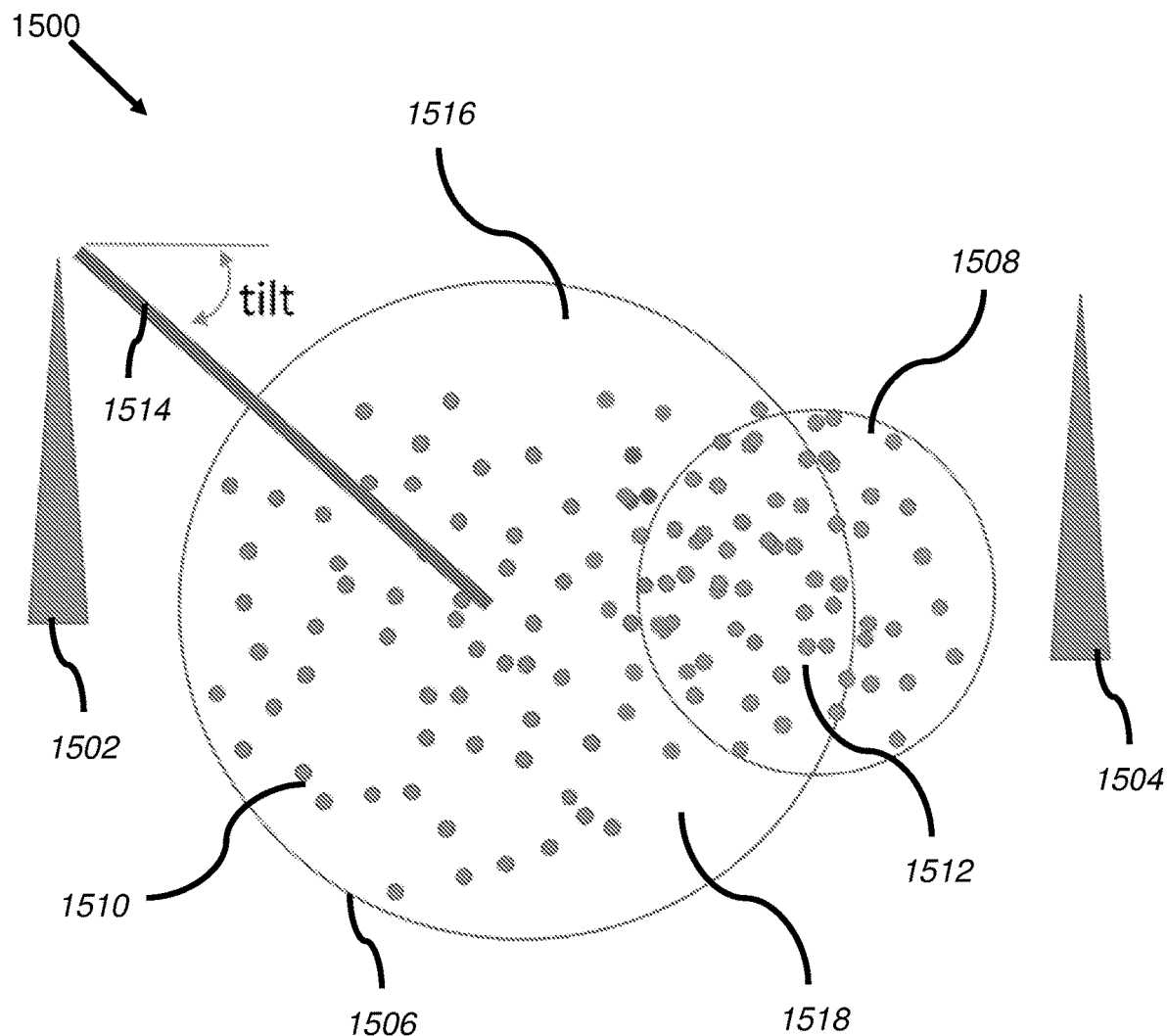
FIG. 15A illustrates a partial cellular network at a time $t_7$.

FIG. 15A illustrates a partial cellular network 1500 at a time $t_7$.

As shown in the figure, partial cellular network 1500 includes a cellular tower 1502, a cellular tower 1504 and a plurality of users. Cellular tower 1502 is configured to provide a coverage area 1506, whereas cellular tower 1504 is configured to provide a coverage area 1508. Cellular tower 1502 provides service to a plurality of users 1510 within coverage area 1506, whereas cellular tower 1504 provides service to a plurality of users 1512 within coverage area 1508.

Cellular tower 1502 provides coverage area 1506 based on a tilt of the cellular transmitter therein, as indicated by line 1514. It should be noted that coverage area 1506 includes much space without users, for example as indicated by space 1516 and 1518. As such, the energy that is used to transmit to these areas is lost, thus decreasing the efficiency of partial cellular network 1500. In accordance with aspects of the present disclosure, the tilt of the cellular transmitter in cellular tower 1502 may be adjusted to reduce this waste of energy. Further, the increase in the transmit power of the cellular transmitter in cellular tower 1504 may increase the coverage area to cover more users. This will be described in greater detail with reference to FIG. 15B.

Figure 15B:
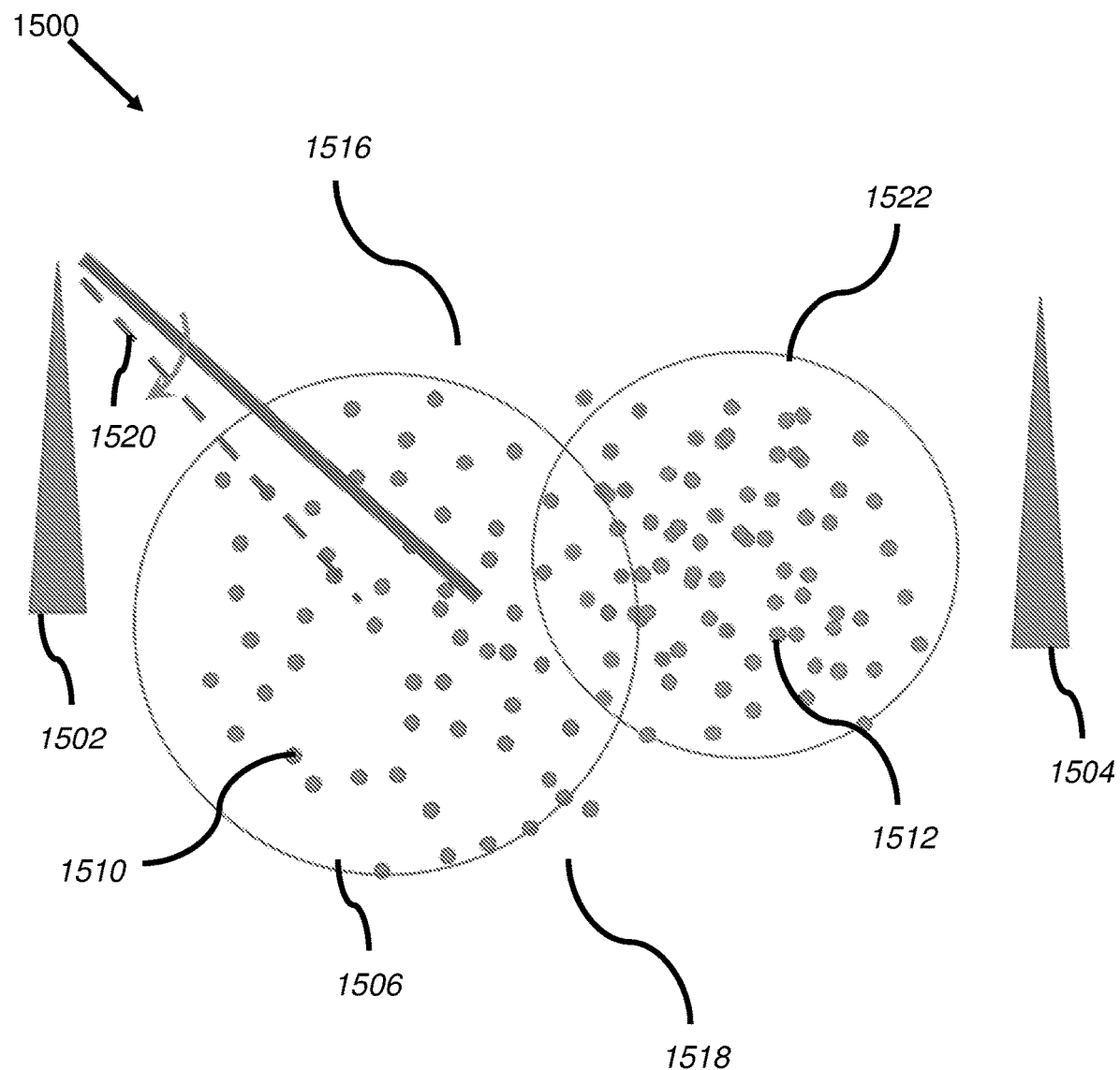
FIG. 15B illustrates the partial cellular network of FIG. 15A at a time $t_8$, after tilt tuning and transmit power tuning.

FIG. 15B illustrates the partial cellular network of FIG. 15A at a time $t_8$, after tilt tuning and transmit power tuning. As shown in FIG. 15B, cellular tower 1504 is configured to increase its transmission power to provide a coverage area 1522. Comparing the coverage area 1508 as shown in FIG. 15A with coverage area 1522 as shown in FIG. 15B, it is clear that coverage area 1522 is larger than coverage area 1508. Further, because coverage area 1522 is larger, there are more users covered by coverage area 1522.

Some non-limiting example methods of controlling the tilt and transmit power of a cellular transmitter of a cellular tower will now be described in greater detail with reference to FIGS. 16-19.

Figure 16:
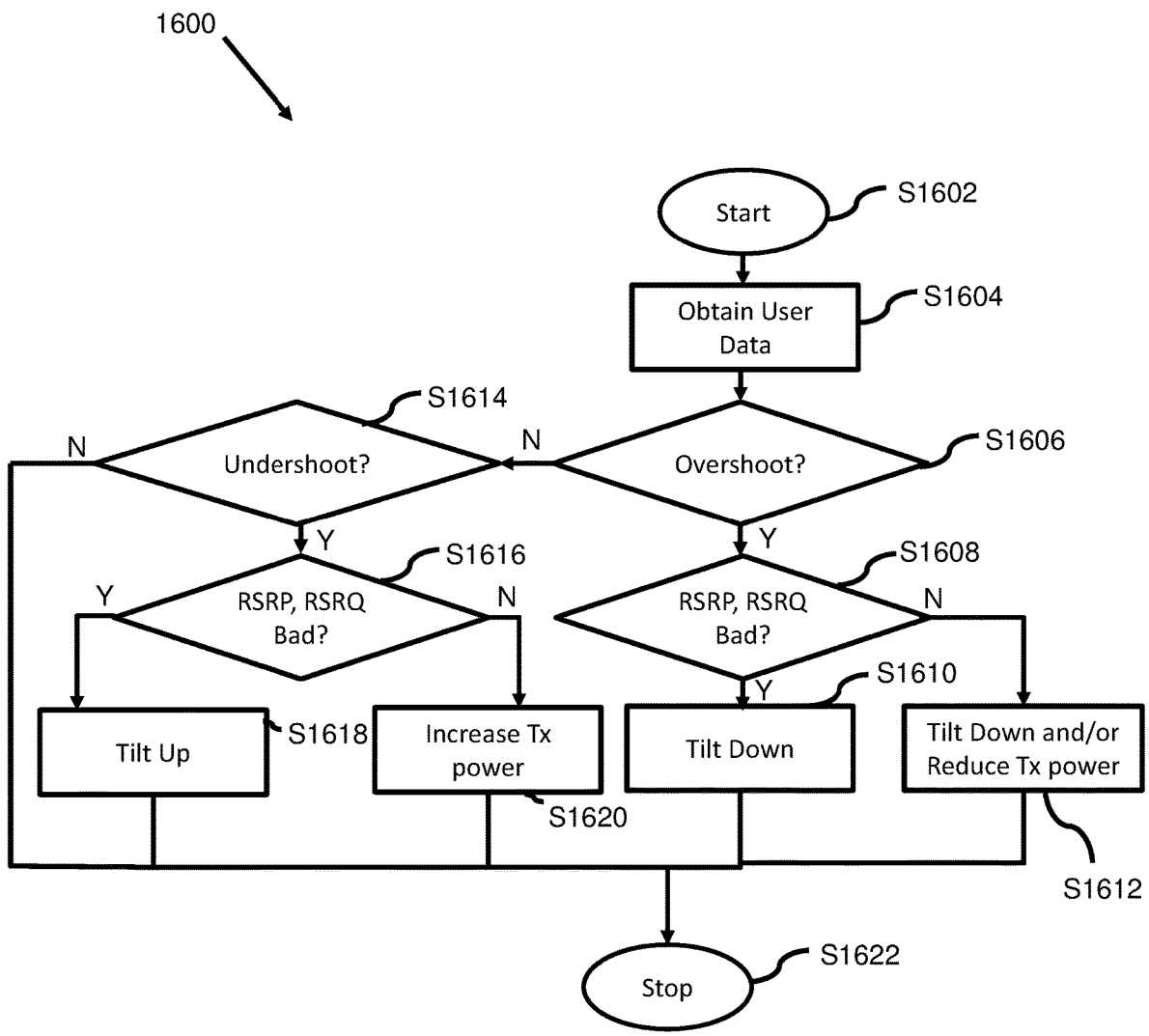
FIG. 16 illustrates an example process to be executed by a processor to control tilt tuning and transmit power tuning in accordance with aspects of the present disclosure.

FIG. 16 illustrates an example process 1600 to be executed by a processor to control tilt tuning and transmit power tuning of a cellular transmitter of a cellular tower in accordance with aspects of the present disclosure.

As shown in the figure, process 1600 starts (S1602) and user data is obtained (S1604). For example, as shown in FIG. 2A, MNO 202 provides user data 222 to ACOS 210.

Returning to FIG. 16, after user data is obtained (S1604) it is determined whether an overshoot is occurring (S1606). For example, as shown in FIG. 4A, system controller 402 may execute instructions in tower control program 412 as discussed above with reference to FIG. 6, to determine whether an overshoot is occurring.

Returning to FIG. 16, if it is determined that an overshoot is occurring (Y at S1606), then it is determined whether the reference signal received power (RSRP) and/or the reference signal received quality (RSRQ) are bad (S1608). For example, as shown in FIG. 4B, system controller 402 may execute instructions in tower control program 412 to analyze previously received user data, wherein the user data may include RSRQ and RSRP data.

In some examples, memory 404 additionally includes therein, thresholds for RSRQ and RSRP. In these examples, system controller 402 may execute instructions within tower control program 412 to cause system controller 402 to compare the RSRQ data and the RSRP data as collected from the user data with the respective thresholds for RSRQ and RSRP as stored in memory 404. If the RSRQ data and the RSRP data as collected from the user data is greater than respective thresholds for RSRQ and RSRP as stored in memory 404, then system controller 402 may determine that the RSRQ and/or the RSRP data is not bad. Alternatively, if the RSRQ data and the RSRP data as collected from the user data is less than respective thresholds for RSRQ and RSRP as stored in memory 404, then system controller 402 may determine that the RSRQ and/or the RSRP data is not bad Returning to FIG. 16, if at least one of the RSRQ or the RSRP are bad (Y at S1608), then the cellular transmitter of the cellular tower is tilted down (S1610). For example, returning to FIG. 4C, tilt control system 410 may generate tilt control signal 422. As shown in FIG. 4E system controller may include tilt control signal 422 in control signal 226.

As shown in FIG. 2C, the cellular transmitter of cellular tower 206 receives control signal 226 via communication channel 218, via WAN 208 and via communication channel 216. The tilt of cellular transmitter is then adjusted based on tilt control signal 422.

Returning to FIG. 16, after the cellular transmitter of the cellular tower is tilted down (S1610), process 1600 stops (S1622). In this aspect of the present disclosure, if there is an overshoot and the signal qualities, e.g., RSRP and RSRQ, are bad, then the transmitter is tilted down. This will focus the transmitted beam from the cellular tower more intensely and more closely to the cellular tower.

Returning to FIG. 16, if at least one of the RSRQ or the RSRP are not bad (N at S1608), then the cellular transmitter of the cellular tower is tilted down and/or the transmit power of the cellular transmitter of the cellular tower is reduced (S1612). In some examples, as discussed above with reference to FIG. 4D, transmit power control system 408 outputs transmit power control signal 424 to system controller 402. In some examples, as discussed above with reference to FIG. 4C, tilt control system 410 outputs tilt control signal 422 to system controller 402. As discussed above with reference to FIG. 4E, system controller, 402 is configured to output control signal 226 based on at least one of transmit power control signal 424 and tilt control signal 422.

As shown in FIG. 2C, ACOS 210 is configured to output control signal 226 to cellular tower 206 so as to perform at least one of: adjusting the transmit power of the cellular transmitter within cellular tower 206; and adjust the tilt of the cellular transmitter within cellular tower 206.

Returning to FIG. 16, after the cellular transmitter of the cellular tower is tilted down and/or the transmit power of the cellular transmitter of the cellular tower is reduced (S1612), process 1600 stops (S1622).

Returning to FIG. 16, if it is determined that an overshoot is not occuring (N at S1606), it is then determined whether an undershoot is occurring (S1614). For example, as shown in FIG. 4B, system controller 402 is configured to execute instructions in tower control program 412 to cause system controller 402 to determine whether an undershoot is occurring. This may be performed in a manner as discussed above with reference to FIG. 6.

Returning to FIG. 16, if it is determined that an undershoot is not occurring (N at S1614), then process 1600 stops (S1622). For example, if an overshoot is not occurring and an undershoot is not occurring, then the cellular transmitter of the cellular tower is operating normally.

Returning to FIG. 16, if it is determined that an undershoot is occurring (Y at S1614), then it is determined whether the RSRP and/or the RSRQ are bad (S1616). This may be performed as discussed above (see S1608). If at least one of the RSRQ or the RSRP are bad (Y at S1616), then the cellular transmitter of the cellular tower is tilted up (S1618). For example, returning to FIG. 4C, tilt control system 410 outputs tilt control signal 422 to system controller 402. System controller 402 executes instructions in tower control program 412 to cause communication system 406 to output tilt control signal 422 to cellular tower 206. As shown in FIG. 2C, tilt control signal 422 is transmitted to cellular tower 206 as control signal 226 via communication channel 218, WAN 208 and communication channel 216.

Upon receipt of tilt control signal 422, cellular tower 206 tilts up the cellular transmitter. As discussed above for example with reference to FIG. 10, the tilting up of the cellular transmitter moves the center of the cell further away from the cellular tower 206.

Returning to FIG. 16, after the cellular transmitter of the cellular tower is tilted up (S1618), process 1600 stops (S1622).

Returning to FIG. 16, if at least one of the RSRQ or the RSRP are not bad (N at S1616), then the transmit power of the cellular transmitter of the cellular tower is increased (S1620). For example, as shown in FIG. 4D, transmit power control system 418 outputs transmit power control signal 424 to system controller 402. System controller 402 executes instructions in tower control program 412 to cause communication system 406 to output transmit power control signal 424 to cellular tower 206. As shown in FIG. 2C, transmit power control signal 422 is transmitted to cellular tower 206 as control signal 226 via communication channel 218, WAN 208 and communication channel 216.

Upon receipt of transmit power control signal 422, cellular tower 206 increases the transmission power of the cellular transmitter. As discussed above for example with reference to FIG. 15B, the increasing of the transmission power of the cellular transmitter increases the coverage area and therefore accommodates more users.

Returning to FIG. 16, after the transmit power of the cellular transmitter of the cellular tower is increased (S1620), process 1600 stops (S1622).

Figure 17:
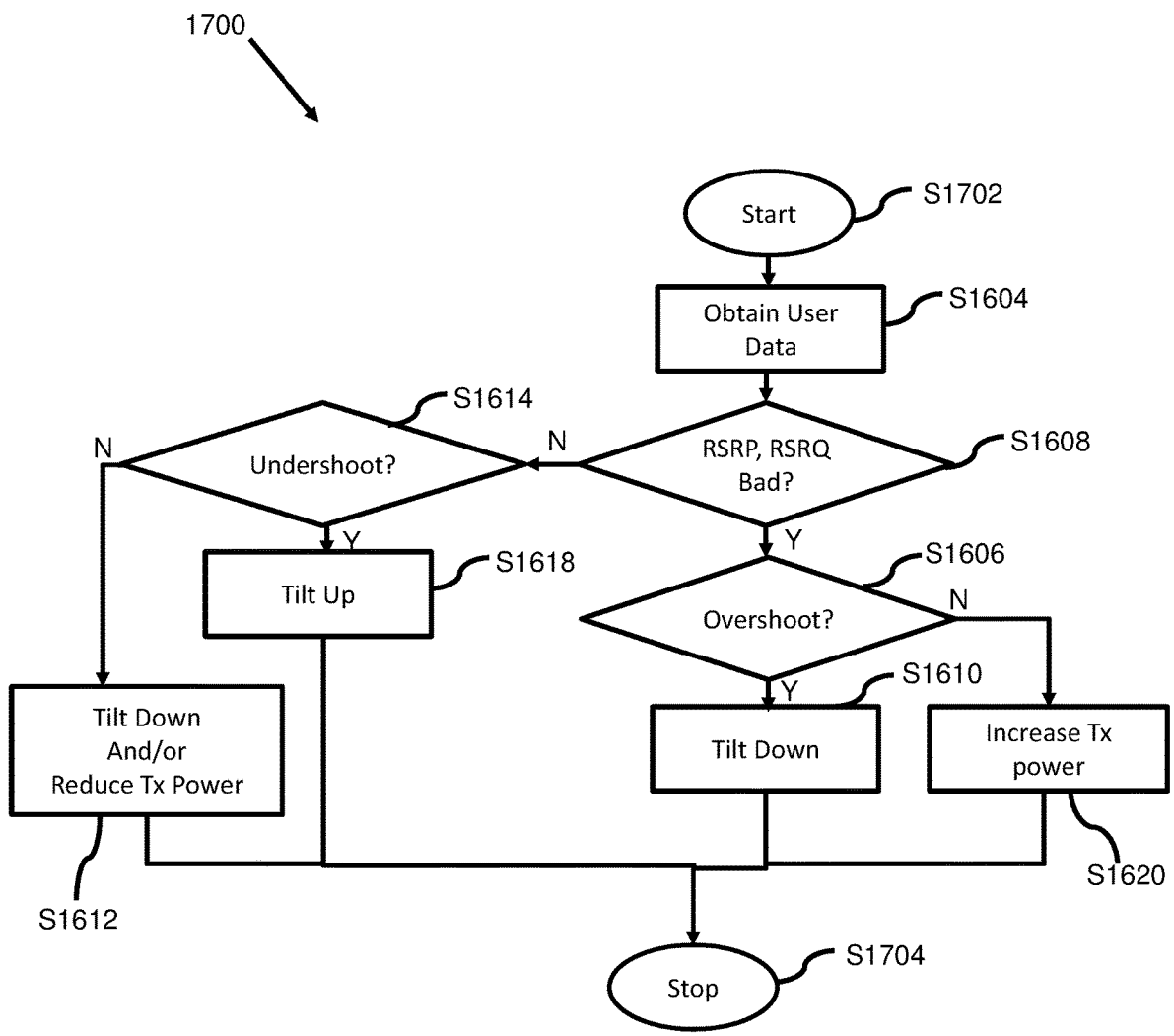
FIG. 17 illustrates another example process to be executed by a processor to control tilt tuning and transmit power tuning in accordance with aspects of the present disclosure.

FIG. 17 illustrates an example process 1700 to be executed by a processor to control tilt tuning and transmit power tuning of a cellular transmitter of a cellular tower in accordance with aspects of the present disclosure.

As shown in the figure, process 1700 starts (S1702) and user data is obtained (S1604). This may be performed in a manner as discussed above with reference to process 1600. After user data is obtained (S1604) it is determined whether the RSRP and/or the RSRQ are bad (S1608). This may be performed in a manner as discussed above with reference to process 1600. If it is determined that the RSRP and/or the RSRQ are bad (Y at S1608), then it is determined whether an overshoot is occurring (S1606). This may be performed in a manner as discussed above with reference to process 1600. If it is determined that an overshoot is not occurring (N as S1606), then the transmit power of the cellular transmitter of the cellular tower is increased (S1620). This may be performed in a manner similar to that discussed above with reference to process 1600. After the transmit power of the cellular transmitter of the cellular tower is increased (S1620), process 1700 stops (S1704).

If it is determined that an overshoot is occurring (Y at S1606), then the cellular transmitter of the cellular tower is tilted down (S1610). This may be performed in a manner as discussed above with reference to process 1600. After the cellular transmitter of the cellular tower is tilted down (S1610), process 1700 stops (S1704).

If it is determined that the RSRP and/or the RSRQ are not bad (N at S1608), then it is determined whether an undershoot is occurring (S1614). This may be performed in a manner as discussed above with reference to process 1600. If it is determined that an undershoot is not occurring (N at S1614), then then the cellular transmitter of the cellular tower is tilted down and/or the transmit power of the cellular transmitter of the cellular tower is reduced (S1612). After the cellular transmitter of the cellular tower is tilted down and/or the transmit power of the cellular transmitter of the cellular tower is reduced (S1612), process 1700 stops (S1704).

If it is determined that an undershoot is occurring (Y at S1614), then the cellular transmitter of the cellular tower is tilted up (S1618). This may be performed in a manner as discussed above with reference to process 1600. After the cellular transmitter of the cellular tower is tilted up (S1618), process 1700 stops (S1704).

Figure 18:
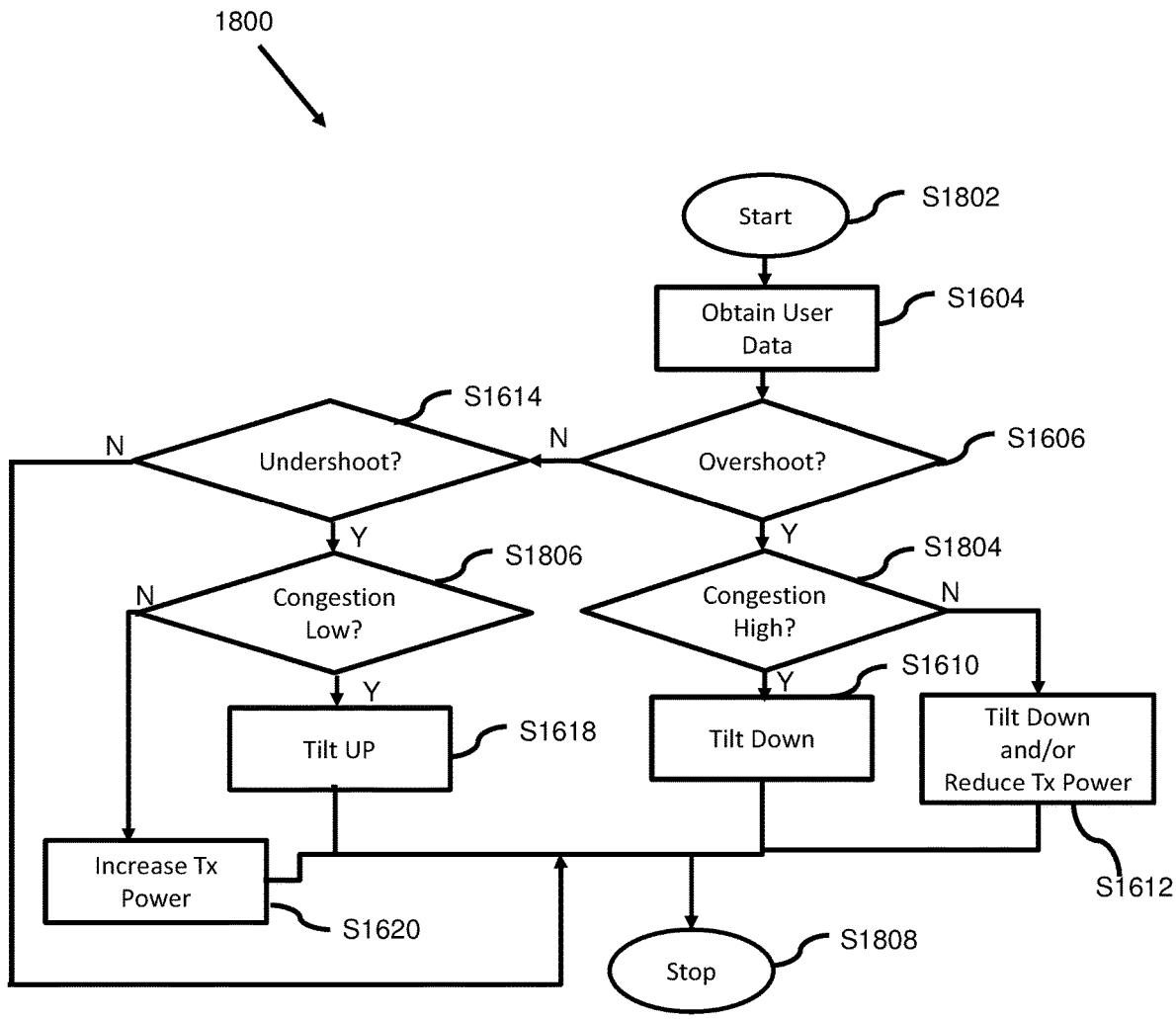
FIG. 18 illustrates yet another example process to be executed by a processor to control tilt tuning and transmit power tuning in accordance with aspects of the present disclosure.

FIG. 18 illustrates an example process 1800 to be executed by a processor to control tilt tuning and transmit power tuning of a cellular transmitter of a cellular tower in accordance with aspects of the present disclosure.

As shown in the figure, process 1800 starts (S1802) and user data is obtained (S1604). This may be performed in a manner as discussed above with reference to process 1600. After user data is obtained (S1604), it is determined whether an overshoot is occurring (S1606). This may be performed in a manner as discussed above with reference to process 1600. If it is determined that an overshoot is occurring (Y at S1606), then it is determined whether traffic congestion is high through the cellular transmitter of the cellular tower (S1804). For example, as discussed above with reference to FIG. 4A, system controller 402 receives user data 222. The user data 222 may include parameters associated with the transmission and reception of signals by cellular tower 206.

In some examples, memory 404 includes a threshold value for traffic congestion. System controller 402 may execute instructions in tower control program 412 to cause system controller 402 to compare the traffic congestion value from user data 222 with the threshold values in memory 404. If the traffic congestion values from user data 222 is less than the traffic congestion threshold value in memory 404, then the traffic congestion value from user data 222 may be considered low. However, if the traffic congestion value from user data 222 are greater than or equal to the traffic congestion threshold value in memory 404, then the traffic congestion value from user data 222 may be considered high.

Returning to FIG. 18, if traffic congestion is high (Y at S1804), then the cellular transmitter of the cellular tower is tilted down (S1610). This may be performed in a manner as discussed above with reference to process 1600. After the cellular transmitter of the cellular tower is tilted down (S1610), process 1800 stops (S1808).

If traffic congestion is not high (N at S1804), then the cellular transmitter of the cellular tower is tilted down and/or the transmit power of the cellular transmitter of the cellular tower is reduced (S1612). This may be performed in a manner as discussed above with reference to process 1600. After the cellular transmitter of the cellular tower is tilted down and/or the transmit power of the cellular transmitter of the cellular tower is reduced (S1612), process 1800 stops (S1808).

If it is determined that an overshoot is not occuring (N at S1606), it is then determined whether an undershoot is occurring (S1614). This may be performed in a manner as discussed above with reference to process 1600. If it is determined that an undershoot is not occurring (N at S1614), then process 1800 stops (S1808).

If it is determined that an undershoot is occurring (Y at S1614), then it is determined whether traffic congestion is low through the cellular transmitter of the cellular tower (S1806).

If it is determined that traffic congestion is low (Y at S1806), then the cellular transmitter of the cellular tower is tilted up (S1618). This may be performed in a manner as discussed above with reference to process 1600. After the cellular transmitter of the cellular tower is tilted up (S1618), process 1800 stops (S1808).

If it is determined that traffic congestion is low (N at S1806), then the transmit power of the cellular transmitter of the cellular tower is increased (S1620). This may be performed in a manner as discussed above with reference to process 1600. After the transmit power of the cellular transmitter of the cellular tower is increased (S1620), process 1800 stops (S1808).

Figure 19:
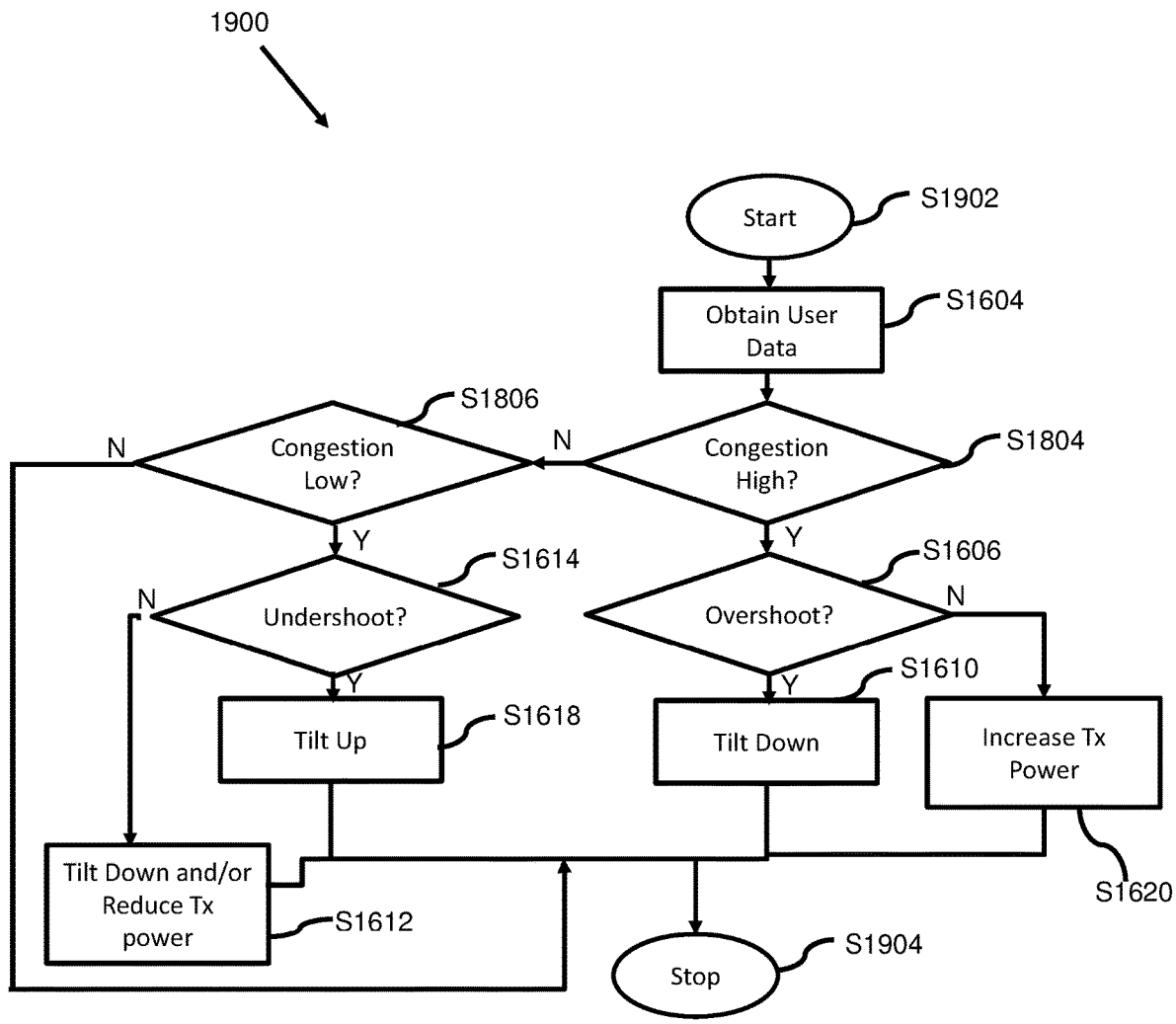
FIG. 19 illustrates still yet another example process to be executed by a processor to control tilt tuning and transmit power tuning in accordance with aspects of the present disclosure.

FIG. 19 illustrates an example process 1900 to be executed by a processor to control tilt tuning and transmit power tuning of a cellular transmitter of a cellular tower in accordance with aspects of the present disclosure.

As shown in the figure, process 1900 starts (S1902) and user data is obtained (S1604). This may be performed in a manner as discussed above with reference to process 1600. After user data is obtained (S1604), then it is determined whether traffic congestion is high through the cellular transmitter of the cellular tower (S1804). This may be performed in a manner as discussed above with reference to process 1800. If it is determined that traffic congestion is high (Y at S1804), then it is determined whether an overshoot is occurring (S1606). This may be performed in a manner as discussed above with reference to process 1600. If it is determined that an overshoot is occurring (Y at S1606), then the cellular transmitter of the cellular tower is tilted down (S1610). This may be performed in a manner as discussed above with reference to process 1600. After the cellular transmitter of the cellular tower is tilted down (S1610), process 1900 stops (S1904).

If it is determined that an overshoot is not occurring (N at S1606), then the transmit power of the cellular transmitter of the cellular tower is increased (S1620). This may be performed in a manner as discussed above with reference to process 1600. After the transmit power of the cellular transmitter of the cellular tower is increased (S1620), process 1900 stops (S1904).

If traffic congestion is not high (N at S1804), then it is determined whether traffic congestion is low through the cellular transmitter of the cellular tower (S1806). This may be performed in a manner as discussed above with reference to process 1800. If it is determined that congestion is not low (N at S1806), then process 1900 stops (S1904). If it is determined that congestion is low (Y at S1806), then it is determined whether an undershoot is occurring (S1614). This may be performed in a manner as discussed above with reference to process 1600. If it is determined that an undershoot is not occurring (N at S1614), then the cellular transmitter of the cellular tower is tilted down and/or the transmit power of the cellular transmitter of the cellular tower is reduced (S1612). This may be performed in a manner as discussed above with reference to process 1600. After the cellular transmitter of the cellular tower is tilted down and/or the transmit power of the cellular transmitter of the cellular tower is reduced (S1612), process 1900 stops (S1904).

If it is determined that an undershoot is occurring (Y at S1614), then the cellular transmitter of the cellular tower is tilted up (S1618). This may be performed in a manner as discussed above with reference to process 1600. After the cellular transmitter of the cellular tower is tilted up (S1618), process 1900 stops (S1904).

Figure 20:
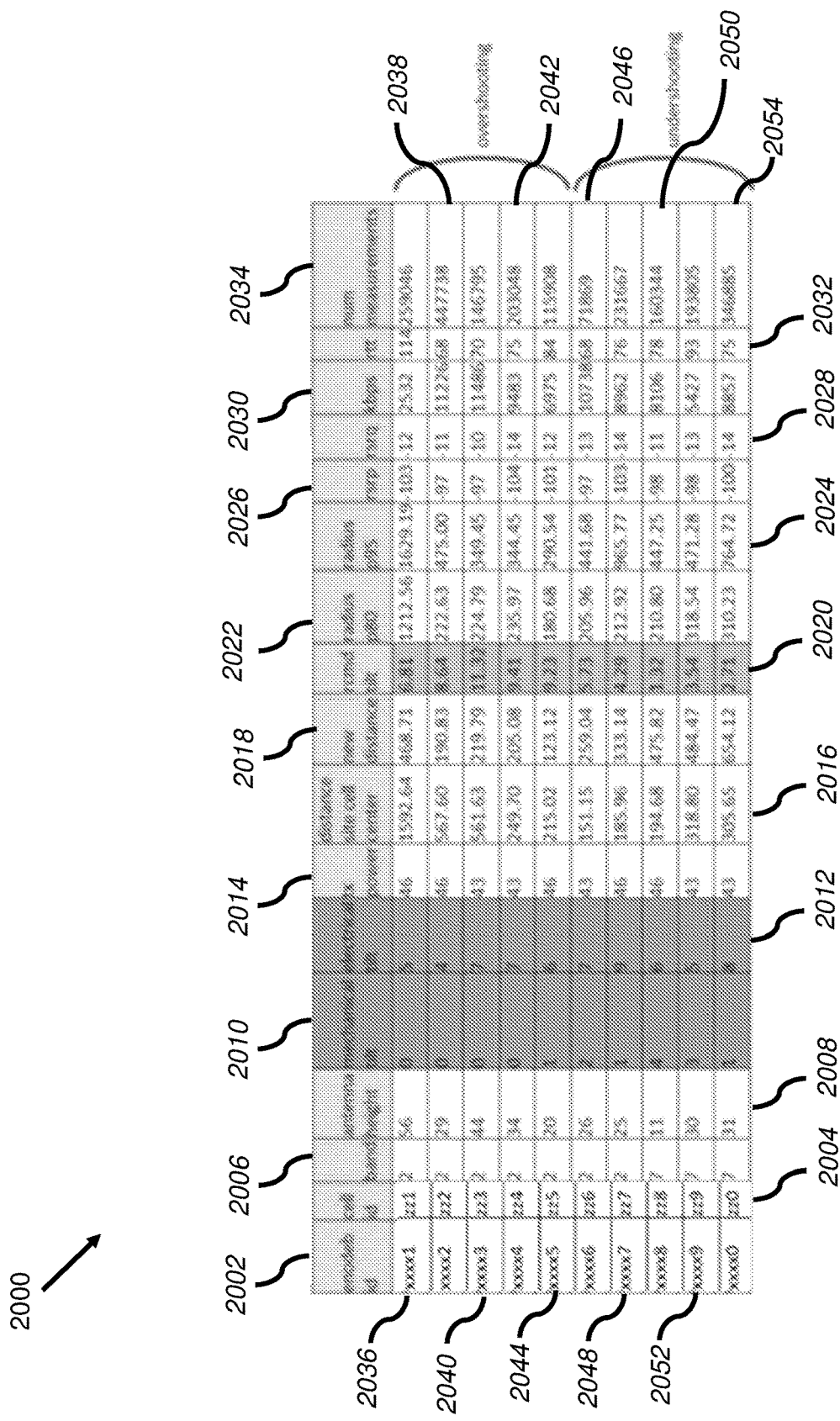
FIG. 20 illustrates a table of exemplary results for tuning a transmitting antenna of a cellular transmitter of a cellular tower in accordance with aspects of the present disclosure.

FIG. 20 illustrates a table 2000 of exemplary results for tuning a transmitting antenna of a cellular transmitter of a cellular tower in accordance with aspects of the present disclosure.

As shown in the figure, chart 2000 includes columns 2002, 2004, 2006, 2008, 2010, 2012, 2014, 2016, 2018, 2020, 2022, 2024, 2026, 2028, 2030, 2032, and 2034, and rows 2036, 2038, 2040, 2042, 2044, 2046, 2048, 2050, 2052, and 2054.

Column 2002 identifies the eNodeB in a manner similar to column 604 discussed above with reference to chart 600 of FIG. 6.

Column 2004 indicates the cell identification in a manner similar to column 606 discussed above with reference to chart 600 of FIG. 6.

Column 2006 indicates that band for which the cellular towers are communicating in a manner similar to column 608 discussed above with reference to chart 600 of FIG. 6.

Column 2008 is the height of the tower transmitter measured in meters.

Column 2010 is the mechanical tilt as provided by MNO 202. The mechanical tilt is a tilt that is manually set, and changed as needed, on site by a technician.

Column 2012 is the electrical tilt as provided by the MNO 202. The electrical tilt is a tilt that may be remotely set, and changed as needed, by a technician.

Column 2014 is the transmit power of the cellular transmitter.

Column 2016 is the distance from the cellular tower to the cell center, similar to column 610 discussed above with reference to chart 600 of FIG. 6.

Column 2018 is the distance to the new center of the cell from the cellular tower. This distance is determined in accordance with aspects of the present disclosure as discussed above with reference to FIGS. 7-15B.

Column 2020 is the recommended tilt to arrive at the distance as indicated in column 2018. This recommended tilt is determined in accordance with aspects of the present disclosure as discussed above with reference to FIGS. 16-19.

Column 2022 the radius of the user distribution at the $80^{th}$ percentile, similar to column 612 discussed above with reference to chart 600 of FIG. 6.

Column 2024 is the radius of the user distribution at the $95^{th}$ percentile, similar to column 614 discussed above with reference to chart 600 of FIG. 6.

Column 2026 is the measured RSRP in dBm, similar to column 644 discussed above with reference to chart 600 of FIG. 6.

Column 2028 is the measured RSRQ in dB, similar to column 646 discussed above with reference to chart 600 of FIG. 6.

Column 2030 is the download speed in kbps captured in the application layer, similar to column 648 discussed above with reference to chart 600 of FIG. 6.

Column 2032 is rtt in ms captured at layers such as transport layer, similar to column 650 discussed above with reference to chart 600 of FIG. 6.

Column 2034 is the number of samples or the number of measurements associated with a respective cellular tower, similar to column 652 discussed above with reference to chart 600 of FIG. 6.

is a count of cells in coverage geometry size up to the cell center minus one half of the radius of the user distribution at the $80^{th}$ percentile.

Rows 2036, 2038, 2040, 2042, 2044, 2046, 2048, 2050, 2052, and 2054 correspond to different respective cellular towers.

In this example, rows 2036, 2038, 2040, 2042, and 2044 correspond to overshooting cellular transmitters. As such, in accordance with aspects of the present disclosure, as indicated in column 2018, a new distance to the center of the cell is determined. As each one of these cellular transmitters is overshooting, the respective new distances are each closer to the respective cellular transmitters. In order to obtain the new closer distance as indicated in column 2018, in accordance with aspects of the present disclosure, the cellular transmitters corresponding to each of these rows is recommended to be tilted down to the respective degrees indicated in column 2020. For example, in row 2036, the current tilt of the cellular transmitter is 5 degrees. However, as indicated in column 2020, in accordance with aspects of the present disclosure, the cellular transmitter is recommended to be tilted to 6.81 degrees.

On the other hand, rows 2046, 2048, 2050, 2052, and 2054 correspond to undershooting cellular transmitters. As such, in accordance with aspects of the present disclosure, as indicated in column 2018, a new distance to the center of the cell is determined. As each one of these cellular transmitters is undershooting, the respective new distances are each further away from the respective cellular transmitters. In order to obtain the new further distance as indicated in column 2018, in accordance with aspects of the present disclosure, the cellular transmitters corresponding to each of these rows is to be tilted up by the respective degrees indicated in column 2020. The current tilt of a respective cellular transmitter corresponds to the sum of the mechanical tilt as indicated in column 210 and the electrical tilt indicated in column 2012. Therefore, the recommended tilt as indicated in column 2020 is the additional tilt upward to the current tilt. For example, in row 2046, the current tilt of the cellular transmitter is 9 degrees. However, as indicated in column 2020, in accordance with aspects of the present disclosure, the cellular transmitter is recommended to be tilted to only 5.73 degrees.

EXAMPLES

In accordance with an aspect of the present disclosure, an antenna configuration optimization system (ACOS) is provided for use with a first plurality of data samples of a first plurality of cellular devices connected to a cellular antenna configured with a first set of parameters and with a second plurality of data samples of a second plurality of cellular devices connected to the cellular antenna with a second set of parameters. The ACOS includes: a memory having instructions stored therein; and a processor configured to execute the instructions stored in the memory to cause the ACOS to: obtain the first plurality of data samples and the second plurality of data samples; store the obtained first plurality of data samples and the second plurality of data samples into the memory; detect at least one of a cell overshoot and a cell undershoot of the cellular antenna with the first set of parameters and the cellular antenna with the second set of parameters based on the first plurality of data samples and the second plurality of data samples; and output a recommendation for a reconfiguration of at least one of an antenna tilt and transmit power for the at least one of the cell overshoot and the cell undershoot of the cellular antenna.

In some configurations of this aspect, each of the first plurality of data samples includes a respective of at least one of device geo location data, a performance measuring metric data, and combinations thereof.

In some configurations of this aspect, the processor is configured to execute the instructions stored in the memory to cause the ACOS to detect at least one of the cell overshoot and the cell undershoot of the cellular antenna, based on at least one of: cell site location information of the cellular antenna; cell to cell site mapping indicating a relationship of one or multiple cells belonging to a cell site; cell centroid location information of the cellular antenna with the first set of parameters and the cellular antenna with the second set of parameters, wherein the cell centroid location information is determined based on location information of the first plurality of data samples and the second plurality of data samples; cell radius information of the cellular antenna with the first set of parameters and the cellular antenna with the second set of parameters, wherein the cell radius information is determined based on location information of the first plurality of data samples and the second plurality of data samples; a distance between a cell site location and a cell centroid location of the cellular antenna with the first set of parameters and the cellular antenna with the second set of parameters; a count of additional neighboring cell sites within a geometry of the cellular antenna with the first set of parameters and the cellular antenna with the second set of parameters; a count of additional neighboring cell centroids within a geometry of the cellular antenna with the first set of parameters and the cellular antenna with the second set of parameters; one or multiple distances of a cell site of the cellular antenna and one or multiple neighboring cell sites, respectively, of the cellular antenna; and one or multiple distances of a cell site of the cellular antenna and one or multiple neighboring cell centroids, respectively, of the cellular antenna.

In some configurations of this aspect, the each of the first plurality of data samples and the second plurality of data samples includes respective location information related to latitude and longitude of each data sample.

In some configurations of this aspect, the processor is configured to execute the instructions stored in the memory to cause the ACOS to output the recommendation for the reconfiguration of the at least one of the antenna tilt and transmit power for the at least one of the cell overshoot and the cell undershoot of the cellular antenna such that the recommendation is based on a desired cell centroid, wherein the desired cell centroid is determined by at least one of: a distance of a cell site of the cellular antenna and one or multiple neighboring cell sites, respectively, of the cellular antenna; a count of additional neighboring cell sites within a geometry of the cellular antenna with the first set of parameters and the cellular antenna with the second set of parameters; a count of additional neighboring cell centroids within a geometry of the cellular antenna with the first set of parameters and the cellular antenna with the second set of parameters; a radius of a cell geographic coverage area determined based on location information of the first plurality of data samples and the second plurality of data samples; and one or multiple radiuses of one or multiple geographic coverage areas, respectively, of one or multiple neighboring cellular antennas, respectively.

In some configurations of this aspect, the processor is configured to execute the instructions stored in the memory to cause the ACOS to output the recommendation for the reconfiguration of the at least one of the antenna tilt and transmit power for the at least one of the cell overshoot and the cell undershoot of the cellular antenna by outputting a prioritization for at least one of a plurality cells and cell sites, wherein the prioritization is based on at least one of: a count of data samples within a cell of the one or multiple cellular antennas with the first set of parameters and a cell of the one or multiple cellular antennas with the second set of parameters; one or multiple performance metrics of the cell of the one or multiple cellular antennas with the first set of parameters and a cell of the one or multiple cellular antennas with the second set of parameters, where in the performance metrics include at least one of a download speed, a latency, a signal strength and a signal quality; a change of a tilt value; and a change of transmit power value.

In some configurations of this aspect, the processor is configured to execute the instructions stored in the memory to cause the ACOS to output the recommendation for the reconfiguration of the at least one of the antenna tilt and transmit power for the at least one of the cell overshoot and the cell undershoot of the cellular antenna such that the recommendation includes at least one of: a tilt value for a total of an electric tilt and a mechanical tilt of the cellular antenna; an electric tilt value of the cellular antenna; a transmit power value of the cellular antenna; a change of a tilt value of the cellular antenna; and a change of a transmit power value of the cellular antenna.

In accordance with another aspect of the present disclosure, a method is provided of optimizing a cellular antenna configuration of a cellular antenna for use with a first plurality of data samples of a first plurality of cellular devices connected to the cellular antenna configured with a first set of parameters and with a second plurality of data samples of a second plurality of cellular devices connected to the cellular antenna with a second set of parameters. The method includes: obtaining, via a processor configured to execute the instructions stored in a memory, the first plurality of data samples and the second plurality of data samples; storing, via the processor, the obtained first plurality of data samples and the second plurality of data samples into the memory; detecting, via the processor, at least one of a cell overshoot and a cell undershoot of the cellular antenna with the first set of parameters and the cellular antenna with the second set of parameters based on the first plurality of data samples and the second plurality of data samples; and outputting, via the processor, a recommendation for a reconfiguration of at least one of an antenna tilt and transmit power for the at least one of the cell overshoot and the cell undershoot of the cellular antenna In some configurations of this aspect, the obtaining the first plurality of data samples and the second plurality of data samples includes obtaining each of the first plurality of data samples so as to include a respective of at least one of device geo location data, a performance measuring metric data, and combinations thereof.

In some configurations of this aspect, the detecting at least one of the cell overshoot and the cell undershoot of the cellular antenna is based on at least one of: cell site location information of the cellular antenna; cell to cell site mapping indicating a relationship of one or multiple cells belonging to a cell site; cell centroid location information of the cellular antenna with the first set of parameters and the cellular antenna with the second set of parameters, wherein the cell centroid location information is determined based on location information of the first plurality of data samples and the second plurality of data samples; cell radius information of the cellular antenna with the first set of parameters and the cellular antenna with the second set of parameters, wherein the cell radius information is determined based on location information of the first plurality of data samples and the second plurality of data samples; a distance between a cell site location and a cell centroid location of the cellular antenna with the first set of parameters and the cellular antenna with the second set of parameters; a count of additional neighboring cell sites within a geometry of the cellular antenna with the first set of parameters and the cellular antenna with the second set of parameters; a count of additional neighboring cell centroids within a geometry of the cellular antenna with the first set of parameters and the cellular antenna with the second set of parameters; one or multiple distances of a cell site of the cellular antenna and one or multiple neighboring cell sites, respectively, of the cellular antenna; and one or multiple distances of a cell site of the cellular antenna and one or multiple neighboring cell centroids, respectively, of the cellular antenna.

In some configurations of this aspect, the obtaining the first plurality of data samples and the second plurality of data samples includes obtaining each of the first plurality of data samples and each of the second plurality of data samples so as to include respective location information related to latitude and longitude of each data sample.

In some configurations of this aspect, the outputting the recommendation for the reconfiguration of the at least one of the antenna tilt and transmit power for the at least one of the cell overshoot and the cell undershoot of the cellular antenna is based on a desired cell centroid, wherein the desired cell centroid is determined by at least one of: a distance of a cell site of the cellular antenna and one or multiple neighboring cell sites, respectively, of the cellular antenna; a count of additional neighboring cell sites within a geometry of the cellular antenna with the first set of parameters and the cellular antenna with the second set of parameters; a count of additional neighboring cell centroids within a geometry of the cellular antenna with the first set of parameters and the cellular antenna with the second set of parameters; a radius of a cell geographic coverage area determined based on location information of the first plurality of data samples and the second plurality of data samples; and one or multiple radiuses of one or multiple geographic coverage areas, respectively, of one or multiple neighboring cellular antennas, respectively.

In some configurations of this aspect, the outputting the recommendation for the reconfiguration of the at least one of the antenna tilt and transmit power for the at least one of the cell overshoot and the cell undershoot of the cellular antenna includes outputting a prioritization for at least one of a plurality cells and cell sites, wherein the prioritization is based on at least one of: a count of data samples within a cell of the one or multiple cellular antennas with the first set of parameters and a cell of the one or multiple cellular antennas with the second set of parameters; one or multiple performance metrics of the cell of the one or multiple cellular antennas with the first set of parameters and a cell of the one or multiple cellular antennas with the second set of parameters, where in the performance metrics include at least one of a download speed, a latency, a signal strength and a signal quality; a change of a tilt value; and a change of transmit power value.

In some configurations of this aspect, the outputting the recommendation for the reconfiguration of the at least one of the antenna tilt and transmit power for the at least one of the cell overshoot and the cell undershoot of the cellular antenna, includes outputting the recommendation so as to include at least one of: a tilt value for a total of an electric tilt and a mechanical tilt of the cellular antenna; an electric tilt value of the cellular antenna; a transmit power value of the cellular antenna; a change of a tilt value of the cellular antenna; and a change of a transmit power value of the cellular antenna.

In accordance with another aspect of the present disclosure, a non-transitory, computer-readable media having computer-readable instructions stored thereon is provided, the computer-readable instructions being capable of being read by an ACOS for use with a first plurality of data samples of a first plurality of cellular devices connected to a cellular antenna configured with a first set of parameters and with a second plurality of data samples of a second plurality of cellular devices connected to the cellular antenna with a second set of parameters. The computer-readable instructions are capable of instructing the ACOS to perform the method including: obtaining, via a processor configured to execute the instructions stored in a memory, the first plurality of data samples and the second plurality of data samples; storing, via the processor, the obtained first plurality of data samples and the second plurality of data samples into the memory; detecting, via the processor, at least one of a cell overshoot and a cell undershoot of the cellular antenna with the first set of parameters and the cellular antenna with the second set of parameters based on the first plurality of data samples and the second plurality of data samples; and outputting, via the processor, a recommendation for a reconfiguration of at least one of an antenna tilt and transmit power for the at least one of the cell overshoot and the cell undershoot of the cellular antenna.

In some configurations of this aspect, the computer-readable instructions are capable of instructing the ACOS to perform the method wherein the obtaining the first plurality of data samples and the second plurality of data samples includes obtaining each of the first plurality of data samples so as to include a respective of at least one of device geo location data, a performance measuring metric data, and combinations thereof.

In some configurations of this aspect, the computer-readable instructions are capable of instructing the ACOS to perform the method wherein the detecting at least one of the cell overshoot and the cell undershoot of the cellular antenna is based on at least one of: cell site location information of the cellular antenna; cell to cell site mapping indicating a relationship of one or multiple cells belonging to a cell site; cell centroid location information of the cellular antenna with the first set of parameters and the cellular antenna with the second set of parameters, wherein the cell centroid location information is determined based on location information of the first plurality of data samples and the second plurality of data samples; cell radius information of the cellular antenna with the first set of parameters and the cellular antenna with the second set of parameters, wherein the cell radius information is determined based on location information of the first plurality of data samples and the second plurality of data samples; a distance between a cell site location and a cell centroid location of the cellular antenna with the first set of parameters and the cellular antenna with the second set of parameters; a count of additional neighboring cell sites within a geometry of the cellular antenna with the first set of parameters and the cellular antenna with the second set of parameters; a count of additional neighboring cell centroids within a geometry of the cellular antenna with the first set of parameters and the cellular antenna with the second set of parameters; one or multiple distances of a cell site of the cellular antenna and one or multiple neighboring cell sites, respectively, of the cellular antenna; and one or multiple distances of a cell site of the cellular antenna and one or multiple neighboring cell centroids, respectively, of the cellular antenna.

In some configurations of this aspect, the computer-readable instructions are capable of instructing the ACOS to perform the method wherein the obtaining the first plurality of data samples and the second plurality of data samples includes obtaining each of the first plurality of data samples and each of the second plurality of data samples so as to include respective location information related to latitude and longitude of each data sample.

In some configurations of this aspect, the computer-readable instructions are capable of instructing the ACOS to perform the method wherein the outputting the recommendation for the reconfiguration of the at least one of the antenna tilt and transmit power for the at least one of the cell overshoot and the cell undershoot of the cellular antenna is based on a desired cell centroid, wherein the desired cell centroid is determined by at least one of: a distance of a cell site of the cellular antenna and one or multiple neighboring cell sites, respectively, of the cellular antenna; a count of additional neighboring cell sites within a geometry of the cellular antenna with the first set of parameters and the cellular antenna with the second set of parameters; a count of additional neighboring cell centroids within a geometry of the cellular antenna with the first set of parameters and the cellular antenna with the second set of parameters; a radius of a cell geographic coverage area determined based on location information of the first plurality of data samples and the second plurality of data samples; and one or multiple radiuses of one or multiple geographic coverage areas, respectively, of one or multiple neighboring cellular antennas, respectively.

In some configurations of this aspect, the computer-readable instructions are capable of instructing the ACOS to perform the method wherein the outputting the recommendation for the reconfiguration of the at least one of the antenna tilt and transmit power for the at least one of the cell overshoot and the cell undershoot of the cellular antenna includes outputting a prioritization for at least one of a plurality cells and cell sites, wherein the prioritization is based on at least one of: a count of data samples within a cell of the one or multiple cellular antennas with the first set of parameters and a cell of the one or multiple cellular antennas with the second set of parameters; one or multiple performance metrics of the cell of the one or multiple cellular antennas with the first set of parameters and a cell of the one or multiple cellular antennas with the second set of parameters, where in the performance metrics include at least one of a download speed, a latency, a signal strength and a signal quality; a change of a tilt value; and a change of transmit power value.

The foregoing description of various preferred examples have been presented for purposes of illustration and description. It is not intended to be exhaustive or to limit the invention to the precise forms disclosed, and obviously many modifications and variations are possible in light of the above teaching. The examples, as described above, were chosen and described in order to enable others skilled in the art to best utilize the invention in various examples and with various modifications as are suited to the particular use contemplated. It is intended that the scope of the invention be defined by the claims appended hereto.

What is claimed is:

1. An antenna configuration optimization system for use with a first plurality of data samples of a first plurality of cellular devices connected to a cellular antenna configured with a first set of parameters and with a second plurality of data samples of a second plurality of cellular devices connected to the cellular antenna with a second set of parameters, said antenna configuration optimizing system comprising:
   a memory having instructions stored therein; and
   a processor configured to execute the instructions stored in said memory to cause said antenna configuration optimization system to:
      obtain the first plurality of data samples and the second plurality of data samples;
      store the obtained first plurality of data samples and the second plurality of data samples into said memory;
      detect at least one of a cell overshoot and a cell undershoot of the cellular antenna with the first set of parameters and the cellular antenna with the second set of parameters based on the first plurality of data samples and the second plurality of data samples; and output a recommendation for a reconfiguration of at least one of an antenna tilt and transmit power for the at least one of the cell overshoot and the cell undershoot of the cellular antenna.

2. The antenna configuration optimization system of claim 1, wherein each of the first plurality of data samples includes a respective of at least one of device geo location data, a performance measuring metric data, and combinations thereof.

3. The antenna configuration optimization system of claim 1, wherein said processor is configured to execute the instructions stored in said memory to cause said antenna configuration optimization system to detect at least one of the cell overshoot and the cell undershoot of the cellular antenna, based on at least one of:
cell site location information of the cellular antenna;
cell to cell site mapping indicating a relationship of one or multiple cells belonging to a cell site;
cell centroid location information of the cellular antenna with the first set of parameters and the cellular antenna with the second set of parameters, wherein the cell centroid location information is determined based on location information of the first plurality of data samples and the second plurality of data samples;
cell radius information of the cellular antenna with the first set of parameters and the cellular antenna with the second set of parameters, wherein the cell radius information is determined based on location information of the first plurality of data samples and the second plurality of data samples;
a distance between a cell site location and a cell centroid location of the cellular antenna with the first set of parameters and the cellular antenna with the second set of parameters;
a count of additional neighboring cell sites within a geometry of the cellular antenna with the first set of parameters and the cellular antenna with the second set of parameters;
a count of additional neighboring cell centroids within a geometry of the cellular antenna with the first set of parameters and the cellular antenna with the second set of parameters;
one or multiple distances of a cell site of the cellular antenna and one or multiple neighboring cell sites, respectively, of the cellular antenna; and
one or multiple distances of a cell site of the cellular antenna and one or multiple neighboring cell centroids, respectively, of the cellular antenna.

4. The antenna configuration optimization system of claim 1, wherein said each of the first plurality of data samples and the second plurality of data samples includes respective location information related to latitude and longitude of each data sample.

5. The antenna configuration optimization system of claim 1, wherein said processor is configured to execute the instructions stored in said memory to cause said antenna configuration optimization system to output the recommendation for the reconfiguration of the at least one of the antenna tilt and transmit power for the at least one of the cell overshoot and the cell undershoot of the cellular antenna such that the recommendation is based on a desired cell centroid, wherein the desired cell centroid is determined by at least one of:
a distance of a cell site of the cellular antenna and one or multiple neighboring cell sites, respectively, of the cellular antenna;
a count of additional neighboring cell sites within a geometry of the cellular antenna with the first set of parameters and the cellular antenna with the second set of parameters;
a count of additional neighboring cell centroids within a geometry of the cellular antenna with the first set of parameters and the cellular antenna with the second set of parameters;
a radius of a cell geographic coverage area determined based on location information of the first plurality of data samples and the second plurality of data samples; and
one or multiple radiuses of one or multiple geographic coverage areas, respectively, of one or multiple neighboring cellular antennas, respectively.

6. The antenna configuration optimization system of claim 1, wherein said processor is configured to execute the instructions stored in said memory to cause said antenna configuration optimization system to output the recommendation for the reconfiguration of the at least one of the antenna tilt and transmit power for the at least one of the cell overshoot and the cell undershoot of the cellular antenna by outputting a prioritization for at least one of a plurality cells and cell sites, wherein the prioritization is based on at least one of:
a count of data samples within a cell of the one or multiple cellular antennas with the first set of parameters and a cell of the one or multiple cellular antennas with the second set of parameters;
one or multiple performance metrics of the cell of the one or multiple cellular antennas with the first set of parameters and a cell of the one or multiple cellular antennas with the second set of parameters, where in the performance metrics include at least one of a download speed, a latency, a signal strength and a signal quality;
a change of a tilt value; and
a change of transmit power value.

7. The antenna configuration optimization system of claim 1, wherein said processor is configured to execute the instructions stored in said memory to cause said antenna configuration optimization system to output the recommendation for the reconfiguration of the at least one of the antenna tilt and transmit power for the at least one of the cell overshoot and the cell undershoot of the cellular antenna such that the recommendation includes at least one of:
a tilt value for a total of an electric tilt and a mechanical tilt of the cellular antenna;
an electric tilt value of the cellular antenna;
a transmit power value of the cellular antenna;
a change of a tilt value of the cellular antenna; and
a change of a transmit power value of the cellular antenna.

8. A method of optimizing a cellular antenna configuration of a cellular antenna for use with a first plurality of data samples of a first plurality of cellular devices connected to the cellular antenna configured with a first set of parameters and with a second plurality of data samples of a second plurality of cellular devices connected to the cellular antenna with a second set of parameters, said method comprising:
obtaining, via a processor configured to execute the instructions stored in a memory, the first plurality of data samples and the second plurality of data samples;
storing, via the processor, the obtained first plurality of data samples and the second plurality of data samples into said memory;

detecting, via the processor, at least one of a cell overshoot and a cell undershoot of the cellular antenna with the first set of parameters and the cellular antenna with the second set of parameters based on the first plurality of data samples and the second plurality of data samples; and outputting, via the processor, a recommendation for a reconfiguration of at least one of an antenna tilt and transmit power for the at least one of the cell overshoot and the cell undershoot of the cellular antenna.

9. The method of claim 8, wherein said obtaining the first plurality of data samples and the second plurality of data samples comprises obtaining each of the first plurality of data samples so as to include a respective of at least one of device geo location data, a performance measuring metric data, and combinations thereof.

10. The method of claim 8, wherein said detecting at least one of the cell overshoot and the cell undershoot of the cellular antenna is based on at least one of:

cell site location information of the cellular antenna;

cell to cell site mapping indicating a relationship of one or multiple cells belonging to a cell site;

cell centroid location information of the cellular antenna with the first set of parameters and the cellular antenna with the second set of parameters, wherein the cell centroid location information is determined based on location information of the first plurality of data samples and the second plurality of data samples;

cell radius information of the cellular antenna with the first set of parameters and the cellular antenna with the second set of parameters, wherein the cell radius information is determined based on location information of the first plurality of data samples and the second plurality of data samples;

a distance between a cell site location and a cell centroid location of the cellular antenna with the first set of parameters and the cellular antenna with the second set of parameters;

a count of additional neighboring cell sites within a geometry of the cellular antenna with the first set of parameters and the cellular antenna with the second set of parameters;

a count of additional neighboring cell centroids within a geometry of the cellular antenna with the first set of parameters and the cellular antenna with the second set of parameters;

one or multiple distances of a cell site of the cellular antenna and one or multiple neighboring cell sites, respectively, of the cellular antenna; and one or multiple distances of a cell site of the cellular antenna and one or multiple neighboring cell centroids, respectively, of the cellular antenna.

11. The method of claim 8, wherein said obtaining the first plurality of data samples and the second plurality of data samples comprises obtaining each of the first plurality of data samples and each of the second plurality of data samples so as to include respective location information related to latitude and longitude of each data sample.

12. The method of claim 8, wherein said outputting the recommendation for the reconfiguration of the at least one of the antenna tilt and transmit power for the at least one of the cell overshoot and the cell undershoot of the cellular antenna is based on a desired cell centroid, wherein the desired cell centroid is determined by at least one of:

a distance of a cell site of the cellular antenna and one or multiple neighboring cell sites, respectively, of the cellular antenna;

a count of additional neighboring cell sites within a geometry of the cellular antenna with the first set of parameters and the cellular antenna with the second set of parameters;

a count of additional neighboring cell centroids within a geometry of the cellular antenna with the first set of parameters and the cellular antenna with the second set of parameters;

a radius of a cell geographic coverage area determined based on location information of the first plurality of data samples and the second plurality of data samples; and one or multiple radiuses of one or multiple geographic coverage areas, respectively, of one or multiple neighboring cellular antennas, respectively.

13. The method of claim 8, wherein said outputting the recommendation for the reconfiguration of the at least one of the antenna tilt and transmit power for the at least one of the cell overshoot and the cell undershoot of the cellular antenna comprises outputting a prioritization for at least one of a plurality cells and cell sites, wherein the prioritization is based on at least one of:

a count of data samples within a cell of the one or multiple cellular antennas with the first set of parameters and a cell of the one or multiple cellular antennas with the second set of parameters;

one or multiple performance metrics of the cell of the one or multiple cellular antennas with the first set of parameters and a cell of the one or multiple cellular antennas with the second set of parameters, where in the performance metrics include at least one of a download speed, a latency, a signal strength and a signal quality;

a change of a tilt value; and a change of transmit power value.

14. The method of claim 8, wherein said outputting the recommendation for the reconfiguration of the at least one of the antenna tilt and transmit power for the at least one of the cell overshoot and the cell undershoot of the cellular antenna, comprises outputting the recommendation so as to include at least one of:

a tilt value for a total of an electric tilt and a mechanical tilt of the cellular antenna;

an electric tilt value of the cellular antenna;

a transmit power value of the cellular antenna;

a change of a tilt value of the cellular antenna; and a change of a transmit power value of the cellular antenna.

15. A non-transitory, computer-readable media having computer-readable instructions stored thereon, the computer-readable instructions being capable of being read by an antenna configuration optimization system for use with a first plurality of data samples of a first plurality of cellular devices connected to a cellular antenna configured with a first set of parameters and with a second plurality of data samples of a second plurality of cellular devices connected to the cellular antenna with a second set of parameters, wherein the computer-readable instructions are capable of instructing the antenna configuration optimization system to perform the method comprising:

obtaining, via a processor configured to execute the instructions stored in a memory, the first plurality of data samples and the second plurality of data samples;

storing, via the processor, the obtained first plurality of data samples and the second plurality of data samples into said memory;

detecting, via the processor, at least one of a cell overshoot and a cell undershoot of the cellular antenna with the first set of parameters and the cellular antenna with the second set of parameters based on the first plurality of data samples and the second plurality of data samples; and outputting, via the processor, a recommendation for a reconfiguration of at least one of an antenna tilt and transmit power for the at least one of the cell overshoot and the cell undershoot of the cellular antenna.

16. The non-transitory, computer-readable media of claim 15, wherein the computer-readable instructions are capable of instructing the antenna configuration optimization system to perform the method wherein said obtaining the first plurality of data samples and the second plurality of data samples comprises obtaining each of the first plurality of data samples so as to include a respective of at least one of device geo location data, a performance measuring metric data, and combinations thereof.

17. The non-transitory, computer-readable media of claim 16, wherein the computer-readable instructions are capable of instructing the antenna configuration optimization system to perform the method wherein said detecting at least one of the cell overshoot and the cell undershoot of the cellular antenna is based on at least one of:
  cell site location information of the cellular antenna;
  cell to cell site mapping indicating a relationship of one or multiple cells belonging to a cell site;
  cell centroid location information of the cellular antenna with the first set of parameters and the cellular antenna with the second set of parameters, wherein the cell centroid location information is determined based on location information of the first plurality of data samples and the second plurality of data samples;
  cell radius information of the cellular antenna with the first set of parameters and the cellular antenna with the second set of parameters, wherein the cell radius information is determined based on location information of the first plurality of data samples and the second plurality of data samples;
  a distance between a cell site location and a cell centroid location of the cellular antenna with the first set of parameters and the cellular antenna with the second set of parameters;
  a count of additional neighboring cell sites within a geometry of the cellular antenna with the first set of parameters and the cellular antenna with the second set of parameters;
  a count of additional neighboring cell centroids within a geometry of the cellular antenna with the first set of parameters and the cellular antenna with the second set of parameters;
  one or multiple distances of a cell site of the cellular antenna and one or multiple neighboring cell sites, respectively, of the cellular antenna; and
  one or multiple distances of a cell site of the cellular antenna and one or multiple neighboring cell centroids, respectively, of the cellular antenna.

18. The non-transitory, computer-readable media claim 16, wherein the computer-readable instructions are capable of instructing the antenna configuration optimization system to perform the method wherein said obtaining the first plurality of data samples and the second plurality of data samples comprises obtaining each of the first plurality of data samples and each of the second plurality of data samples so as to include respective location information related to latitude and longitude of each data sample.

19. The non-transitory, computer-readable media claim 15, wherein the computer-readable instructions are capable of instructing the antenna configuration optimization system to perform the method wherein said outputting the recommendation for the reconfiguration of the at least one of the antenna tilt and transmit power for the at least one of the cell overshoot and the cell undershoot of the cellular antenna is based on a desired cell centroid, wherein the desired cell centroid is determined by at least one of:
  a distance of a cell site of the cellular antenna and one or multiple neighboring cell sites, respectively, of the cellular antenna;
  a count of additional neighboring cell sites within a geometry of the cellular antenna with the first set of parameters and the cellular antenna with the second set of parameters;
  a count of additional neighboring cell centroids within a geometry of the cellular antenna with the first set of parameters and the cellular antenna with the second set of parameters;
  a radius of a cell geographic coverage area determined based on location information of the first plurality of data samples and the second plurality of data samples; and
  one or multiple radiuses of one or multiple geographic coverage areas, respectively, of one or multiple neighboring cellular antennas, respectively.

20. The non-transitory, computer-readable media claim 19, wherein the computer-readable instructions are capable of instructing the antenna configuration optimization system to perform the method wherein said outputting the recommendation for the reconfiguration of the at least one of the antenna tilt and transmit power for the at least one of the cell overshoot and the cell undershoot of the cellular antenna comprises outputting a prioritization for at least one of a plurality cells and cell sites, wherein the prioritization is based on at least one of:
  a count of data samples within a cell of the one or multiple cellular antennas with the first set of parameters and a cell of the one or multiple cellular antennas with the second set of parameters;
  one or multiple performance metrics of the cell of the one or multiple cellular antennas with the first set of parameters and a cell of the one or multiple cellular antennas with the second set of parameters, where in the performance metrics include at least one of a download speed, a latency, a signal strength and a signal quality;
  a change of a tilt value; and
  a change of transmit power value.

* * * * *